United States Patent
Chulinin et al.

(10) Patent No.: US 9,589,185 B2
(45) Date of Patent: Mar. 7, 2017

(54) SYMBOL RECOGNITION USING DECISION FORESTS

(71) Applicant: ABBYY Development LLC, Moscow (RU)

(72) Inventors: Yury Georgievich Chulinin, Moscow (RU); Oleg Senkevich, Ivanovo (RU)

(73) Assignee: ABBYY Development LLC (RU)

( * ) Notice: Subject to any disclaimer, the term of this patent is extended or adjusted under 35 U.S.C. 154(b) by 0 days.

(21) Appl. No.: 14/880,583

(22) Filed: Oct. 12, 2015

(65) Prior Publication Data

US 2016/0247019 A1    Aug. 25, 2016

Related U.S. Application Data

(63) Continuation-in-part of application No. 14/565,782, filed on Dec. 10, 2014.

(30) Foreign Application Priority Data

Dec. 16, 2014   (RU) .................................. 2014150945

(51) Int. Cl.
G06K 9/18        (2006.01)
G06K 9/00        (2006.01)

(52) U.S. Cl.
CPC ..... *G06K 9/00456* (2013.01); *G06K 9/00429* (2013.01); *G06K 2209/011* (2013.01)

(58) Field of Classification Search
CPC .............................. G06K 9/00456; G06K 9/74
USPC .................................................. 382/182, 185
See application file for complete search history.

(56) References Cited

U.S. PATENT DOCUMENTS

| | | |
|---|---|---|
| 4,950,167 A | 8/1990 | Harris et al. |
| 5,031,225 A | 7/1991 | Tachikawa et al. |
| 5,425,110 A | 6/1995 | Spitz et al. |
| 5,471,549 A | 11/1995 | Kurosu et al. |
| 5,771,712 A | 6/1998 | Campbell et al. |

(Continued)

OTHER PUBLICATIONS

Cenparmi, et al., "Analysis and Recognition of Asian Scripts—the State of the Art", Proceeding of the Seventh International Conference on Document Analysis and Recognition (ICDAR), 2003, 13 pages.

(Continued)

*Primary Examiner* — Ruiping Li
(74) *Attorney, Agent, or Firm* — Veronica Weinstein

(57) ABSTRACT

The current document is directed to methods and systems for identifying symbols corresponding to symbol images in a scanned-document image or other text-containing image, with the symbols corresponding to Chinese or Japanese characters, to Korean morpho-syllabic blocks, or to symbols of other languages that use a large number of symbols for writing and printing. In one implementation, the methods and systems to which the current document is directed carry out an initial processing step on one or more scanned images to identify a set of graphemes that most likely correspond to each symbol image that occurs in the scanned document image. The graphemes are selected for a symbol image based on accumulated votes generated from symbol patterns identified as likely related to the symbol image using one or more decision forests.

20 Claims, 64 Drawing Sheets

(56) References Cited

U.S. PATENT DOCUMENTS

| | | |
|---|---|---|
| 5,930,393 A * | 7/1999 | Ho .................. G06K 9/6807 |
| | | 382/170 |
| 6,005,986 A | 12/1999 | Ratner et al. |
| 6,148,119 A | 11/2000 | Takaoka et al. |
| 6,389,166 B1 | 5/2002 | Chang et al. |
| 6,512,522 B1 | 1/2003 | Miller et al. |
| 6,657,625 B1 | 12/2003 | Chik et al. |
| 6,661,417 B1 | 12/2003 | Cheng |
| 6,804,414 B1 | 10/2004 | Sakai et al. |
| 7,013,264 B2 | 3/2006 | Dolan et al. |
| 7,027,054 B1 | 4/2006 | Cheiky et al. |
| 7,106,905 B2 | 9/2006 | Simske |
| 7,151,860 B1 | 12/2006 | Sakai et al. |
| 7,254,269 B2 | 8/2007 | Nakagawa et al. |
| 7,729,538 B2 * | 6/2010 | Shilman ............ G06K 9/00402 |
| | | 382/181 |
| 7,805,004 B2 | 9/2010 | Liu et al. |
| 8,027,539 B2 | 9/2011 | Chen et al. |
| 8,041,119 B2 | 10/2011 | Tsai et al. |
| 8,478,045 B2 | 7/2013 | Sun et al. |
| 2011/0043528 A1 | 2/2011 | Solomonov et al. |

OTHER PUBLICATIONS

Liu, et al., "ICDAR 2011 Chinese Handwriting Recognition Competition", International Conference on Document Analysis and Recognition, 2011, 6 pages, China.

Macrostie, et al., "The BBN Byblos Japanese OCR System", Speech & Language Processing Department, 2004, 4 pages, BBN Technologies, Cambridge, MA.

Zhang, et al., "Novel Method of Feature Extraction and Classification for OPCCR", Image Information Institute, date, 4 pages, College of Electronics and Information Engineering, Sichuan University, Chengdu, China.

* cited by examiner

<My goal was supposed to be a math teacher, however, I ended up to be hired by a personal computer company.>

Taking programing classes in my college and purchasing a microcomputer seemed to be a trigger for working with a computer. One day, when I got news that a new, high performance computer had been on r sale, I chose the computer company as a part time job. The job was to answer to customer's questions in the show room, and I was allowed to use those computers anytime when I had nothing to do.

"You soon get tired of one thing. I wonder how you can keep taking care of high school students by three years as a teacher", one day an executive of the company said, which made me sense certainly. Then, I made a decision to get a job in the company.It was a small venture business where I was working for. While working there being given a lot of different roles at the developmental fields, every day was absolutely fulfillment for me. The company was happened to be sold by TOSHIBA, Inc., when it was my tenth year. If you work for a corporation, your goal should be getting a position as "president". However, TOSHIBA had more than thirty executives; many of them were so smart people, it was totally impossible for me to be the president.

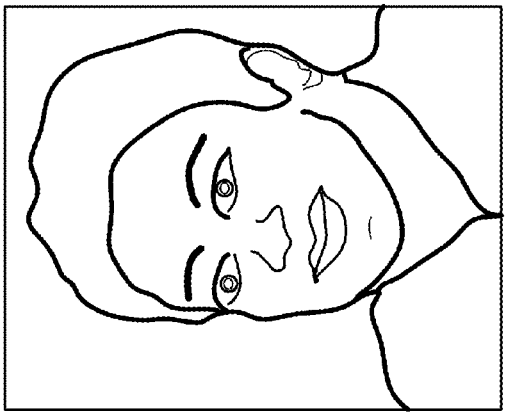

Handmade Search Engine by Grope

Fall Down Seven Times, Get up Eight

Born in Tokyo in 1957. Graduate from Tokyo University of Science in 1979, got employed by Sword Machine Systems. Moving to Soft Bank Laboratory, Soft Bank, then funded Yahoo Inc, in January 1996. President & CEO Yahoo Inc from January 1996. Jazz music and reading science fiction as hobby and interest. His current favorite is "Perry Rhodan Universe Hero", which has been written by multiple writers novel relay in Germany.

FIG. 1B

| symbol | $\frac{h}{hw}$ (904) | $\frac{v}{vw}$ (906) | b (908) | num vs (910) | num hs (912) | num vs + num hs (914) | $\frac{v}{h}$ (916) |
|---|---|---|---|---|---|---|---|
| 1 | .2 | .6 | .12 | 0 | 0 | 0 | 3 |
| 2 | .6 | .6 | .28 | 0 | 0 | 0 | 1 |
| 3 | .6 | .2 | .12 | 0 | 0 | 0 | .33 |
| 4 | .2 | .6 | .12 | 0 | 0 | 0 | 3 |
| 5 | .6 | .46 | .2 | 0 | 0 | 0 | .77 |
| 6 | .6 | .46 | .2 | 0 | 0 | 0 | .77 |
| 7 | .2 | .6 | .6 | 1 | 0 | 1 | 3 |
| 8 | .6 | .6 | .28 | 0 | 0 | 0 | 1 |
| 9 | .6 | .6 | .28 | 0 | 0 | 0 | 1 |
| 10 | .6 | .6 | .28 | 0 | 0 | 0 | 1 |
| 11 | .46 | .6 | .2 | 0 | 0 | 0 | 1.3 |
| 12 | .46 | .6 | .2 | 0 | 0 | 0 | 1.3 |
| 13 | .6 | .6 | .28 | 0 | 0 | 0 | 1 |
| 14 | .6 | .6 | .32 | 0 | 0 | 0 | 1 |
| 15 | .6 | .2 | .16 | 0 | 1 | 1 | .33 |
| 16 | .6 | .6 | .28 | 0 | 0 | 0 | 1 |
| 17 | .2 | .2 | .08 | 1 | 0 | 1 | 1 |
| 18 | .2 | .2 | .12 | 0 | 0 | 0 | 1 |
| 19 | .2 | .6 | .16 | 1 | 0 | 1 | 3 |
| 20 | .6 | .6 | .32 | 0 | 0 | 0 | 1 |
| 21 | .6 | .2 | .16 | 0 | 1 | 1 | .33 |
| 22 | .6 | .6 | .28 | 0 | 0 | 0 | 1 |
| 23 | .2 | .6 | .2 | 1 | 0 | 1 | 3 |
| 24 | .2 | .2 | .12 | 0 | 0 | 0 | 1 |
| 25 | .2 | .6 | .16 | 1 | 0 | 1 | 3 |
| 26 | .6 | .6 | .2 | 0 | 0 | 0 | 1 |
| 27 | .2 | .2 | .08 | 0 | 1 | 1 | 1 |
| 28 | .2 | .6 | .08 | 0 | 1 | 1 | 1 |
| 29 | .2 | .6 | .2 | 1 | 0 | 1 | 3 |
| 30 | .2 | .2 | .16 | 0 | 0 | 0 | 1 |
| 31 | .2 | .6 | .16 | 1 | 0 | 1 | 3 |
| 32 | .6 | .6 | .2 | 0 | 0 | 0 | 1 |
| 33 | .2 | .33 | .15 | 0 | 0 | 0 | 1.7 |
| 34 | .2 | .33 | .15 | 0 | 0 | 0 | 1.7 |
| 35 | .2 | .33 | .23 | 0 | 0 | 0 | 1.7 |
| 36 | .2 | .2 | .16 | 0 | 0 | 0 | 1 |
| 37 | .6 | .6 | .32 | 0 | 0 | 0 | 1 |
| 38 | .6 | .6 | .2 | 0 | 0 | 0 | 1 |
| 39 | .2 | .33 | .19 | 0 | 0 | 0 | 1.7 |
| 40 | .2 | .33 | .19 | 0 | 0 | 0 | 1.7 |
| 41 | .2 | .33 | .19 | 0 | 0 | 0 | 1.7 |
| 42 | .2 | .2 | .04 | 0 | 0 | 0 | 1 |
| 43 | .6 | .6 | .2 | 0 | 0 | 0 | 1 |
| 44 | .6 | .6 | .2 | 0 | 0 | 0 | 1 |
| 45 | .6 | .6 | .2 | 0 | 0 | 0 | 1 |
| 46 | .2 | .33 | .19 | 0 | 0 | 0 | 1.7 |
| 47 | .2 | .33 | .23 | 0 | 0 | 0 | 1.7 |
| 48 | .2 | .2 | .16 | 1 | 1 | 2 | 1 |

FIG. 9

| # | h/hw | v/vw | b | num vs | num hs | num vs + num hs | v/h | P | longest edge |
|---|---|---|---|---|---|---|---|---|---|
| 1 | .2 | .6 | .12 | 0 | 0 | 0 | 3 | 0 | 0 |
| 2 | .6 | .6 | .28 | 0 | 0 | 0 | 1 | 2 | 3 |
| 3 | .6 | .2 | .12 | 0 | 0 | 0 | .33 | 0 | 1 |
| 4 | .2 | .6 | .12 | 0 | 0 | 0 | 3 | 2 | 0 |
| 5 | .6 | .46 | .2 | 0 | 0 | 0 | .77 | 4 | 2 |
| 6 | .6 | .46 | .2 | 0 | 0 | 0 | .77 | 3 | 2 |
| 7 | .2 | .6 | .6 | 1 | 0 | 1 | 3 | 5 | 0 |
| 8 | .6 | .6 | .28 | 0 | 0 | 0 | 1 | 4 | 1 |
| 9 | .6 | .6 | .28 | 0 | 0 | 0 | 1 | 0 | 1 |
| 10 | .6 | .6 | .28 | 0 | 0 | 0 | 1 | 3 | 3 |
| 11 | .46 | .6 | .2 | 0 | 0 | 0 | 1.3 | 2 | 2 |
| 12 | .46 | .6 | .2 | 0 | 0 | 0 | 1.3 | 1 | 2 |
| 13 | .6 | .6 | .28 | 0 | 0 | 0 | 1 | 0 | 0 |
| 14 | .6 | .6 | .32 | 0 | 0 | 0 | 1 | 14 | 0 |
| 15 | .6 | .2 | .16 | 0 | 1 | 1 | .33 | 2 | 1 |
| 16 | .6 | .6 | .28 | 0 | 0 | 0 | 1 | 4 | 3 |
| 17 | .2 | .2 | .08 | 1 | 0 | 1 | 1 | 0 | 3 |
| 18 | .2 | .2 | .12 | 0 | 0 | 0 | 1 | 13 | 2 |
| 19 | .2 | .6 | .16 | 1 | 0 | 1 | 3 | 11 | 0 |
| 20 | .6 | .6 | .32 | 0 | 0 | 0 | 1 | 13 | 0 |
| 21 | .6 | .2 | .16 | 0 | 1 | 1 | .33 | 1 | 1 |
| 22 | .6 | .6 | .28 | 0 | 0 | 0 | 1 | 1 | 3 |
| 23 | .2 | .6 | .2 | 1 | 0 | 1 | 3 | 4 | 0 |
| 24 | .2 | .2 | .12 | 0 | 0 | 0 | 1 | 14 | 2 |
| 25 | .2 | .6 | .16 | 1 | 0 | 1 | 3 | 10 | 0 |
| 26 | .6 | .6 | .2 | 0 | 0 | 0 | 1 | 6 | 3 |
| 27 | .2 | .2 | .08 | 0 | 1 | 1 | 1 | 0 | 3 |
| 28 | .2 | .6 | .08 | 0 | 1 | 1 | 1 | 0 | 2 |
| 29 | .2 | .6 | .2 | 1 | 0 | 1 | 3 | 3 | 0 |
| 30 | .2 | .2 | .16 | 0 | 0 | 0 | 1 | 14 | 2 |
| 31 | .2 | .6 | .16 | 1 | 0 | 1 | 3 | 9 | 0 |
| 32 | .6 | .6 | .2 | 0 | 0 | 0 | 1 | 5 | 3 |
| 33 | .2 | .33 | .15 | 0 | 0 | 0 | 1.7 | 14 | 2 |
| 34 | .2 | .33 | .15 | 0 | 0 | 0 | 1.7 | 13 | 2 |
| 35 | .2 | .33 | .23 | 0 | 0 | 0 | 1.7 | 13 | 2 |
| 36 | .2 | .2 | .16 | 0 | 0 | 0 | 1 | 13 | 2 |
| 37 | .6 | .6 | .32 | 0 | 0 | 0 | 1 | 0 | 3 |
| 38 | .6 | .6 | .2 | 0 | 0 | 0 | 1 | 7 | 3 |
| 39 | .2 | .33 | .19 | 0 | 0 | 0 | 1.7 | 10 | 2 |
| 40 | .2 | .33 | .19 | 0 | 0 | 0 | 1.7 | 9 | 2 |
| 41 | .2 | .33 | .19 | 0 | 0 | 0 | 1.7 | 12 | 2 |
| 42 | .2 | .2 | .04 | 0 | 0 | 0 | 1 | 0 | 3 |
| 43 | .6 | .6 | .2 | 0 | 0 | 0 | 1 | 2 | 1 |
| 44 | .6 | .6 | .2 | 0 | 0 | 0 | 1 | 8 | 3 |
| 45 | .6 | .6 | .2 | 0 | 0 | 0 | 1 | 0 | 3 |
| 46 | .2 | .33 | .19 | 0 | 0 | 0 | 1.7 | 11 | 2 |
| 47 | .2 | .33 | .23 | 0 | 0 | 0 | 1.7 | 14 | 2 |
| 48 | .2 | .2 | .16 | 1 | 1 | 2 | 1 | 0 | 3 |

FIG. 13B

| | $\frac{h}{hw}$ | $\frac{v}{vw}$ | b | num vs | num hs | num vs + num hs | $\frac{v}{h}$ | P | longest edge |
|---|---|---|---|---|---|---|---|---|---|
| 13 | .6 | .6 | .28 | 0 | 0 | 0 | 1 | 0 | 0 |
| 14 | .6 | .6 | .32 | 0 | 0 | 0 | 1 | 14 | 0 |
| 15 | .6 | .2 | .16 | 0 | 1 | 1 | .33 | 2 | 1 |
| 16 | .6 | .6 | .28 | 0 | 0 | 0 | 1 | 4 | 3 |
| 17 | .2 | .2 | .08 | 1 | 0 | 1 | 1 | 0 | 3 |
| 18 | .2 | .2 | .12 | 0 | 0 | 0 | 1 | 13 | 2 |
| 19 | .2 | .6 | .16 | 1 | 0 | 1 | 3 | 11 | 0 |
| 20 | .6 | .6 | .32 | 0 | 0 | 0 | 1 | 13 | 0 |
| 21 | .6 | .2 | .16 | 0 | 1 | 1 | .33 | 1 | 1 |
| 22 | .6 | .6 | .28 | 0 | 0 | 0 | 1 | 1 | 3 |
| 23 | .2 | .6 | .2 | 1 | 0 | 1 | 3 | 4 | 0 |
| 24 | .2 | .2 | .12 | 0 | 0 | 0 | 1 | 14 | 2 |
| 25 | .2 | .6 | .16 | 1 | 0 | 1 | 3 | 10 | 0 |
| 26 | .6 | .6 | .2 | 0 | 0 | 0 | 1 | 6 | 3 |
| 27 | .2 | .2 | .08 | 0 | 1 | 1 | 1 | 0 | 3 |
| 28 | .2 | .6 | .08 | 0 | 1 | 1 | 1 | 0 | 2 |
| 29 | .2 | .6 | .2 | 1 | 0 | 1 | 3 | 3 | 0 |
| 30 | .2 | .2 | .16 | 0 | 0 | 0 | 1 | 14 | 2 |
| 31 | .2 | .6 | .16 | 1 | 0 | 1 | 3 | 9 | 0 |
| 32 | .6 | .6 | .2 | 0 | 0 | 0 | 1 | 5 | 3 |
| 33 | .2 | .33 | .15 | 0 | 0 | 0 | 1.7 | 14 | 2 |
| 34 | .2 | .33 | .15 | 0 | 0 | 0 | 1.7 | 13 | 2 |
| 35 | .2 | .33 | .23 | 0 | 0 | 0 | 1.7 | 13 | 2 |
| 36 | .2 | .2 | .16 | 0 | 0 | 0 | 1 | 13 | 2 |
| 37 | .6 | .6 | .32 | 0 | 0 | 0 | 1 | 0 | 3 |
| 38 | .6 | .6 | .2 | 0 | 0 | 0 | 1 | 7 | 3 |
| 39 | .2 | .33 | .19 | 0 | 0 | 0 | 1.7 | 10 | 2 |
| 40 | .2 | .33 | .19 | 0 | 0 | 0 | 1.7 | 9 | 2 |
| 41 | .2 | .33 | .19 | 0 | 0 | 0 | 1.7 | 12 | 2 |
| 42 | .2 | .2 | .04 | 0 | 0 | 0 | 1 | 0 | 3 |
| 43 | .6 | .6 | .2 | 0 | 0 | 0 | 1 | 2 | 1 |
| 44 | .6 | .6 | .2 | 0 | 0 | 0 | 1 | 8 | 3 |
| 45 | .6 | .6 | .2 | 0 | 0 | 0 | 1 | 0 | 3 |
| 46 | .2 | .33 | .19 | 0 | 0 | 0 | 1.7 | 11 | 2 |
| 47 | .2 | .33 | .23 | 0 | 0 | 0 | 1.7 | 14 | 2 |
| 48 | .2 | .2 | .16 | 1 | 1 | 2 | 1 | 0 | 3 |

FIG. 14B

| | $\dfrac{h}{hw}$ | $\dfrac{v}{vw}$ | b | num vs | num hs | num vs + num hs | $\dfrac{v}{h}$ | P | longest edge |
|---|---|---|---|---|---|---|---|---|---|
| 1 | .2 | .6 | .12 | 0 | 0 | 0 | 3 | 0 | 0 |
| 2 | .6 | .6 | .28 | 0 | 0 | 0 | 1 | 2 | 3 |
| 3 | .6 | .2 | .12 | 0 | 0 | 0 | .33 | 0 | 1 |
| 4 | .2 | .6 | .12 | 0 | 0 | 0 | 3 | 2 | 0 |
| 5 | .6 | .46 | .2 | 0 | 0 | 0 | .77 | 4 | 2 |
| 6 | .6 | .46 | .2 | 0 | 0 | 0 | .77 | 3 | 2 |
| 7 | .2 | .6 | .6 | 1 | 0 | 1 | 3 | 5 | 0 |
| 8 | .6 | .6 | .28 | 0 | 0 | 0 | 1 | 4 | 1 |
| 9 | .6 | .6 | .28 | 0 | 0 | 0 | 1 | 0 | 1 |
| 10 | .6 | .6 | .28 | 0 | 0 | 0 | 1 | 3 | 3 |
| 11 | .46 | .6 | .2 | 0 | 0 | 0 | 1.3 | 2 | 2 |
| 12 | .46 | .6 | .2 | 0 | 0 | 0 | 1.3 | 1 | 2 |
| 25 | .2 | .6 | .16 | 1 | 0 | 1 | 3 | 10 | 0 |
| 26 | .6 | .6 | .2 | 0 | 0 | 0 | 1 | 6 | 3 |
| 27 | .2 | .2 | .08 | 0 | 1 | 1 | 1 | 0 | 3 |
| 28 | .2 | .6 | .08 | 0 | 1 | 1 | 1 | 0 | 2 |
| 29 | .2 | .6 | .2 | 1 | 0 | 1 | 3 | 3 | 0 |
| 30 | .2 | .2 | .16 | 0 | 0 | 0 | 1 | 14 | 2 |
| 31 | .2 | .6 | .16 | 1 | 0 | 1 | 3 | 9 | 0 |
| 32 | .6 | .6 | .2 | 0 | 0 | 0 | 1 | 5 | 3 |
| 33 | .2 | .33 | .15 | 0 | 0 | 0 | 1.7 | 14 | 2 |
| 34 | .2 | .33 | .15 | 0 | 0 | 0 | 1.7 | 13 | 2 |
| 35 | .2 | .33 | .23 | 0 | 0 | 0 | 1.7 | 13 | 2 |
| 36 | .2 | .2 | .16 | 0 | 0 | 0 | 1 | 13 | 2 |
| 37 | .6 | .6 | .32 | 0 | 0 | 0 | 1 | 0 | 3 |
| 38 | .6 | .6 | .2 | 0 | 0 | 0 | 1 | 7 | 3 |
| 39 | .2 | .33 | .19 | 0 | 0 | 0 | 1.7 | 10 | 2 |
| 40 | .2 | .33 | .19 | 0 | 0 | 0 | 1.7 | 9 | 2 |
| 41 | .2 | .33 | .19 | 0 | 0 | 0 | 1.7 | 12 | 2 |
| 42 | .2 | .2 | .04 | 0 | 0 | 0 | 1 | 0 | 3 |
| 43 | .6 | .6 | .2 | 0 | 0 | 0 | 1 | 2 | 1 |
| 44 | .6 | .6 | .2 | 0 | 0 | 0 | 1 | 8 | 3 |
| 45 | .6 | .6 | .2 | 0 | 0 | 0 | 1 | 0 | 3 |
| 46 | .2 | .33 | .19 | 0 | 0 | 0 | 1.7 | 11 | 2 |
| 47 | .2 | .33 | .23 | 0 | 0 | 0 | 1.7 | 14 | 2 |
| 48 | .2 | .2 | .16 | 1 | 1 | 2 | 1 | 0 | 3 |

FIG. 15B

| | $\dfrac{h}{hw}$ | $\dfrac{v}{vw}$ | b | num vs | num hs | num vs + num hs | $\dfrac{v}{h}$ | P | longest edge |
|---|---|---|---|---|---|---|---|---|---|
| 1 | .2 | .6 | .12 | 0 | 0 | 0 | 3 | 0 | 0 |
| 2 | .6 | .6 | .28 | 0 | 0 | 0 | 1 | 2 | 3 |
| 3 | .6 | .2 | .12 | 0 | 0 | 0 | .33 | 0 | 1 |
| 4 | .2 | .6 | .12 | 0 | 0 | 0 | 3 | 2 | 0 |
| 5 | .6 | .46 | .2 | 0 | 0 | 0 | .77 | 4 | 2 |
| 6 | .6 | .46 | .2 | 0 | 0 | 0 | .77 | 3 | 2 |
| 7 | .2 | .6 | .6 | 1 | 0 | 1 | 3 | 5 | 0 |
| 8 | .6 | .6 | .28 | 0 | 0 | 0 | 1 | 4 | 1 |
| 9 | .6 | .6 | .28 | 0 | 0 | 0 | 1 | 0 | 1 |
| 10 | .6 | .6 | .28 | 0 | 0 | 0 | 1 | 3 | 3 |
| 11 | .46 | .6 | .2 | 0 | 0 | 0 | 1.3 | 2 | 2 |
| 12 | .46 | .6 | .2 | 0 | 0 | 0 | 1.3 | 1 | 2 |
| 13 | .6 | .6 | .28 | 0 | 0 | 0 | 1 | 0 | 0 |
| 14 | .6 | .6 | .32 | 0 | 0 | 0 | 1 | 14 | 0 |
| 15 | .6 | .2 | .16 | 0 | 1 | 1 | .33 | 2 | 1 |
| 16 | .6 | .6 | .28 | 0 | 0 | 0 | 1 | 4 | 3 |
| 17 | .2 | .2 | .08 | 1 | 0 | 1 | 1 | 0 | 3 |
| 18 | .2 | .2 | .12 | 0 | 0 | 0 | 1 | 13 | 2 |
| 19 | .2 | .6 | .16 | 1 | 0 | 1 | 3 | 11 | 0 |
| 20 | .6 | .6 | .32 | 0 | 0 | 0 | 1 | 13 | 0 |
| 21 | .6 | .2 | .16 | 0 | 1 | 1 | .33 | 1 | 1 |
| 22 | .6 | .6 | .28 | 0 | 0 | 0 | 1 | 1 | 3 |
| 23 | .2 | .6 | .2 | 1 | 0 | 1 | 3 | 4 | 0 |
| 24 | .2 | .2 | .12 | 0 | 0 | 0 | 1 | 14 | 2 |
| 37 | .6 | .6 | .32 | 0 | 0 | 0 | 1 | 0 | 3 |
| 38 | .6 | .6 | .2 | 0 | 0 | 0 | 1 | 7 | 3 |
| 39 | .2 | .33 | .19 | 0 | 0 | 0 | 1.7 | 10 | 2 |
| 40 | .2 | .33 | .19 | 0 | 0 | 0 | 1.7 | 9 | 2 |
| 41 | .2 | .33 | .19 | 0 | 0 | 0 | 1.7 | 12 | 2 |
| 42 | .2 | .2 | .04 | 0 | 0 | 0 | 1 | 0 | 3 |
| 43 | .6 | .6 | .2 | 0 | 0 | 0 | 1 | 2 | 1 |
| 44 | .6 | .6 | .2 | 0 | 0 | 0 | 1 | 8 | 3 |
| 45 | .6 | .6 | .2 | 0 | 0 | 0 | 1 | 0 | 3 |
| 46 | .2 | .33 | .19 | 0 | 0 | 0 | 1.7 | 11 | 2 |
| 47 | .2 | .33 | .23 | 0 | 0 | 0 | 1.7 | 14 | 2 |
| 48 | .2 | .2 | .16 | 1 | 1 | 2 | 1 | 0 | 3 |

FIG. 16B

| | $\frac{h}{hw}$ | $\frac{v}{vw}$ | b | num vs | num hs | num vs + num hs | $\frac{v}{h}$ | P | longest edge |
|---|---|---|---|---|---|---|---|---|---|
| 1 | .2 | .6 | .12 | 0 | 0 | 0 | 3 | 0 | 0 |
| 2 | .6 | .6 | .28 | 0 | 0 | 0 | 1 | 2 | 3 |
| 3 | .6 | .2 | .12 | 0 | 0 | 0 | .33 | 0 | 1 |
| 4 | .2 | .6 | .12 | 0 | 0 | 0 | 3 | 2 | 0 |
| 5 | .6 | .46 | .2 | 0 | 0 | 0 | .77 | 4 | 2 |
| 6 | .6 | .46 | .2 | 0 | 0 | 0 | .77 | 3 | 2 |
| 7 | .2 | .6 | .6 | 1 | 0 | 1 | 3 | 5 | 0 |
| 8 | .6 | .6 | .28 | 0 | 0 | 0 | 1 | 4 | 1 |
| 9 | .6 | .6 | .28 | 0 | 0 | 0 | 1 | 0 | 1 |
| 10 | .6 | .6 | .28 | 0 | 0 | 0 | 1 | 3 | 3 |
| 11 | .46 | .6 | .2 | 0 | 0 | 0 | 1.3 | 2 | 2 |
| 12 | .46 | .6 | .2 | 0 | 0 | 0 | 1.3 | 1 | 2 |
| 13 | .6 | .6 | .28 | 0 | 0 | 0 | 1 | 0 | 0 |
| 14 | .6 | .6 | .32 | 0 | 0 | 0 | 1 | 14 | 0 |
| 15 | .6 | .2 | .16 | 0 | 1 | 1 | .33 | 2 | 1 |
| 16 | .6 | .6 | .28 | 0 | 0 | 0 | 1 | 4 | 3 |
| 17 | .2 | .2 | .08 | 1 | 0 | 1 | 1 | 0 | 3 |
| 18 | .2 | .2 | .12 | 0 | 0 | 0 | 1 | 13 | 2 |
| 19 | .2 | .6 | .16 | 1 | 0 | 1 | 3 | 11 | 0 |
| 20 | .6 | .6 | .32 | 0 | 0 | 0 | 1 | 13 | 0 |
| 21 | .6 | .2 | .16 | 0 | 1 | 1 | .33 | 1 | 1 |
| 22 | .6 | .6 | .28 | 0 | 0 | 0 | 1 | 1 | 3 |
| 23 | .2 | .6 | .2 | 1 | 0 | 1 | 3 | 4 | 0 |
| 24 | .2 | .2 | .12 | 0 | 0 | 0 | 1 | 14 | 2 |
| 25 | .2 | .6 | .16 | 1 | 0 | 1 | 3 | 10 | 0 |
| 26 | .6 | .6 | .2 | 0 | 0 | 0 | 1 | 6 | 3 |
| 27 | .2 | .2 | .08 | 0 | 1 | 1 | 1 | 0 | 3 |
| 28 | .2 | .6 | .08 | 0 | 1 | 1 | 1 | 0 | 2 |
| 29 | .2 | .6 | .2 | 1 | 0 | 1 | 3 | 3 | 0 |
| 30 | .2 | .2 | .16 | 0 | 0 | 0 | 1 | 14 | 2 |
| 31 | .2 | .6 | .16 | 1 | 0 | 1 | 3 | 9 | 0 |
| 32 | .6 | .6 | .2 | 0 | 0 | 0 | 1 | 5 | 3 |
| 33 | .2 | .33 | .15 | 0 | 0 | 0 | 1.7 | 14 | 2 |
| 34 | .2 | .33 | .15 | 0 | 0 | 0 | 1.7 | 13 | 2 |
| 35 | .2 | .33 | .23 | 0 | 0 | 0 | 1.7 | 13 | 2 |
| 36 | .2 | .2 | .16 | 0 | 0 | 0 | 1 | 13 | 2 |

FIG. 17B

```
code process (symbolImage s)
{
    double score = 0, t;
    double p_values[num_parameters];
    int i, j, k, c, p;
    for (i = 0; i < num_InitialParameters; i++) p_values[i] = parameterize(s, i);
    for (j = 0; j < num_clusters; j++)
    {
        t = 0;
        for (i = 0; i < num_InitialParameters; i++) t += compare(clusters[j].parameter(i), p_values[i]);
        if (t > score)
        {
            score = t;
            c = j;
        }
    }
    score = 0;
    for (i = num_InitialParameters; i < clusters[c].numAdditionalParameters; i++)
    {
        k = clusters[c].additionalParameter(i);
        p_values[i] = parameterize(s, k);
    }
    for (j = 0; j < clusters[c].numPatterns; j++)
    {
        t = 0;
        for (i = numInitialParameter; k = 1; i < clusters[c].numAdditionalParameters; i++, k++)
            t += compare(clusters[c].patterns[j].parameter(k), p_values[i]);
        if (t > score)
        {
            score = t;
            p = j;
        }
    }
    return (clusters[c].patterns[p].code);
}
```

- 2224: `for (i = 0; i < num_InitialParameters; i++) p_values[i] = parameterize(s, i);`
- 2220: first cluster loop
- 2226: additional parameters loop
- 2222: patterns loop number of symbols on page = $N$
number of clusters = $C$
number of patterns/cluster = $P'$
number of initial parameters = $R_1$
number of additional parameters = $R_2$ computational complexity = $N(CR_1 + P'R_2)$

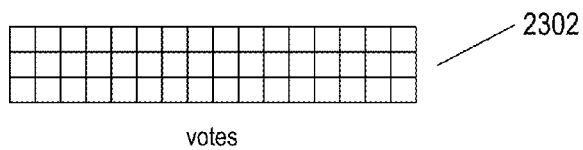

votes — 2302

```
         for (i = 0; i < 22; j++)
           for (j = 0; j < 18; j++)
             {                                                    2306
2304         NxtLvlClusters[(i*18)+j] = new cluster [num_clusters];
             orderByVoting (page_of_text [i,j], NxtLvlClusters[(i*18)+j])    2308
             }
```

```
         list* process (symbolImage s, cluster* clusters)
         {
             list* similarPatterns;
             double score = 0, t;
             double p_values[num_parameters];
2312         int i,j;
             similarPatterns = new (list);
             for (i = 0; i < num_parameters; i++) p_values[i] = parameterize(s, i);
           for (j = 0; j < num_clusters &&!similarPatterns → full( ); j++)
           {
2310           if (similar (p_values, clusters[j]))
               {
                   for (k = 0; k < clusters[j].numPatterns( ); k++)
2314           {
                2316    if (similar(p_values, clusters[j].patterns[k]))
                           similarPatterns → add(clusters[j].patterns[k]);
                        if (similarPatterns → full( )) break;
                   }
               }
           }
             return similarPatterns;
         }
```

FIG. 23 computational complexity = $N\left(e + \dfrac{1}{d}(CR_1 + P'R_2)\right)$ — 2320

(with labels 2344, 2322)

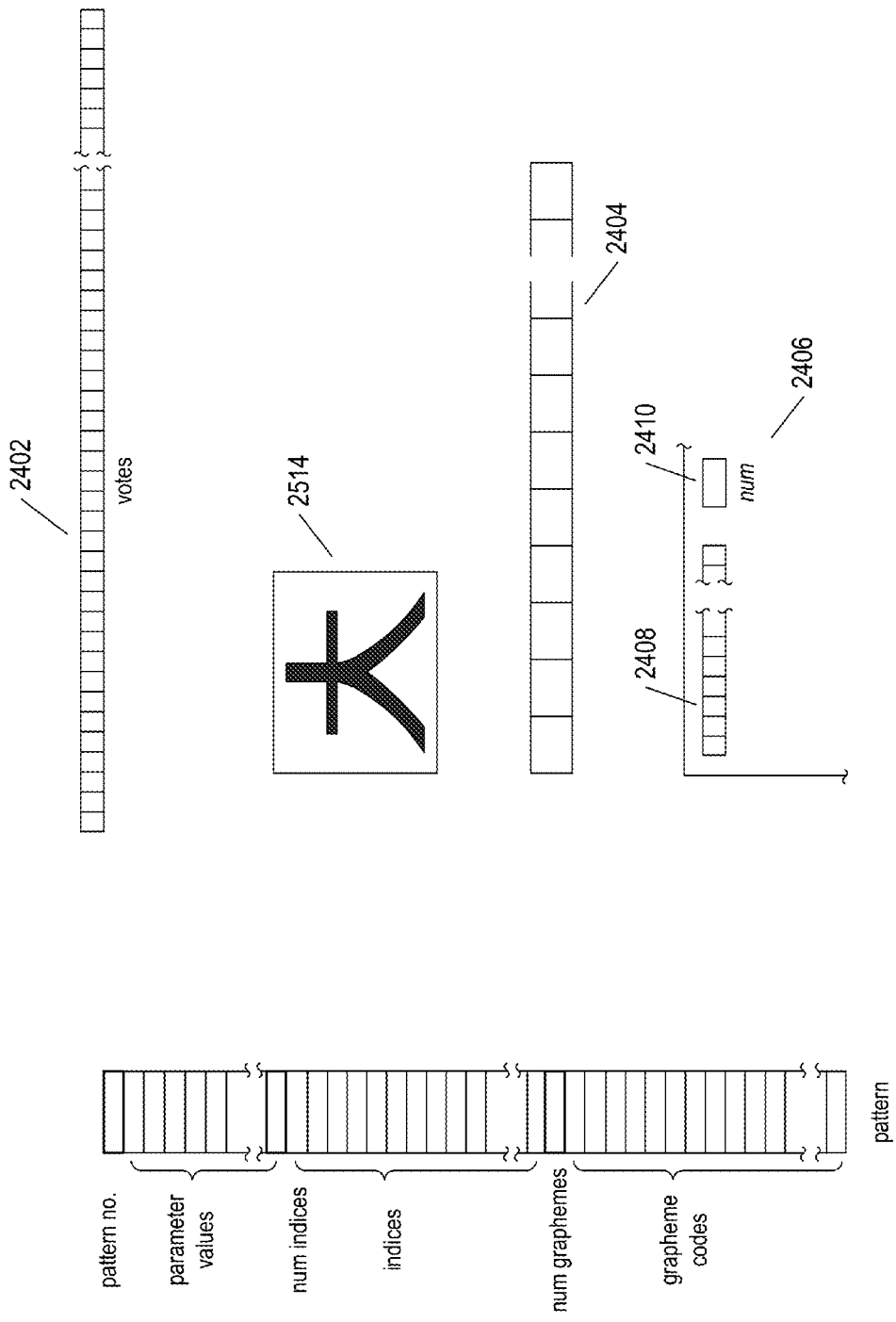

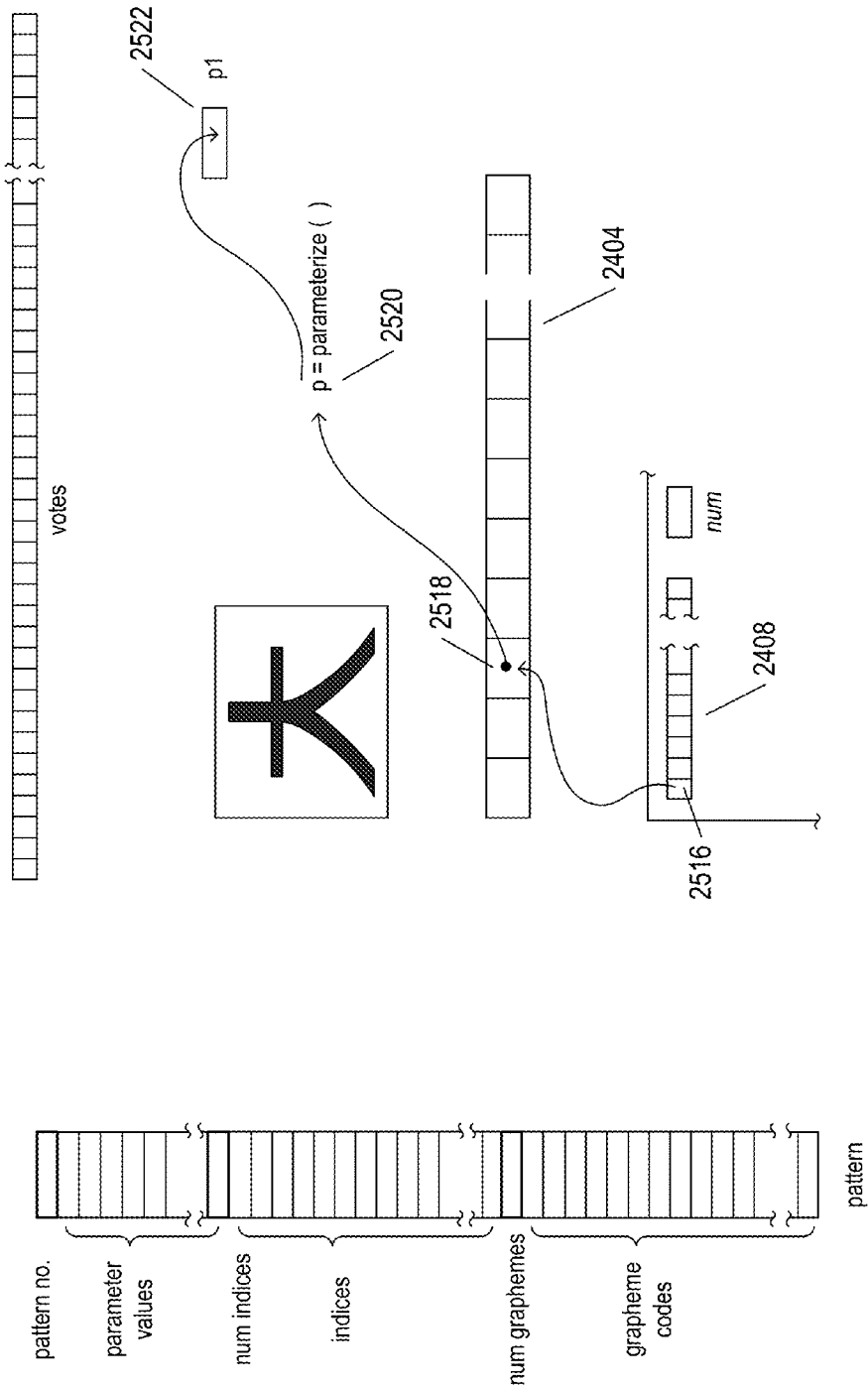

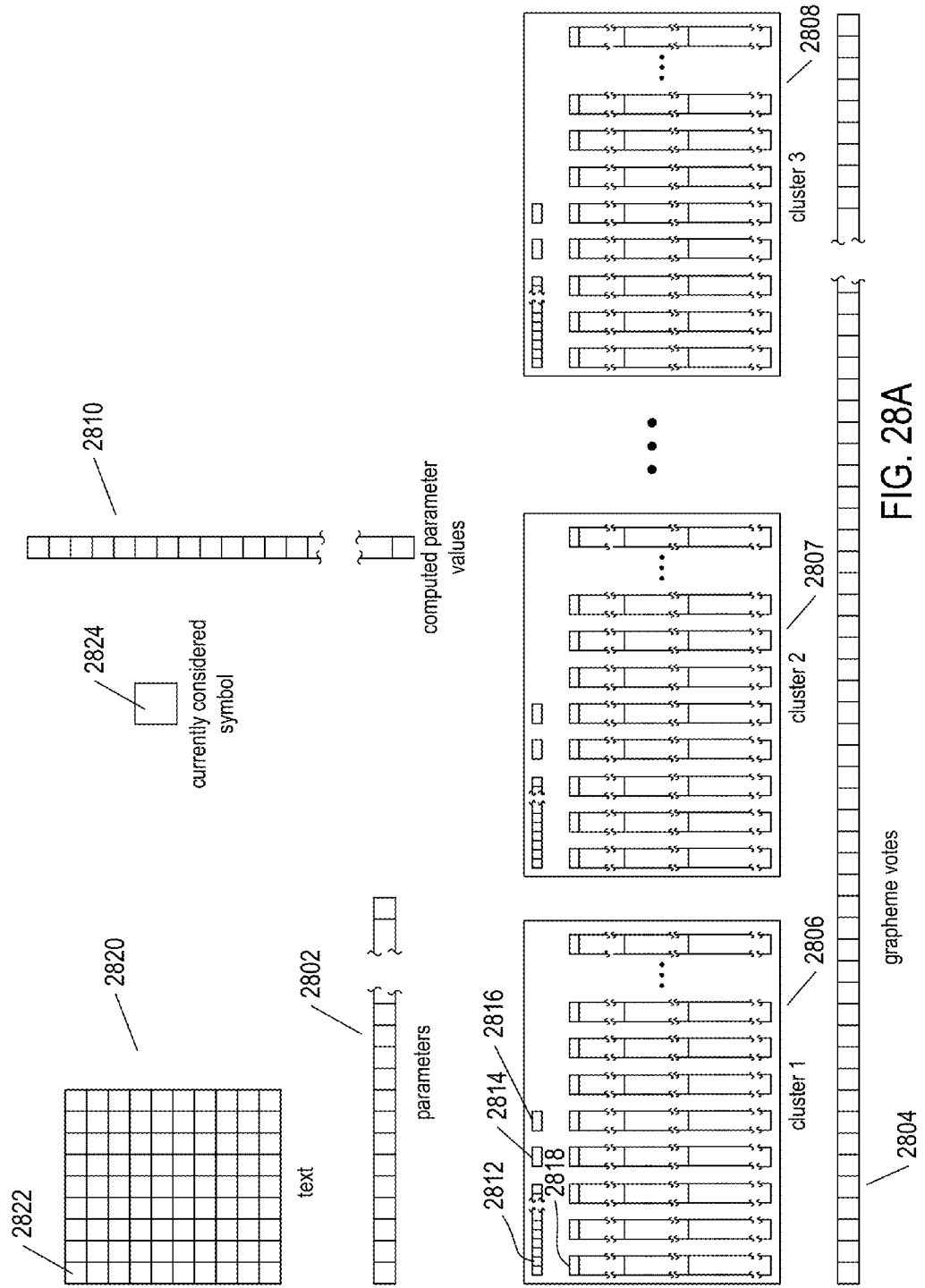

SYMBOL RECOGNITION USING DECISION FORESTS

CROSS-REFERENCE TO RELATED APPLICATIONS

This application is a Continuation-In-Part of U.S. patent application Ser. No. 14/565,782, filed Dec. 10, 2014. This application also claims the benefit of priority to Russian Patent Application No. 2014150945, filed Dec. 16, 2014; the disclosures of the priority applications are incorporated herein by reference in their entirety for all purposes.

TECHNICAL FIELD

The current application is directed to automated processing of scanned-document images and other text-containing images and, in particular, to methods and systems that efficiently convert symbol images extracted from scanned documents to digital encodings of the corresponding symbols using multiple clusters of symbol patterns and decision forests.

BACKGROUND

Printed, typewritten, and handwritten documents have long been used for recording and storing information. Despite current trends towards paperless offices, printed documents continue to be widely used in commercial, institutional, and home environments. With the development of modern computer systems, the creation, storage, retrieval, and transmission of electronic documents has evolved, in parallel with continued use of printed documents, into an extremely efficient and cost-effective alternative information-recording and information-storage medium. Because of overwhelming advantages in efficiency and cost effectiveness enjoyed by modern electronic-document-based information storage and information transactions, printed documents are routinely converted into electronic documents by various methods and systems, including conversion of printed documents into digital scanned-document images using electro-optico-mechanical scanning devices, digital cameras, and other devices and systems followed by automated processing of the scanned-document images to produce electronic documents encoded according to one or more of various different electronic-document-encoding standards. As one example, it is now possible to employ a desktop scanner and sophisticated optical-character-recognition ("OCR") control programs that control a personal computer to convert a printed-paper document into a corresponding electronic document that can be displayed and edited using a word-processing program.

While modern OCR systems have advanced to the point that complex printed documents that include pictures, frames, line boundaries, and other non-text elements as well as text symbols of any of many common alphabet-based languages can be automatically converted to electronic documents, challenges remain with respect to conversion of printed documents containing Chinese and Japanese characters or Korean morpho-syllabic blocks.

SUMMARY

The current document is directed to methods and systems for identifying symbols corresponding to symbol images in a scanned-document image or other text-containing image, with the symbols corresponding to Chinese or Japanese characters, to Korean morpho-syllabic blocks, or to symbols of other languages that use a large number of symbols for writing and printing. In one implementation, the methods and systems to which the current document is directed carry out an initial processing step on one or more scanned images to identify a set of graphemes that most likely correspond to each symbol image that occurs in the scanned document image. The graphemes are selected for a symbol image based on accumulated votes generated from symbol patterns identified as likely related to the symbol image using one or more decision forests.

BRIEF DESCRIPTION OF THE DRAWINGS

FIG. 1B illustrates a printed document.

FIG. 9 shows a table of parameter values computed for all of the symbols in the example symbol set shown in FIG. 6.

FIG. 13B illustrates the full set of parameter values for the hypothetical symbol set shown in FIG. 6.

FIG. 14B illustrates construction of four decision trees from four subsets of the hypothetical symbol set shown in FIG. 6.

FIG. 15B illustrates construction of four decision trees from four subsets of the hypothetical symbol set shown in FIG. 6.

FIG. 16B illustrates construction of four decision trees from four subsets of the hypothetical symbol set shown in FIG. 6.

FIG. 17B illustrates construction of four decision trees from four subsets of the hypothetical symbol set shown in FIG. 6.

FIG. 22B illustrates a second implementation of the routine "process" (2004 in FIG. 20).

FIG. 23 illustrates a third implementation of the routine "process," discussed in the previous subsection, using the same illustration and pseudocode conventions used in the previous subsection.

FIG. 25B illustrates preprocessing of a symbol image using the data structures discussed above with reference to FIG. 24.

FIG. 25C illustrates preprocessing of a symbol image using the data structures discussed above with reference to FIG. 24.

FIG. 28A illustrates the process of multi-cluster-data-structure symbol processing.

DETAILED DESCRIPTION

The current document is directed to methods and systems for identifying symbols corresponding to symbol images in a scanned-document image. In one implementation, the methods and systems to which the current document is directed carry out an initial processing step on one or more scanned images to identify a frequency at which each grapheme in a set of graphemes is associated with symbol patterns that match symbol images used in the scanned document image or images. A score is computed for each symbol pattern based on the frequencies of association of the graphemes referenced by the symbol pattern and the symbols patterns within each cluster of symbol patterns is sorted according to their scores. By ordering the symbol patterns, the most likely symbols patterns are first encountered during a second optical-character-recognition step in which symbol images are associated with one or more graphemes or symbol codes.

Scanned Document Images and Electronic Documents

Figure 1A:
FIG. 1A illustrates a printed document

FIGS. 1A-B illustrates a printed document. FIG. 1A shows the original document with Japanese text. The printed document 100 includes a photograph 102 and five different text-containing regions 104-108 that include Japanese characters. This is an example document used in the following discussion of the method and systems for sense-orientation determination to which the current application is directed. The Japanese text may be written in left-to-right fashion, along horizontal rows, as English is written, but may alternatively be written in top-down fashion within vertical columns. For example, region 107 is clearly written vertically while text block 108 includes text written in horizontal rows. FIG. 1B shows the printed document illustrated in FIG. 1A translated into English.

Figure 2:
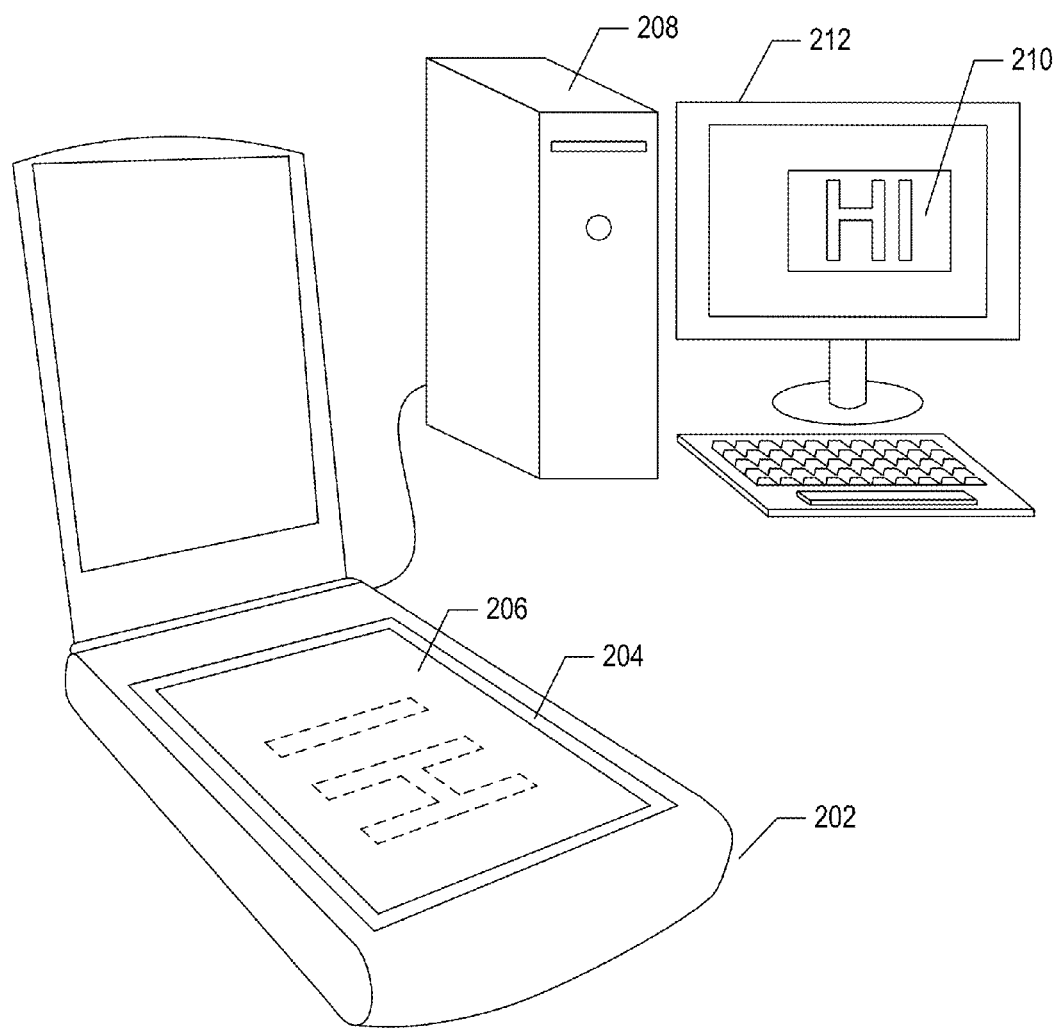
FIG. 2 illustrates a typical desktop scanner and personal computer that are together used to convert printed documents into digitally encoded electronic documents stored in mass-storage devices and/or electronic memories.

Printed documents can be converted into digitally encoded, scanned-document images by various means, including electro-optico-mechanical scanning devices and digital cameras. FIG. 2 illustrates a typical desktop scanner and personal computer that are together used to convert printed documents into digitally encoded electronic documents stored in mass-storage devices and/or electronic memories. The desktop scanning device 202 includes a transparent glass bed 204 onto which a document is placed, face down 206. Activation of the scanner produces a digitally encoded scanned-document image which may be transmitted to the personal computer ("PC") 208 for storage in a mass-storage device. A scanned-document-image-rendering program may render the digitally encoded scanned-document image for display 210 on a PC display device 212.

Figure 3:
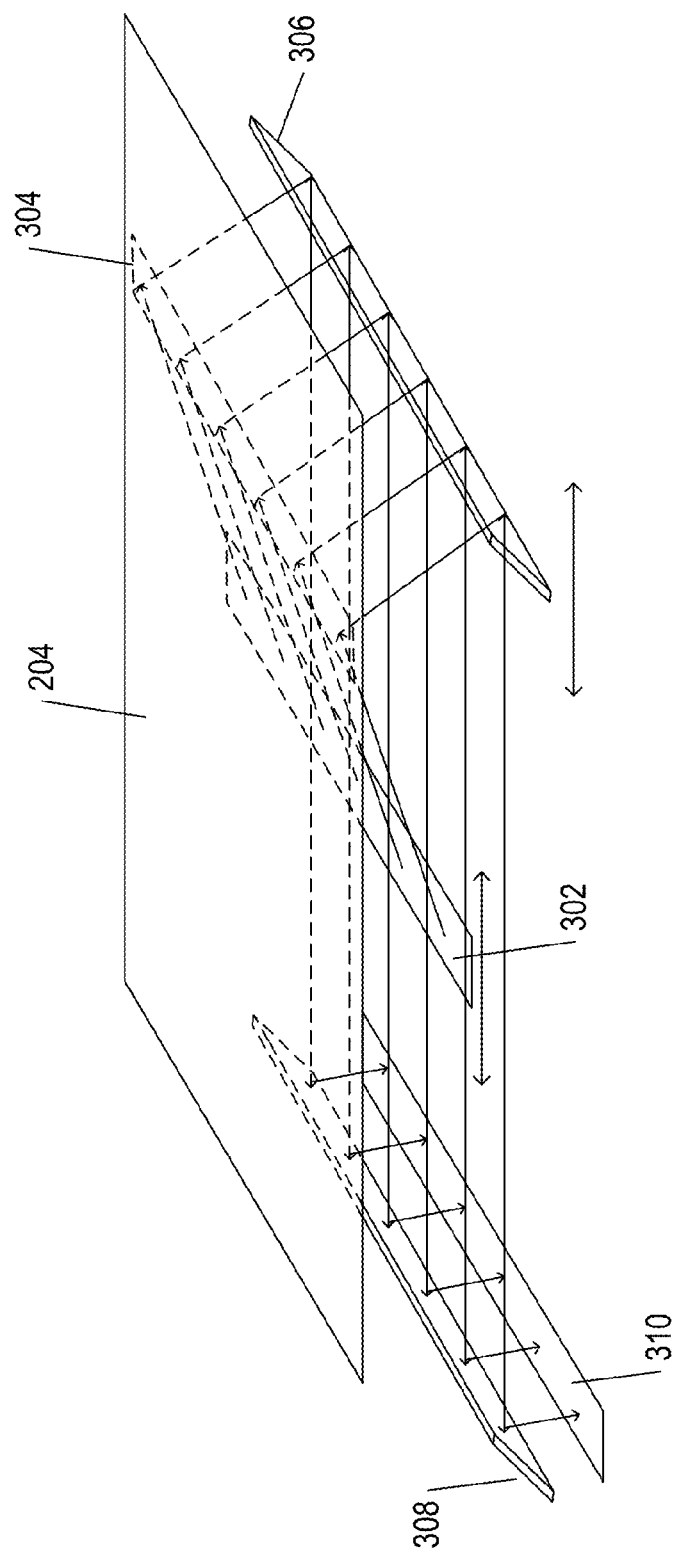
FIG. 3 illustrates operation of the optical components of the desktop scanner shown in FIG. 2.

FIG. 3 illustrates operation of the optical components of the desktop scanner shown in FIG. 2. The optical components in this charge-coupled-device ("CCD") scanner reside below the transparent glass bed 204. A laterally translatable bright-light source 302 illuminates a portion of the document being scanned 304 which, in turn, re-emits and reflects light downward. The re-emitted and reflected light is reflected by a laterally translatable mirror 306 to a stationary mirror 308, which reflects the emitted light onto an array of CCD elements 310 that generate electrical signals proportional to the intensity of the light falling on each of the CCD elements. Color scanners may include three separate rows or arrays of CCD elements with red, green, and blue filters. The laterally translatable bright-light source and laterally translatable mirror move together along a document to produce a scanned-document image. Another type of scanner is referred to as a "contact-image-sensor scanner" ("CIS scanner"). In a CIS scanner, moving colored light-emitting diodes ("LEDs") provide document illumination, with light reflected from the LEDs sensed by a photodiode array that moves together with the colored light-emitting diodes.

Figure 4:
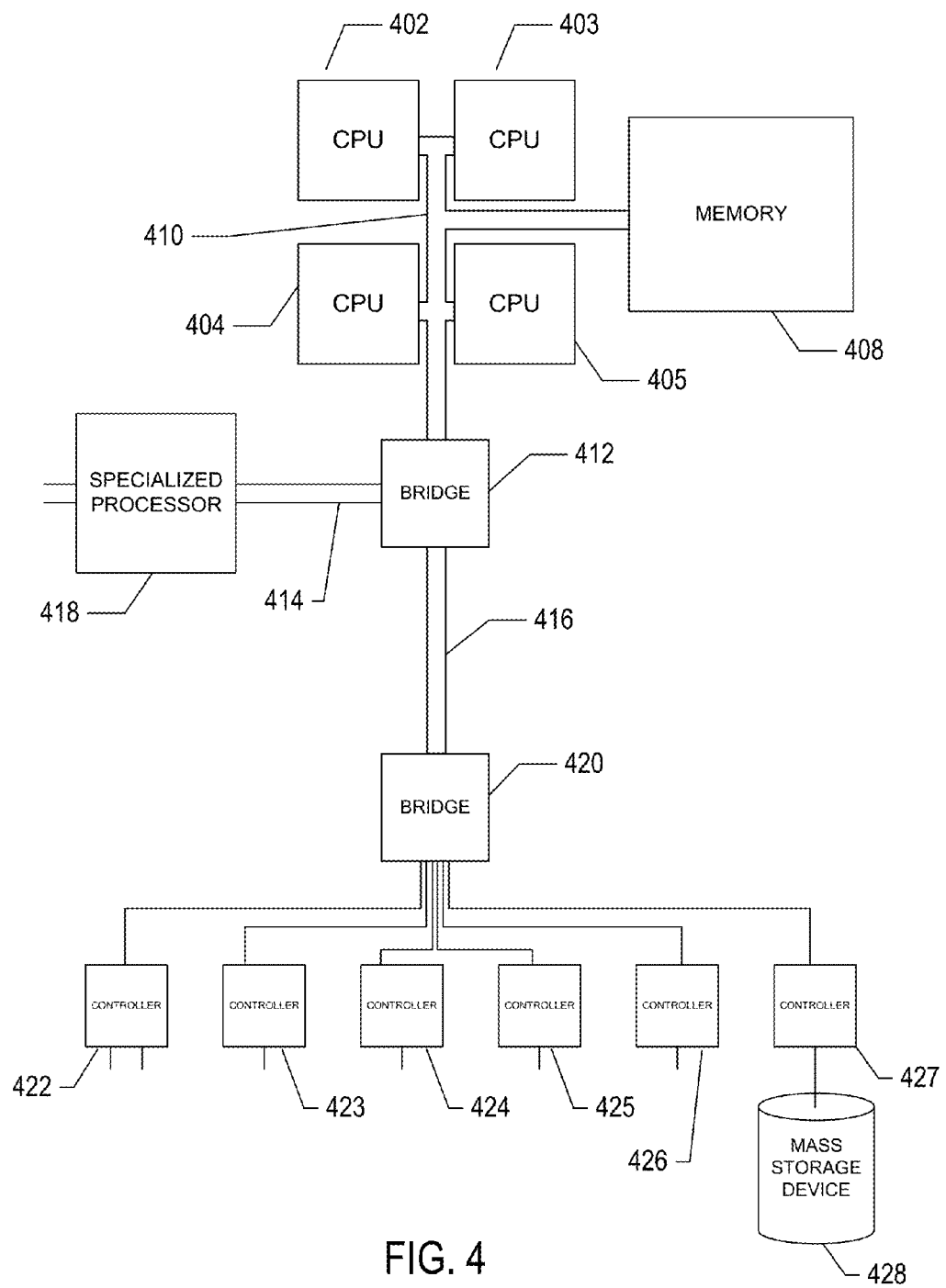
FIG. 4 provides a general architectural diagram for various types of computers and other processor-controlled devices.

FIG. 4 provides a general architectural diagram for various types of computers and other processor-controlled devices. The high-level architectural diagram may describe a modern computer system, such as the PC in FIG. 2, in which scanned-document-image-rendering programs and optical-character-recognition programs are stored in mass-storage devices for transfer to electronic memory and execution by one or more processors to transform the computer system into a specialized optical-character-recognition system. The computer system contains one or multiple central processing units ("CPUs") 402-405, one or more electronic memories 408 interconnected with the CPUs by a CPU/memory-subsystem bus 410 or multiple busses, a first bridge 412 that interconnects the CPU/memory-subsystem bus 410 with additional busses 414 and 416, or other types of high-speed interconnection media, including multiple, high-speed serial interconnects. These busses or serial interconnections, in turn, connect the CPUs and memory with specialized processors, such as a graphics processor 418, and with one or more additional bridges 420, which are interconnected with high-speed serial links or with multiple controllers 422-427, such as controller 427, that provide access to various different types of mass-storage devices 428, electronic displays, input devices, and other such components, subcomponents, and computational resources.

Figure 5:
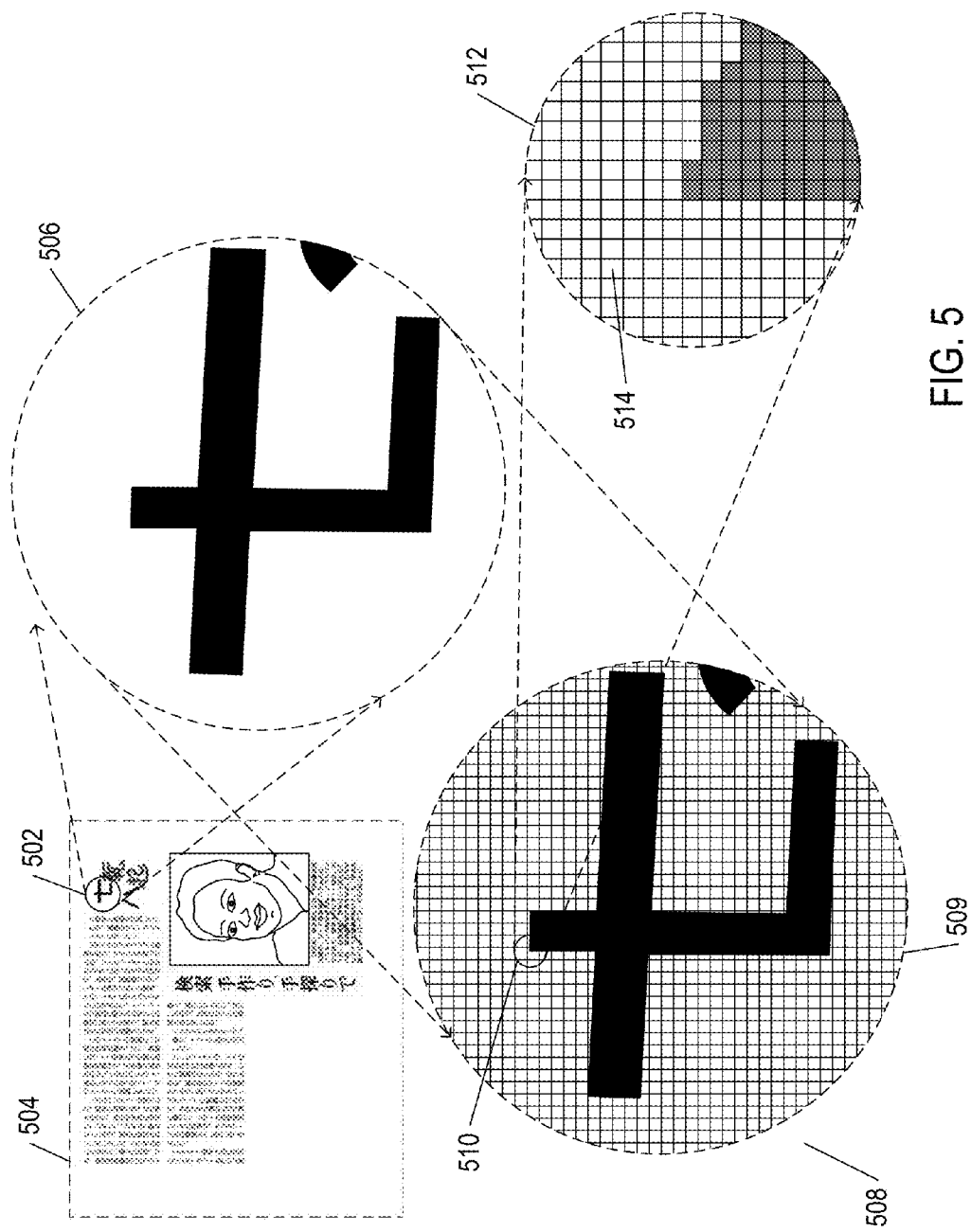
FIG. 5 illustrates digital representation of a scanned document.

FIG. 5 illustrates digital representation of a scanned document. In FIG. 5, a small disk-shaped portion 502 of the example printed document 504 is shown magnified 506. A corresponding portion of the digitally encoded scanned-document image 508 is also represented in FIG. 5. The digitally encoded scanned document includes data that represents a two-dimensional array of pixel-value encodings. In the representation 508, each cell of a grid below the characters, such as cell 509, represents a square matrix of pixels. A small portion 510 of the grid is shown at even higher magnification, 512 in FIG. 5, at which magnification the individual pixels are represented as matrix elements, such as matrix element 514. At this level of magnification, the edges of the characters appear jagged, since the pixel is the smallest granularity element that can be controlled to emit specified intensities of light. In a digitally encoded scanned-document file, each pixel is represented by a fixed number of bits, with the pixel encodings arranged sequentially. Header information included in the file indicates the type of pixel encoding, dimensions of the scanned image, and other information that allows a digitally encoded scanned-document-image rendering program to extract the pixel encodings and issue commands to a display device or printer to reproduce the pixel encodings in a two-dimensional representation of the original document. Scanned-document images digitally encoded in monochromatic grayscale commonly use 8-bit or 16-bit pixel encodings, while color scanned-document images may use 24 bits or more to encode each pixel according to various different color-encoding standards. As one example, the commonly used RGB standard employs three 8-bit values encoded within a 24-bit value to represent the intensity of red, green, and blue light. Thus, a digitally encoded scanned image generally represents a document in the same fashion that visual scenes are represented in digital photographs. Pixel encodings represent light intensity in particular, tiny regions of the image and, for colored images, additionally represent a color. There is no indication, in a digitally encoded scanned-document image, of the meaning of the pixels encodings, such as indications that a small two-dimensional area of contiguous pixels represents a text character. Sub-images corresponding to symbol images can be processed to produce a bit for the symbol image, in which bits with value "1" correspond to the symbol image and bits with value "0"

correspond to background. Bit maps are convenient for representing both extracted symbol images as well as patterns used by an OCR system to recognize particular symbols.

By contrast, a typical electronic document produced by a word-processing program contains various types of line-drawing commands, references to image representations, such as digitally encoded photographs, and digitally encoded text characters. One commonly used encoding standard for text characters is the Unicode standard. The Unicode standard commonly uses 8-bit bytes for encoding American Standard Code for Information Exchange ("ASCII") characters and 16-bit words for encoding symbols and characters of many languages, including Japanese, Mandarin, and other non-alphabetic-character-based languages. A large part of the computational work carried out by an OCR program is to recognize images of text characters in a digitally encoded scanned-document image and convert the images of characters into corresponding Unicode encodings. Clearly, encoding text characters in Unicode takes far less storage space than storing pixilated images of text characters. Furthermore, Unicode-encoded text characters can be edited, reformatted into different fonts, and processed in many additional ways by word-processing programs while digitally encoded scanned-document images can only be modified through specialized image-editing programs.

In an initial phase of scanned-document-image-to-electronic-document conversion, a printed document, such as the example document 100 shown in FIG. 1, is analyzed to determine various different regions within the document. In many cases, the regions may be logically ordered as a hierarchical acyclic tree, with the root of the tree representing the document as a whole, intermediate nodes of the tree representing regions containing smaller regions, and leaf nodes representing the smallest identified regions. The tree representing the document includes a root node corresponding to the document as a whole and six leaf nodes each corresponding to one of the identified regions. The regions can be identified using a variety of different techniques, including many different types of statistical analyses of the distributions of pixel encodings, or pixel values, over the area of the image. For example, in a color document, a photograph may exhibit a larger variation in color over the area of the photograph as well as higher-frequency variations in pixel-intensity values than regions containing text.

Once an initial phase of analysis has determined the various different regions of a scanned-document image, those regions likely to contain text are further processed by OCR routines in order to identify text characters and convert the text characters into Unicode or some other character-encoding standard. In order for the OCR routines to process text-containing regions, an initial orientation of the text-containing region is determined so that various pattern-matching methods can be efficiently employed by the OCR routines to identify text characters. It should be noted that the images of documents may not be properly aligned within scanned-document images due to positioning of the document on a scanner or other image-generating device, due to non-standard orientations of text-containing regions within a document, and for other reasons. The text-containing regions are then partitioned into sub-images that contain individual characters or symbols, and these sub-images are then generally scaled and oriented, and the symbol images are centered within the sub-image to facilitate subsequent automated recognition of the symbols that correspond to the symbol images.

Example OCR Methods and Systems

Figure 6:
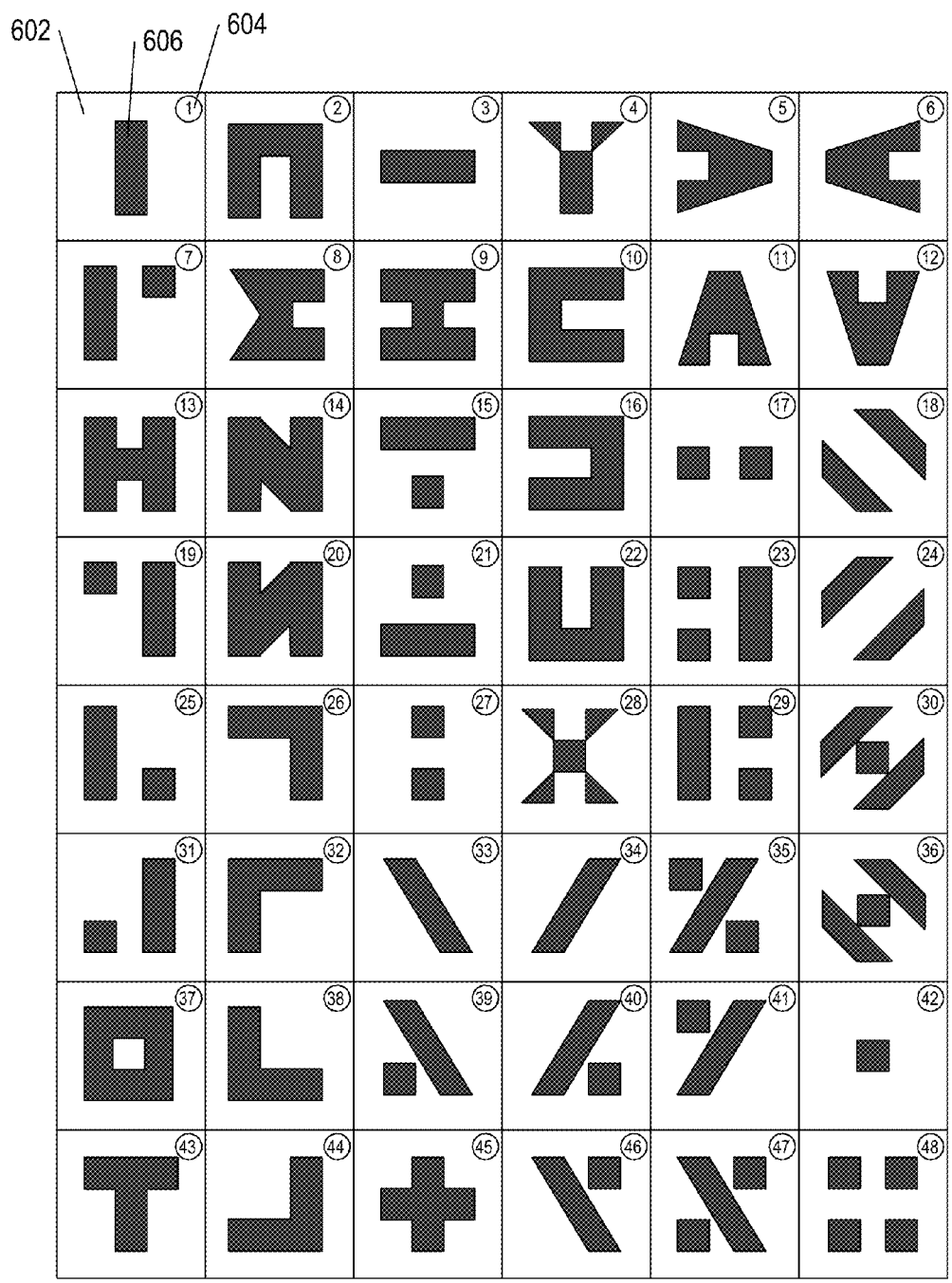
FIG. 6 shows a hypothetical symbol set.

In order to provide a concrete discussion of various optical-character-recognition techniques, an example symbol set for a hypothetical language is used. FIG. 6 shows a hypothetical symbol set. In FIG. 6, 48 different symbols are shown within each of 48 rectangular regions, such as rectangular region 602. In the right-hard corner of each rectangular region, a numerical index or code for the symbol is shown inscribed within a circle, such as the index or code "1" 604 corresponding to the first symbol 606 shown in rectangular region 602. The example is chosen for illustration of both currently existing OCR methods and systems as well as new OCR methods and systems disclosed in the current document. In fact, for character-based written languages, including Chinese and Japanese, there may be many tens of thousands of different symbols used for printing and writing the language.

Figure 7A:
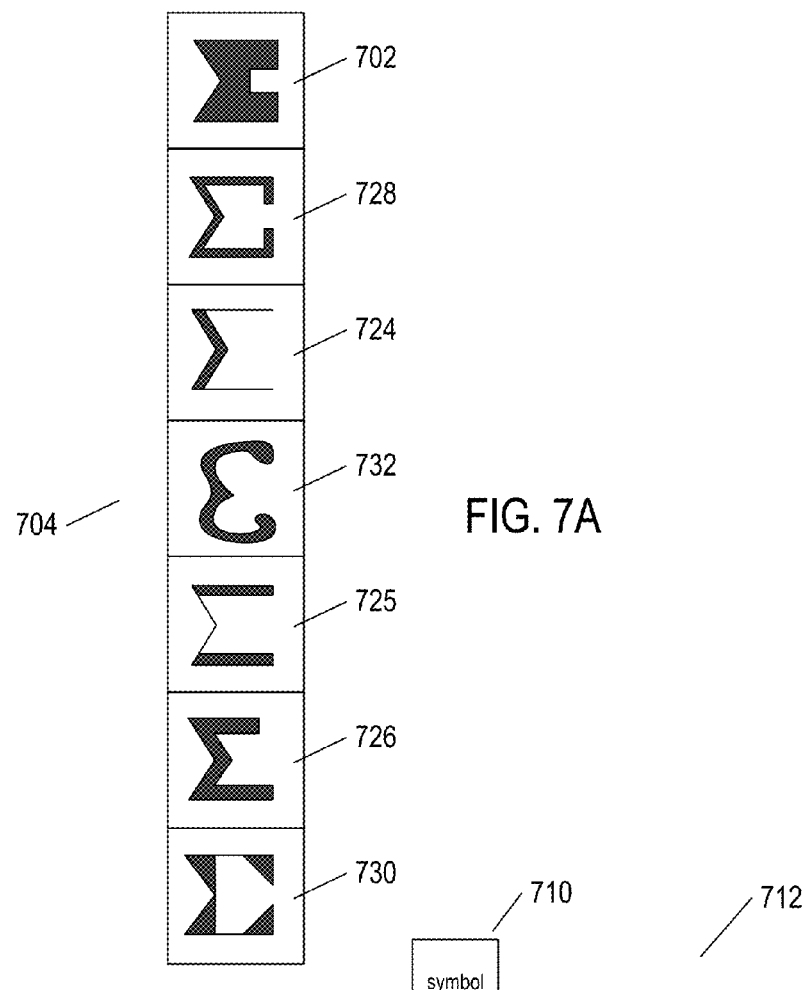
FIG. 7A illustrates various aspects of symbol sets for natural languages.
Figure 7B:
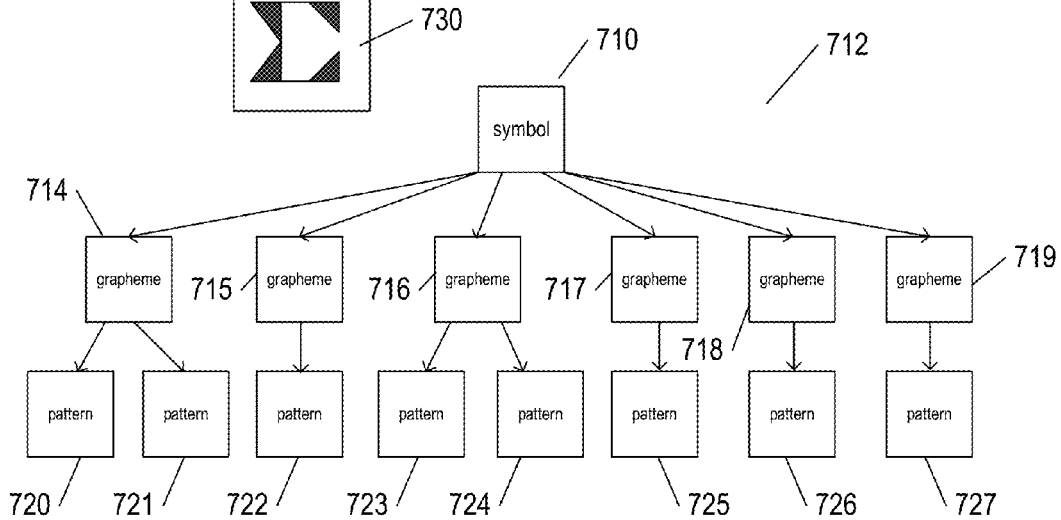
FIG. 7B illustrates various aspects of symbol sets for natural languages.

FIGS. 7A-B illustrate various aspects of symbol sets for natural languages. In FIG. 7A, a column of different forms of the eighth symbol in the symbol set shown in FIG. 6 is provided. The eighth symbol 702 of the symbol set shown in FIG. 6 is followed, in a column 704, by different forms of the symbol in different styles of text. In many natural languages, there may be many different text styles and alternative written forms for a given symbol.

FIG. 7B shows various different concepts related to symbols of a natural language. In FIG. 7B, a particular symbol of a natural language is represented by node 710 in graph 712. A particular symbol may have numerous different general written or printed forms. For OCR purposes, each of these different general forms constitutes a grapheme. In certain cases, a particular symbol may comprise two or more graphemes. For example, Chinese characters may comprise a combination of two or more graphemes, each of which occurs in additional characters. The Korean language is actually alphabetic, with Korean morpho-syllabic blocks containing a number of alphabetic characters in different positions. Thus, a Korean morpho-syllabic block may represent a higher-level symbol composed of multiple grapheme components. For symbol 710 shown in FIG. 7B, there are six different graphemes 714-719. There are, in addition, one or more different printed or written renderings of a grapheme, each rendering represented by a pattern. In FIG. 7B, graphemes 714 and 716 each has two alternative renderings represented by patterns 720 and 721 and 723-724, respectively. Graphemes 715 and 717-719 are each associated with a single pattern, patterns 722 and 725-727, respectively. For example, the eighth symbol of the example symbol set, shown in FIG. 6, may be associated with three graphemes, including one grapheme that encompasses renderings 702, 724, 725, and 726, a second grapheme that encompasses renderings 728 and 730, and a third grapheme that encompasses rendering 732. In this case, the first grapheme has straight horizontal members, the second grapheme has horizontal members with right-hand, short vertical members, and the third grapheme includes curved, rather than straight, features. Alternatively, all of the renderings of the eighth symbol 702, 728, 724, 732, 725, 726, and 730 may be represented as patterns associated with a single grapheme for the eighth symbol. To a certain extent, the choice of graphemes is somewhat arbitrary. In certain types of character-based languages, there may be many thousands of different graphemes. Patterns can be thought of as alternative renderings or images, and may be represented by a set of parameter/parameter-value pairs, as discussed below.

Figure 7C:
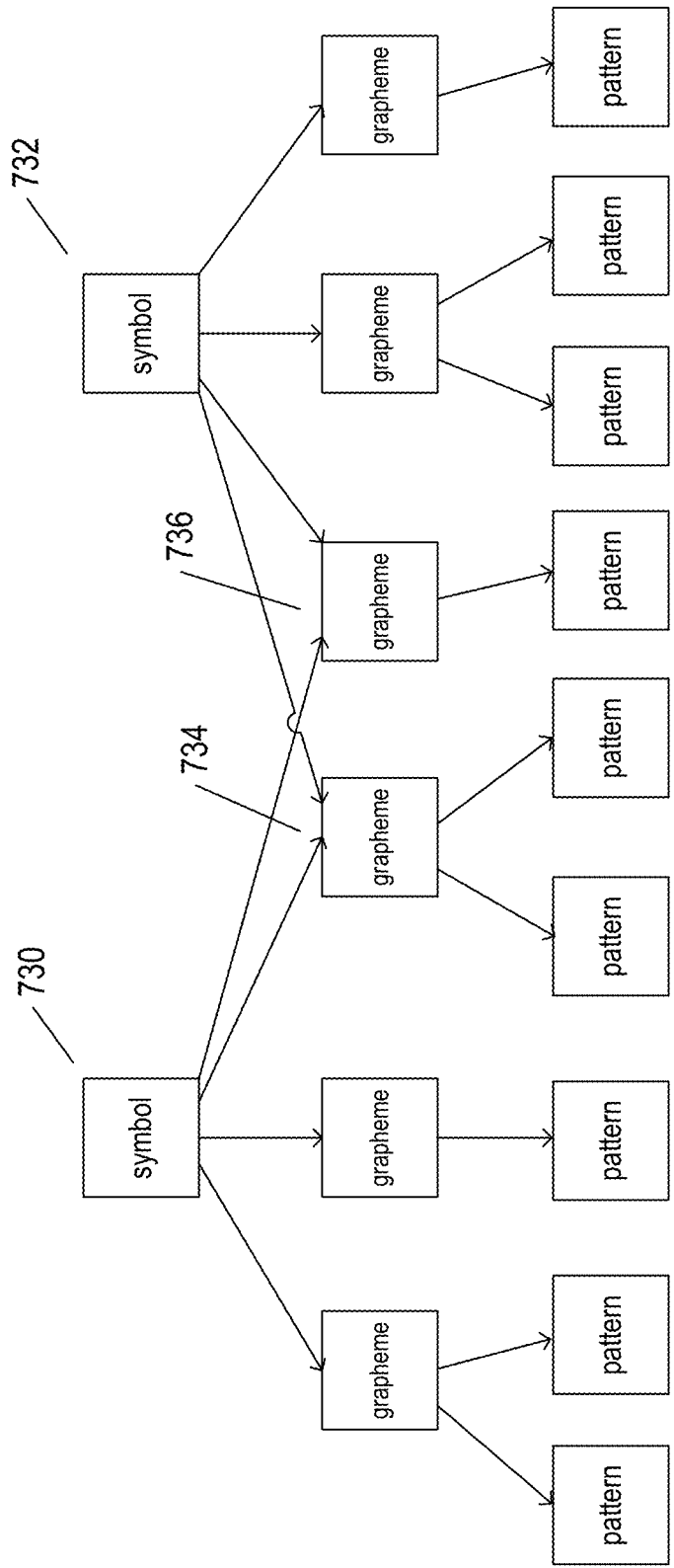
FIG. 7C illustrates various aspects of symbol sets for natural languages.

In fact, although the relationships between symbols, graphemes, and patterns is shown, in FIG. 7B, as being strictly hierarchical, with each grapheme related to a single, particular parent symbol, the actual relationships may not be so simply structured. FIG. 7C illustrates a slightly more complex set of relationships, in which two symbols 730 and 732 are both parents of two different graphemes 734 and 736. As one example, the English-language symbols "o," the lower-case letter, "O," the upper-case letter, "0," the digit zero, and "°", the symbol for degree, may all be associated with a circle-like grapheme. The relationships might alternatively be represented as graphs or networks. In certain cases, graphemes, rather than, or in addition to, symbols might be shown at the highest levels within the representation. In essence, there is a significant degree of arbitrariness in the symbols, graphemes, and patterns identified for a particular language and the relationships between them.

Figure 8A:
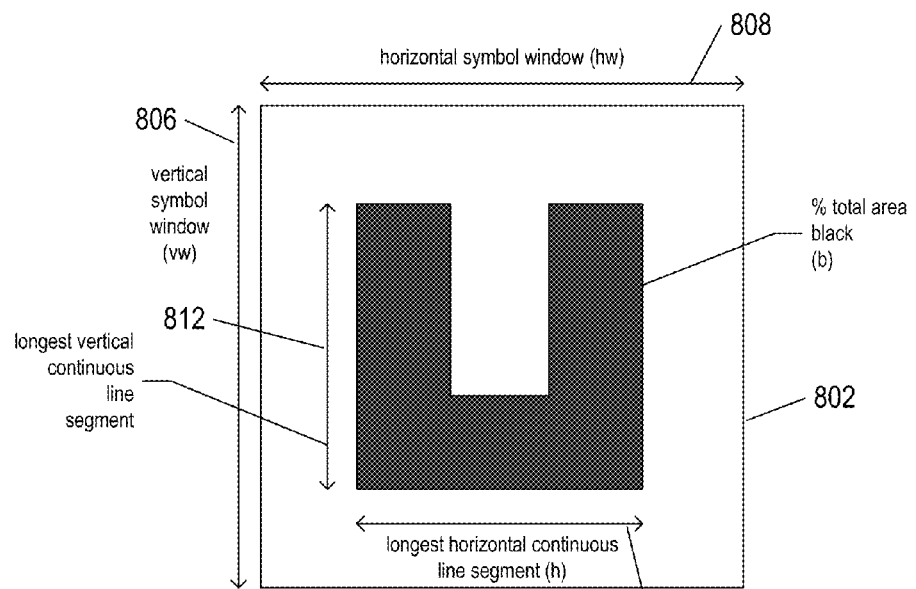
FIG. 8A illustrates parameters and parameter values computed with respect to symbol images.
Figure 8B:
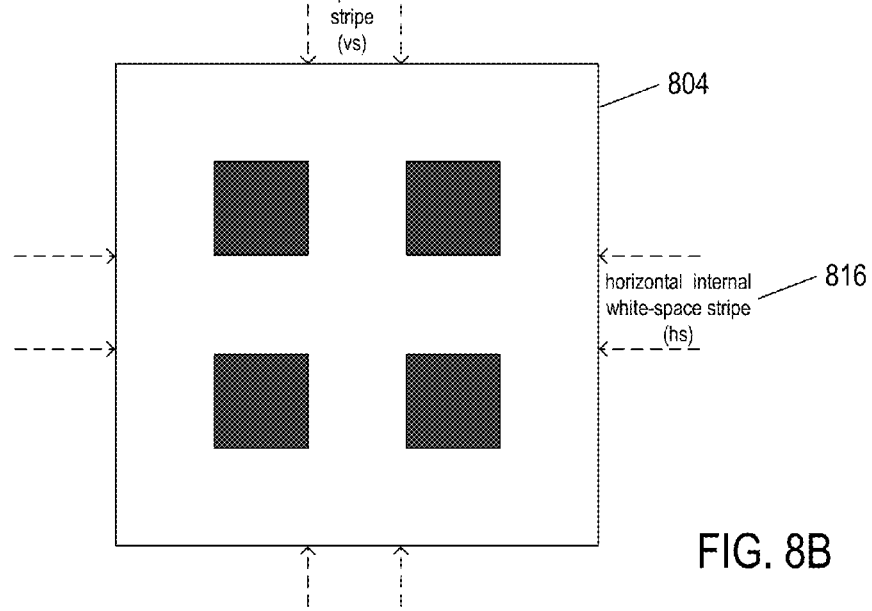
FIG. 8B illustrates parameters and parameter values computed with respect to symbol images.

FIGS. 8A-B illustrate parameters and parameter values computed with respect to symbol images. Note that the phrase "symbol image" may describe a printed, written, or displayed rendering of a symbol or grapheme. In the following example, parameters and parameter values are discussed with respect to images of symbols, but, in an actual real-language context, the parameters and parameter values are often used to characterize and represent images of graphemes. FIG. 8A shows a rectangular symbol image 802 extracted from a text-containing image that includes an image of the $22^{nd}$ symbol in the example symbol set shown in FIG. 6. FIG. 8B includes a rectangular symbol image 804 extracted from the text-containing image corresponding to the $48^{th}$ symbol in the example symbol set shown in FIG. 6. In printing and writing of the hypothetical language corresponding to the example symbol set, the symbols are centered within rectangular symbol areas. When this is not the case, initial processing steps carried out by OCR systems may reorient, rescale, and reposition extracted symbol images with respect to a background area in order to normalize extracted symbol images for subsequent processing steps.

FIG. 8A illustrates three different parameters that may be used by an OCR system to characterize symbols. Note that the area of the symbol image, or symbol window, is characterized by a vertical symbol-window dimension 806, abbreviated "vw") and a horizontal symbol-window dimension 808, referred to as "hw." A first parameter is the longest horizontal continuous line segment within the symbol image, referred to as "h" 810. This is the longest sequence of contiguous dark pixels within the generally white-pixel background of the symbol window. A second parameter is the longest vertical continuous line segment 812 within the symbol image. A third parameter is the percentage of pixels in the symbol window corresponding to the symbol image, in the current case, the percentage of black pixels within the generally white symbol window. In all three cases, parameter values can be straightforwardly computed once a bitmap for the symbol window has been generated. FIG. 8B shows two additional parameters. The first parameter is the number of horizontal, internal white-space stripes within the symbol image, with the symbol represented by the symbol image shown in FIG. 8B having a single horizontal internal white-space stripe 816. A second parameter is the number of vertical internal white-space stripes within the symbol image. For the $48^{th}$ symbol of the symbol set, represented by the image within the symbol window 804 shown in FIG. 8B, there is a single vertical internal white-space stripe 818. The number of horizontal white-space stripes is referred to as "hs" and the number of internal vertical white-space stripes is referred to as "vs."

FIG. 9 shows a table of parameter values computed for all of the symbols in the example symbol set shown in FIG. 6. In the table 902 shown in FIG. 9, calculated parameter values for a particular symbol are shown in each row of the table. The parameters include: (1) the longest horizontal continuous line segment relative to the symbol window, $$\frac{h}{hw},$$

904; (2) the longest vertical continuous line segment relative to the vertical symbol-window dimension, $$\frac{v}{vw},$$

906; (3) the percent total area corresponding to the symbol image, or black space, b, 908; (4) the number of internal vertical stripes, vs, 910; (5) the number of horizontal internal stripes, hs, 912; (6) the sum of the number of internal vertical stripes and horizontal stripes, vs+hs, 914; and (7) the ratio of the longest vertical line segment to the longest horizontal line segment, $$\frac{v}{h},$$

916. Thus considering the first row 920 of table 902 in FIG. 9, the first symbol of the symbol set (606 in FIG. 6) is a vertical bar, and thus, as would be expected, the numeric value of $$\frac{v}{vw},$$

0.6, is significantly greater than the numeric value of $$\frac{h}{hw},$$

0.2. Symbol 606 represents only 12 percent of the entire symbol window 602. There are no internal horizontal or vertical white spaces within symbol 606, and thus vs, hs, and vs+hs are all 0. The ratio $$\frac{v}{h}$$

is 3. Because the example symbols are all relatively simple and block-like, there are relatively few different values for each of the parameters in table 902.

Figure 10:
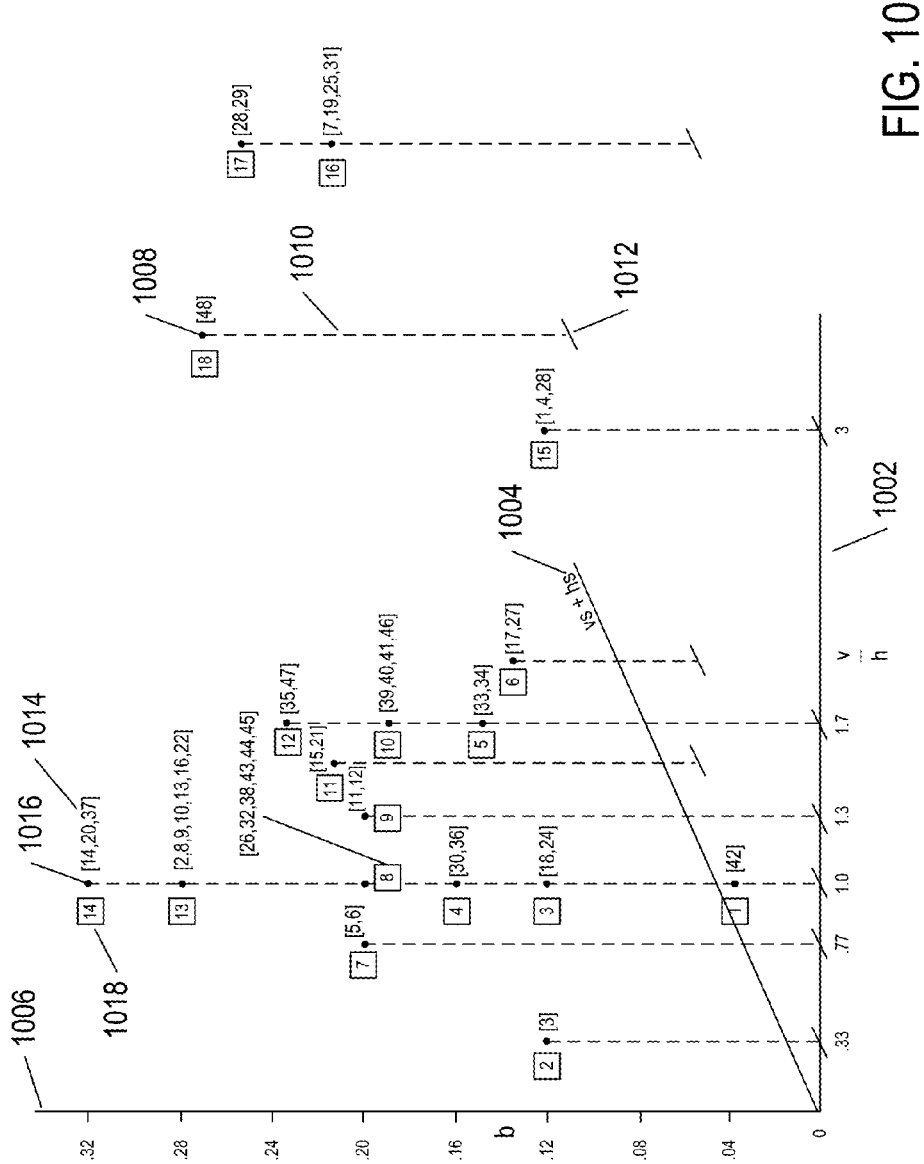
FIG. 10 illustrates a three-dimensional plot of the symbols of the example set of symbols shown in FIG. 6 within a three-dimensional space, where the dimensions represent values of each of three different parameters.

Despite the fact that each of the parameters discussed above with reference to FIG. 9 have only relatively few different parameters values with respect to the 48 example characters, only three of the parameters are sufficient to partition the example characters into 18 partitions, or clusters. FIG. 10 illustrates a three-dimensional plot of the symbols of the example set of symbols shown in FIG. 6 within a three-dimensional space, where the dimensions represent values of each of three different parameters. In FIG. 10, a first horizontal axis 1002 represents the parameter $$\frac{v}{h}$$

Figure 11A:
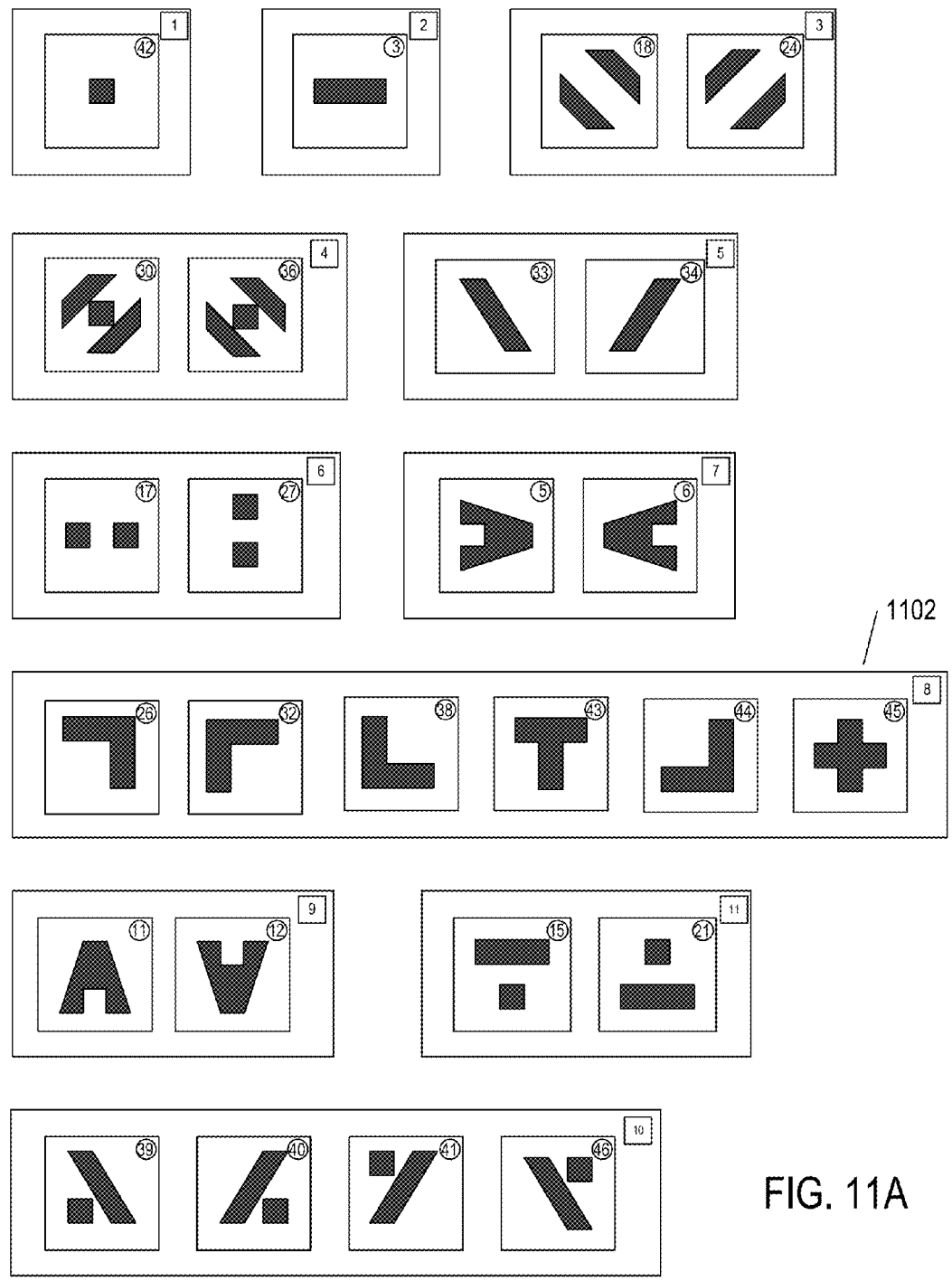
FIG. 11A shows the symbols contained in each of the clusters represented by points in the three-dimensional space shown in FIG. 10.
Figure 11B:
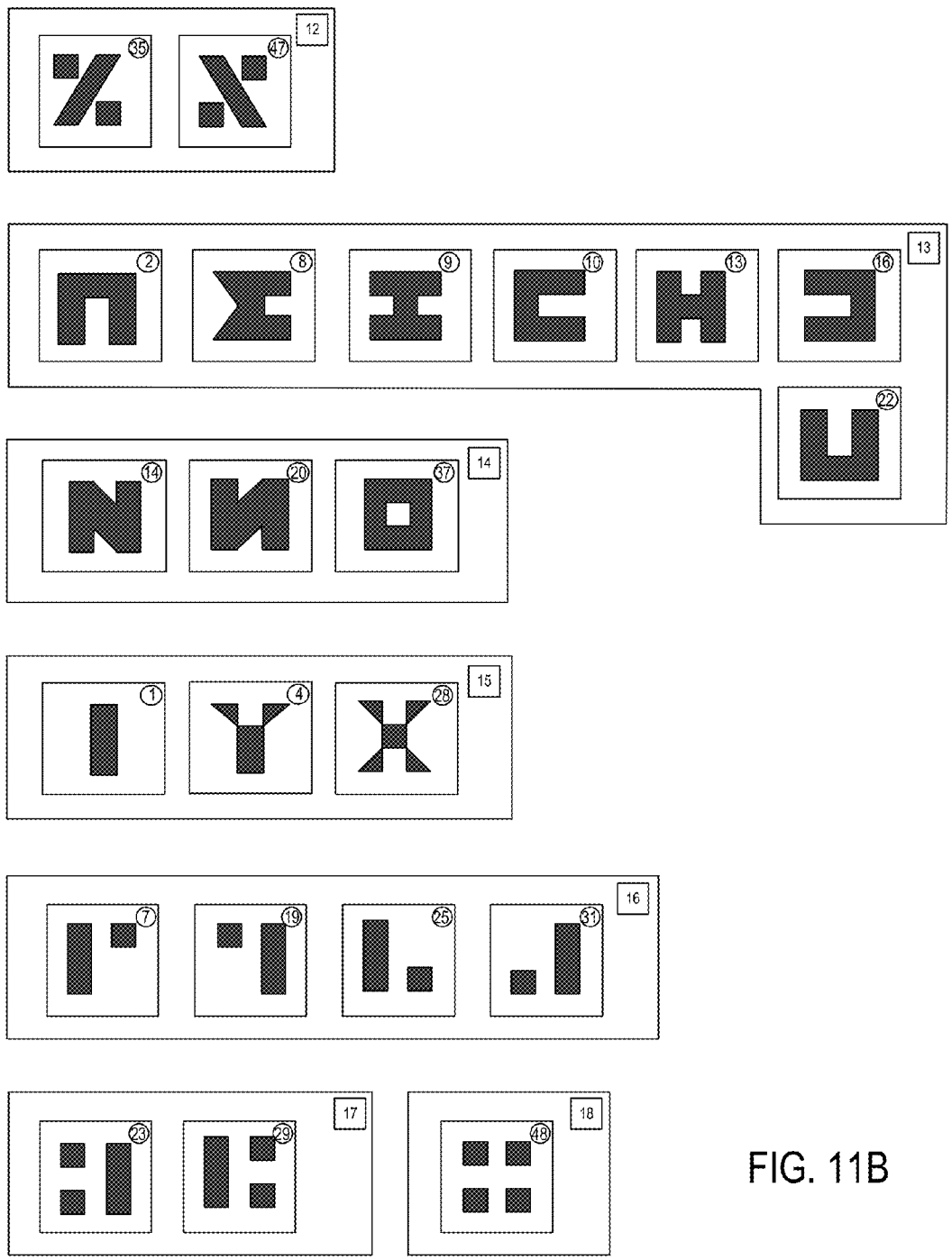
FIG. 11B shows the symbols contained in each of the clusters represented by points in the three-dimensional space shown in FIG. 10.

(916 in FIG. 9), a second horizontal axis 1004 represents the parameter vs+hs (914 in FIG. 9), and a third, vertical axis 1006 represents the parameter b (908 in FIG. 9). There are 18 different plotted points, such as plotted point 1008, each shown as a small darkened disk, with the vertical projection of the point down to the horizontal plane that includes axes 1002 and 1004 represented by a vertical dashed line, such as vertical dashed line 1010 connecting point 1008 to its projection on the horizontal plane 1012. The code or sequence number for the symbols that map to a particular point are shown within brackets to the right of the point. For example, symbols 14, 20, and 37 (1014) all map to point 1016 with coordinates (1, 0, 0.32) with respect to axes 1002, 1004, and 1006. Each point is associated with a partition or cluster number in a small rectangle to the left of the point. For example, point 1016 is associated with cluster number "14" 1018. FIGS. 11A-B show the symbols contained in each of the clusters represented by points in the three-dimensional space shown in FIG. 10. As can be readily observed from the symbol contents of these clusters, or partitions, the three parameters employed to distribute the symbols within the three-dimensional space shown in FIG. 10 are actually effective in partitioning the 48 example symbols into related sets of symbols.

Figure 12A:
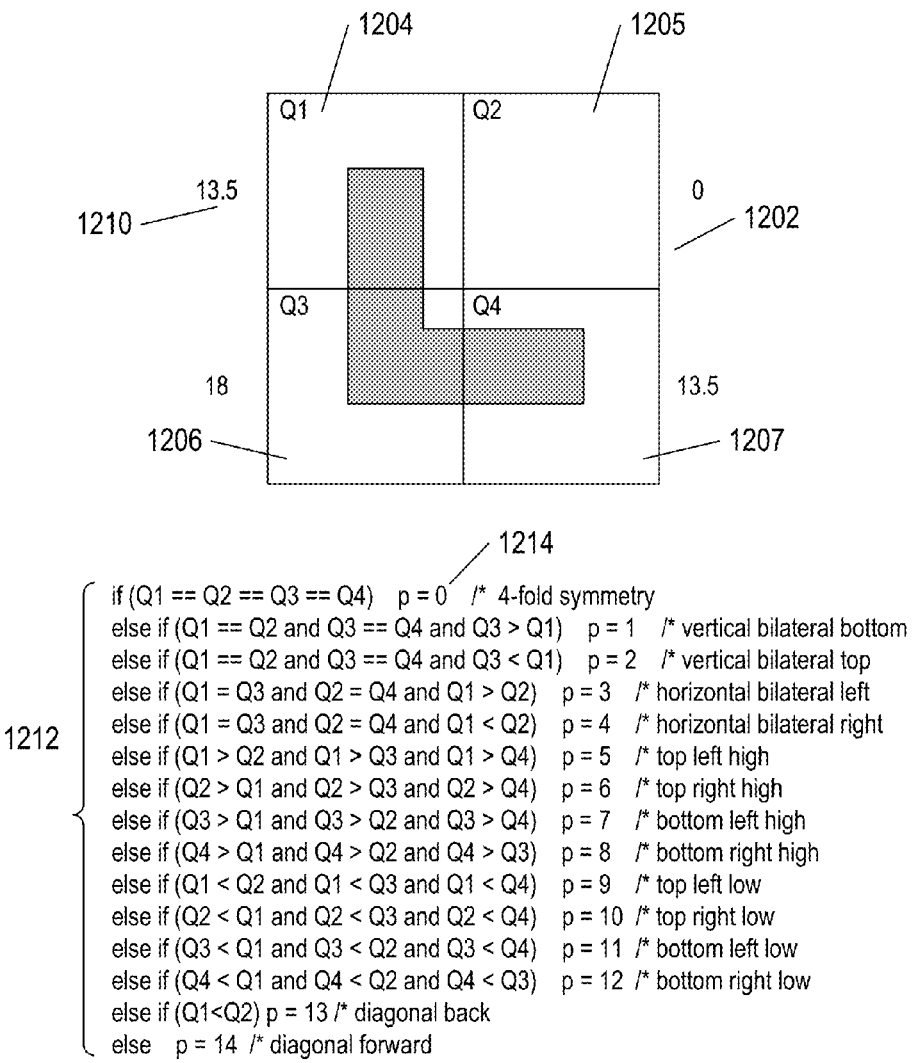
FIG. 12A illustrates a different parameter that can be used, in combination with the three parameters corresponding to dimensions in the three-dimensional parameter space shown in FIG. 10, to fully distinguish each of the symbols in cluster 8.
Figure 12B:
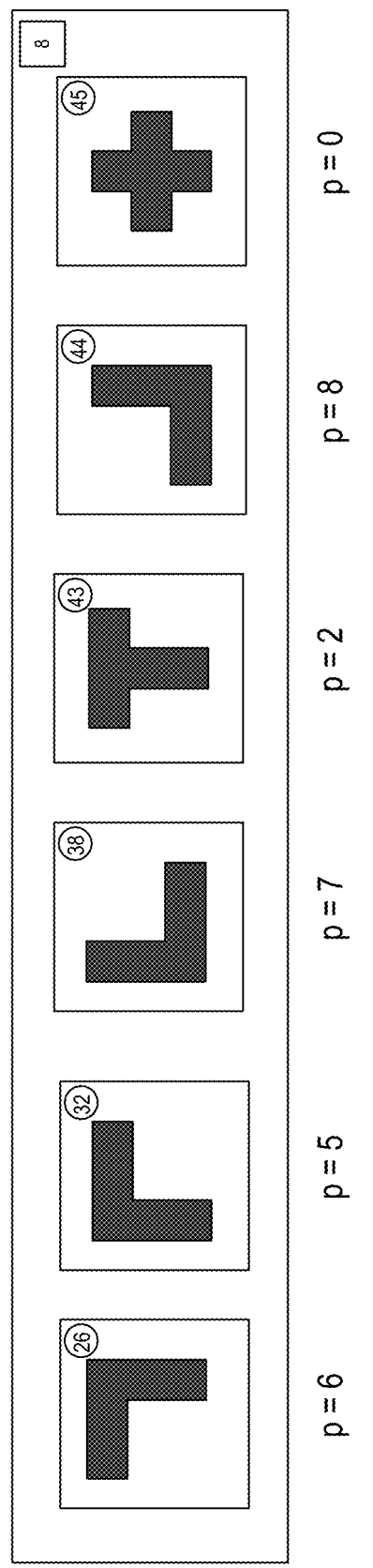
FIG. 12B illustrates the value of the additional parameter, discussed with reference to FIG. 12A, for each of the symbols in cluster 8.

Additional parameters can be used in order to uniquely distinguish each symbol within each cluster or partition. Consider, for example, cluster 8 (1102) shown in FIG. 11A. This cluster of symbols includes four angular, "L"-like symbols with four-fold rotational variations have symbol codes 26, 32, 38, and 44, as well as the "T"-like symbol with symbol code 43 and the cross-sign-like symbol with symbol code 45. FIG. 12A illustrates a different parameter that can be used, in combination with the three parameters corresponding to dimensions in the three-dimensional parameter space shown in FIG. 10, to fully distinguish each of the symbols in cluster 8. In the following, this parameter is referred to asp. As shown in the symbol window 1202 in FIG. 12A, the symbol window is divided into four quadrants Q1 1204, Q2 1205, Q3 1206, and Q4 1207. The number of units of area within the quadrant occupied by the symbol image is then computed and shown adjacent to the quadrant. For example, 13.5 units of area 1210 are occupied by the portion of the symbol image in quadrant Q1 1204. These values for the number of units of area within each quadrant are then assigned to the variables Q1, Q2, Q3, and Q4. Thus, in the example shown in FIG. 12A, the variable Q1 is assigned the value 13.5, the variable Q2 is assigned the value 0, the variable Q3 is assigned the value 18, and the variable Q4 is assigned the value 13.5. Then, the value for the new parameter p is computed according to the small pseudocode snippet 1212 shown in FIG. 12A below the symbol window. For example, when all four variables Q1, Q2, Q3, and Q4 have the same value, then the parameter p is assigned the value 0 (1214), indicating a four-fold symmetry in the symbol window with respect to the number of units of area occupied by the symbol image. FIG. 12B illustrates the value of the additional parameter, discussed with reference to FIG. 12A, for each of the symbols in cluster 8. As can be seen from the parameters values associated with the symbols in FIG. 12B, the new parameter, discussed above with reference to FIG. 12A, has a different value for each of the six symbols in cluster 8. In other words, a combination of the three parameters used to create the three-dimensional plot shown in FIG. 10 and the additional parameter discussed above with reference to FIG. 12A can be used together to uniquely identify all of the symbols in cluster 8.

Figure 13A:
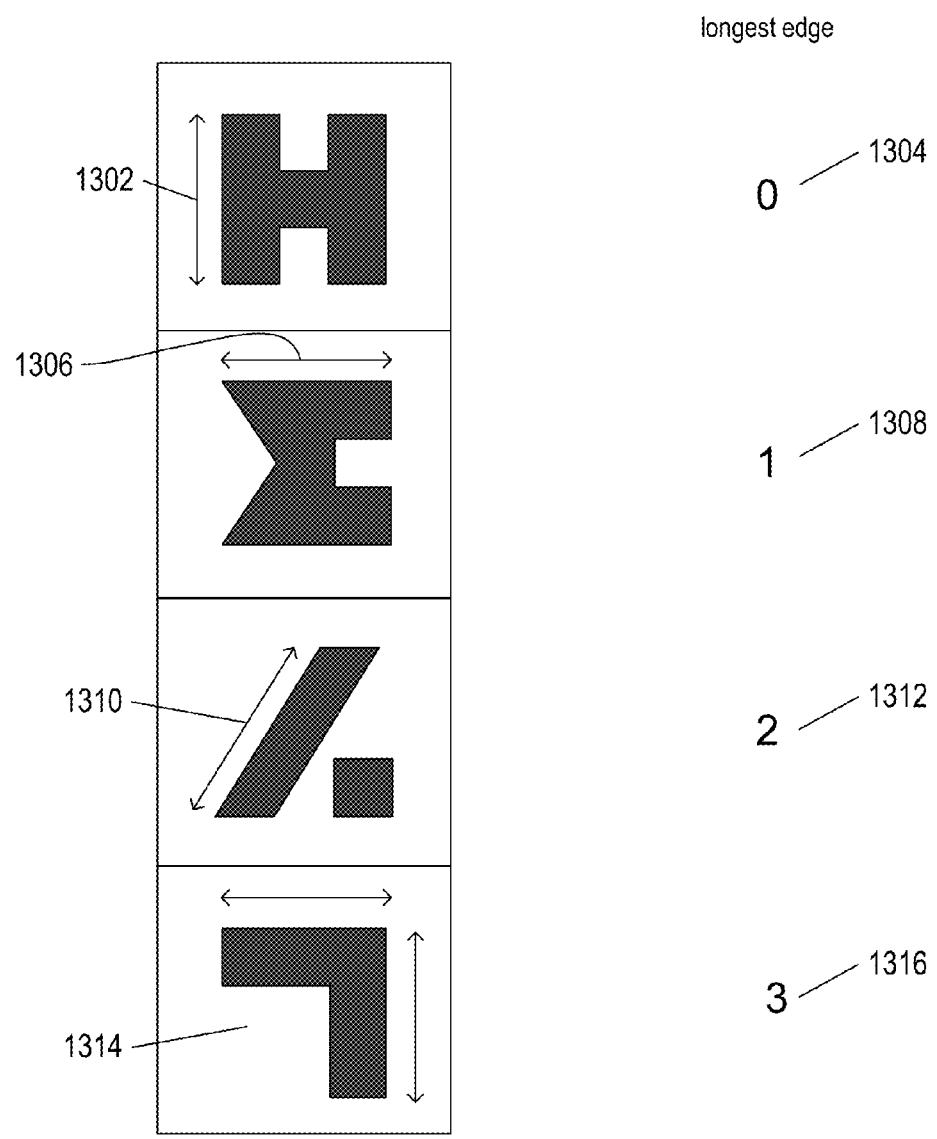
FIG. 13A illustrates an additional parameter used for characterizing symbol images.

FIG. 13A illustrates an additional parameter used for characterizing symbol images. The additional parameter is referred to, below, as the "longest edge" parameter. This parameter indicates the direction of the longest edge of the symbol image. When the longest edge is a vertical edge 1302, the longest-edge parameter has the value "0" 1304. When the longest edge of the symbol is horizontal 1306, the longest-edge parameter has the numeric value "1" 1308. When the longest edge of the symbol is diagonal 1310, the longest-edge parameter has the numeric value "2" 1312. And, finally, when there is no longest vertical, horizontal, or diagonal edge, as in the case of the symbol shown in cell 1314 in FIG. 13A, then the longest-edge parameter has the numeric value "3" 1316.

FIG. 13B illustrates the full set of parameter values for the hypothetical symbol set shown in FIG. 6. The table shown in FIG. 13B is identical to the table 902, previously shown in FIG. 9, with the exception of the final two columns 1320 and 1322, which include values for the parameter p discussed above with reference to FIG. 12A and the longest-edge parameter, discussed above with reference to FIG. 13A.

Figure 14A:
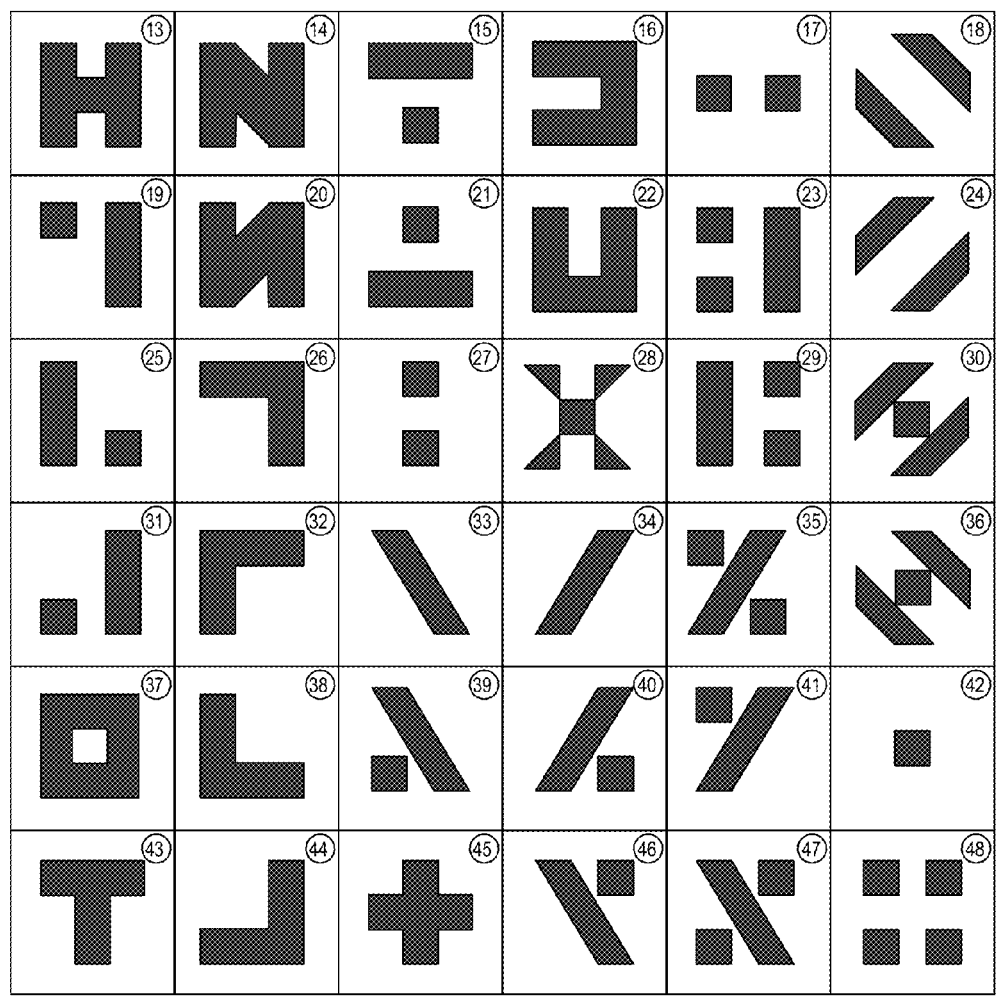
FIG. 14A illustrates construction of four decision trees from four subsets of the hypothetical symbol set shown in FIG. 6.

FIGS. 14A-17C illustrate construction of four decision trees from four subsets of the hypothetical symbol set shown in FIG. 6. FIG. 14A shows 36 symbols selected from the 48 symbols of the hypothetical symbol set shown in FIG. 6. This first subset of symbols is then used to generate a decision tree that can be used to classify an input symbol as best matching a particular one of the symbols of the subset of symbols shown in FIG. 14A. FIG. 14B shows the table of parameter values for the 36 symbols in the subset of symbols shown in FIG. 14A. These parameter values are used to construct the decision tree. FIG. 14C shows a decision tree created for the subset of symbols shown in FIG. 14A based on the parameter values for the symbols shown in FIG. 14B. Note that the parameter value shown in FIG. 14B is a subset of the complete table of parameter values shown in FIG. 13B.

Figure 14C:
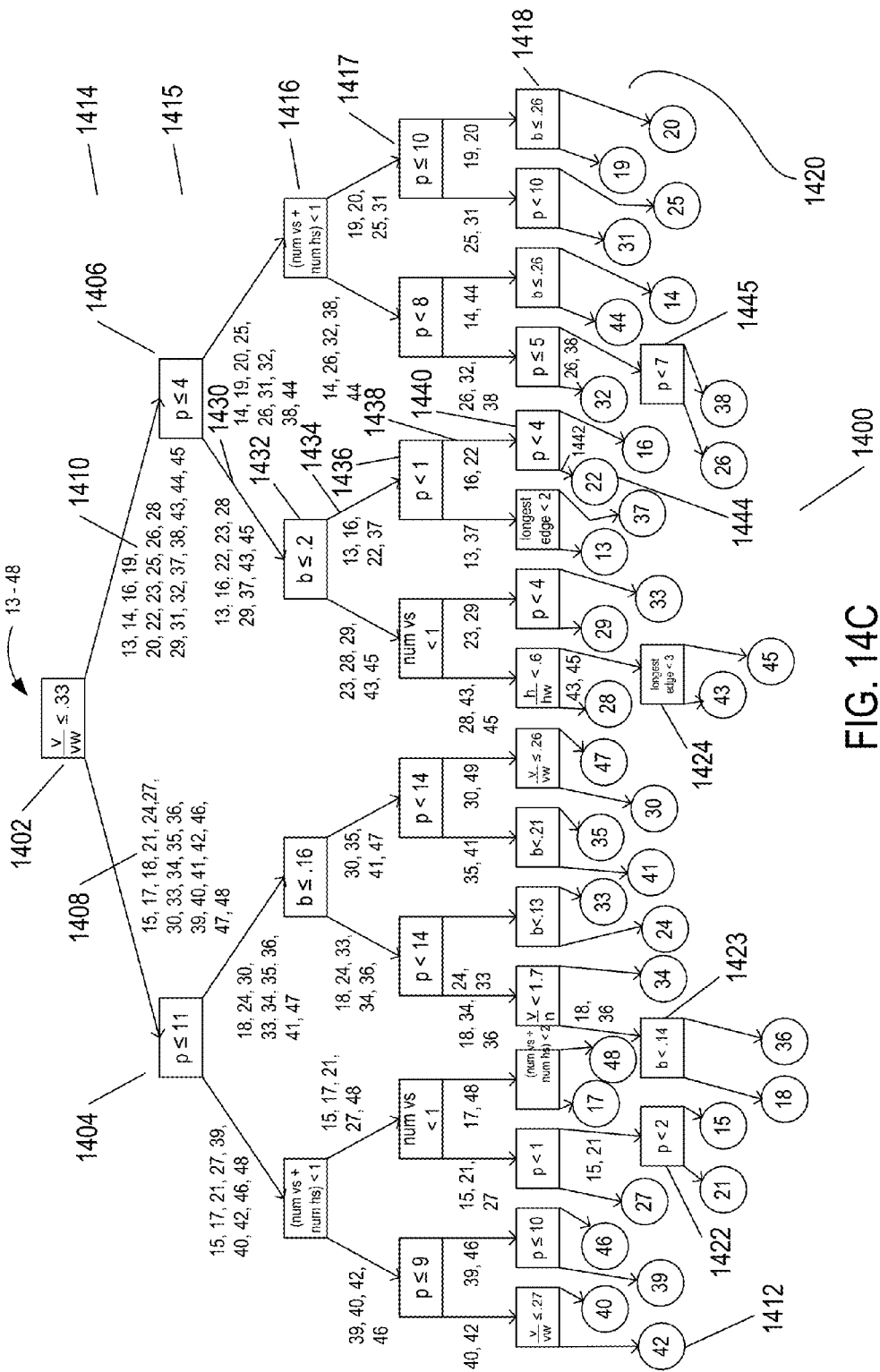
FIG. 14C illustrates construction of four decision trees from four subsets of the hypothetical symbol set shown in FIG. 6.

There are many different types of decision trees. The decision trees created in the example of FIGS. 14A-17C are binary decision trees. Each node of the decision tree, such as node 1402 in FIG. 14C, represents a decision or test that allows one to select which of two lower-level nodes 1404 and 1406 to navigate to in a traversal of the decision tree based on a set of parameter values computed for a symbol image. The decision tree is created using the symbol subset shown in FIG. 14A as well as the parameter value shown in FIG. 14B. In a first step in creating the decision tree, the various parameter values for each of the nine parameters computed for each symbol image in the symbol-image subset are considered to identify a particular parameter and numerical threshold value for the parameter that most evenly divides the subset of symbol images into two partitions. In the case of the symbol subset shown in FIG. 14A, the parameter $$\frac{v}{vw}$$

is a suitable parameter for the first test represented by node 1402, the root node of the decision tree. Using a threshold numerical value of 0.33, a test of the numeric value for a particular symbol image from the subset of symbol images as being less than or equal to the threshold value 0.33 partitions the 36 symbol images of the symbol subset into a first partition of 18 symbols 1408 and a second partition of 18 symbols 1410. At each stage of decision-tree construction, a parameter-based test is sought that most evenly divides the set of symbols input to a node into two output partitions. This process is carried out recursively, node-by-node and level-by-level, in order to construct the entire decision tree 1400. The root node 1402 represents the first level of the decision tree. The second level of the decision tree includes nodes 1404 and 1406. Both of these nodes include a test based on the parameter p described with reference to FIG. 12A. In the case of node 1404, the threshold value for the test is 11 and, in the case of node 1406, the threshold value is 4. The leaf nodes of the tree are shown as circled numbers, such as leaf node 1412 in FIG. 14C. The leaf nodes represent individual symbols from the subset of symbols used to create the decision tree. There are 36 leaf nodes corresponding to the 36 symbols in the symbol subset shown in FIG. 14A.

Again, there are many different types of decision trees and methods for constructing decision trees. In the current example, each node includes a simple test that compares the value of a parameter to a threshold value. In other types of decision trees, the tests may be more complex and involve multiple parameters. In certain types of decision trees, parameters used for tests are selected from random parameter subsets in order to introduce randomness with respect to a series of decision trees created for characterizing a particular set of symbols or other objects. The selection of parameters and threshold values may be used to minimize or maximize some objective function, including objective functions based on the information-theory concepts of entropy and information gain. As further discussed below, multiple decision trees created for a particular set of symbol images or other objects, with a different subset of the objects used for creating each of the multiple decision trees, may together constitute a decision forest that often provides more robust and accurate classification. Considerable research and development efforts have been devoted to the topics of decision trees, decision forests, and random decision forests and have produced detailed characterizations and elaborations of the concept of decision trees and decision forests as well as their application to particular types of problem domains. While simple binary decision trees are used in the current example, any of a wide variety of different types of decision trees and decision forests may be used for symbol-image processing by OCR systems according to the current document.

Figure 15A:
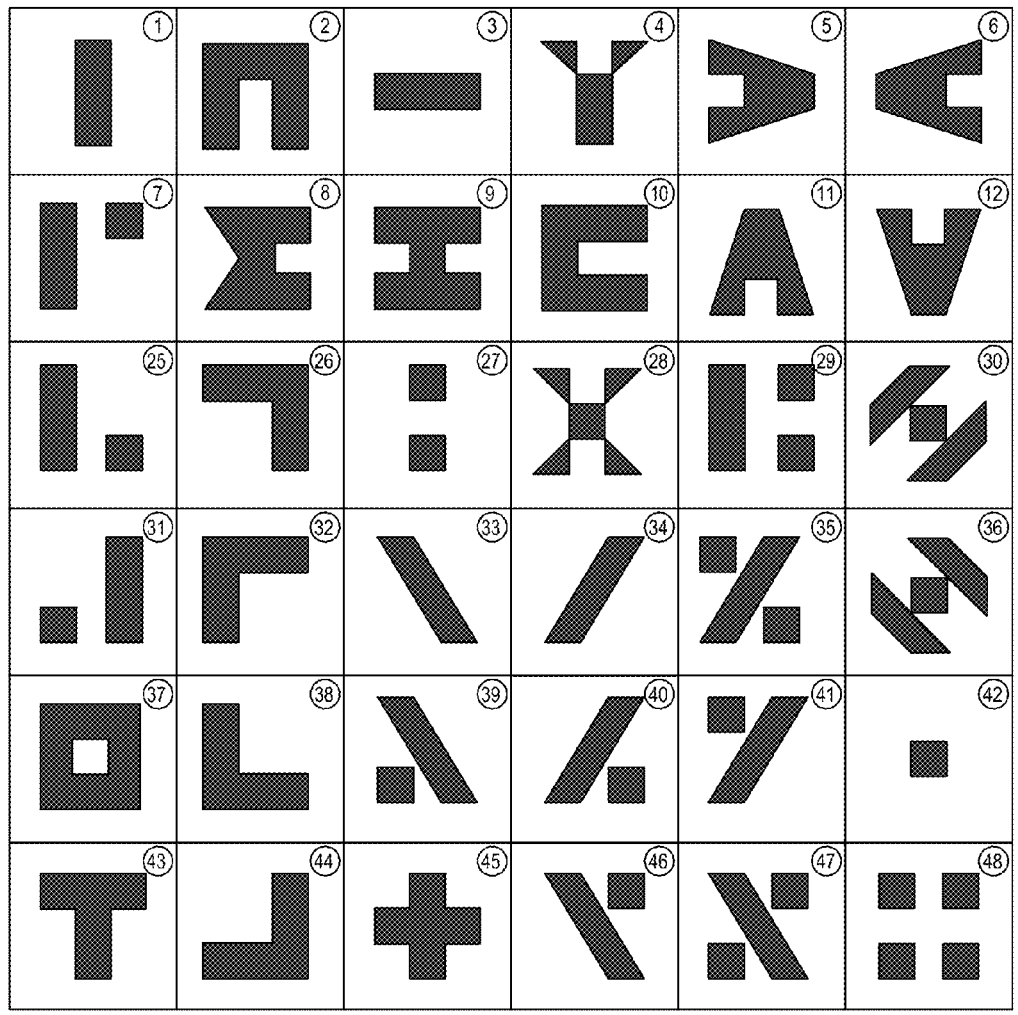
FIG. 15A illustrates construction of four decision trees from four subsets of the hypothetical symbol set shown in FIG. 6.
Figure 15C:
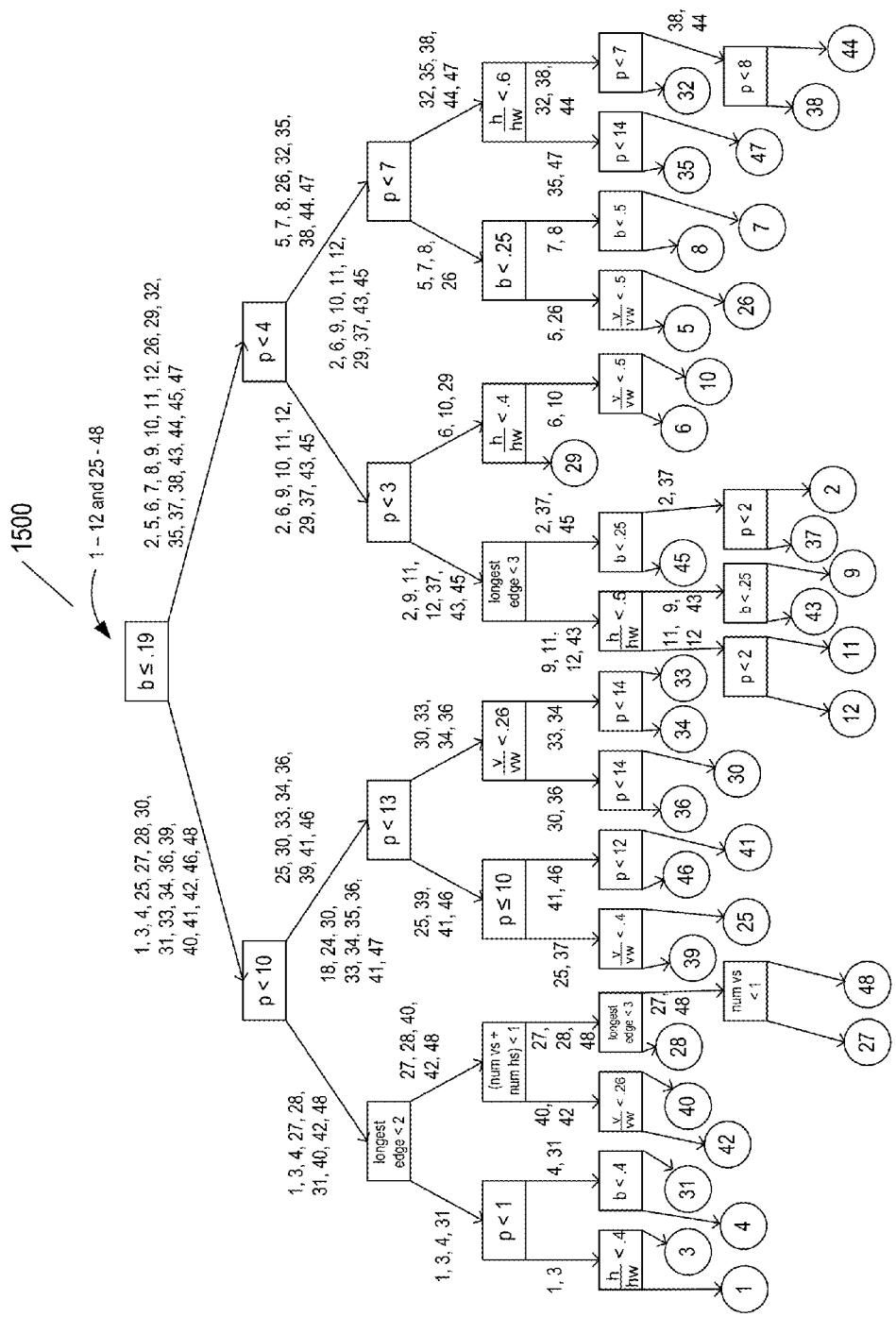
FIG. 15C illustrates construction of four decision trees from four subsets of the hypothetical symbol set shown in FIG. 6.
Figure 16A:
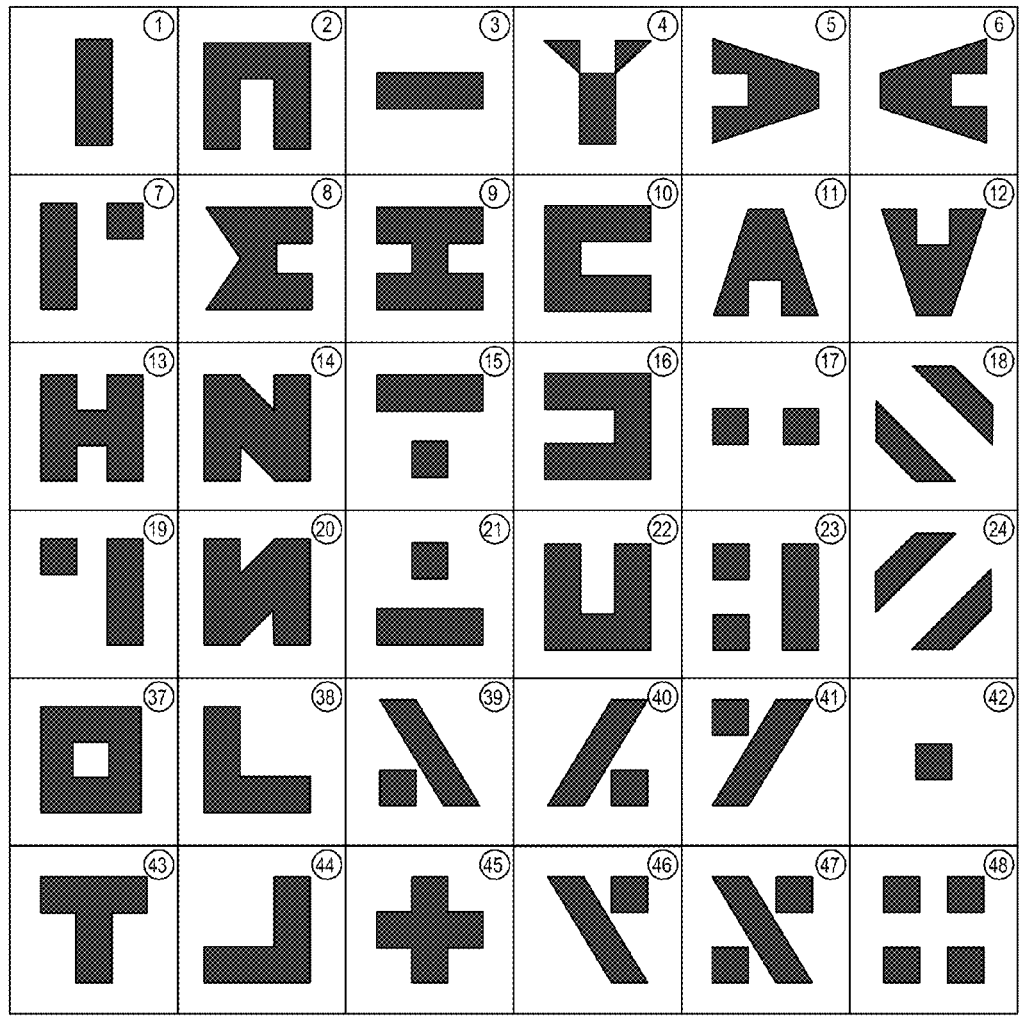
FIG. 16A illustrates construction of four decision trees from four subsets of the hypothetical symbol set shown in FIG. 6.
Figure 16C:
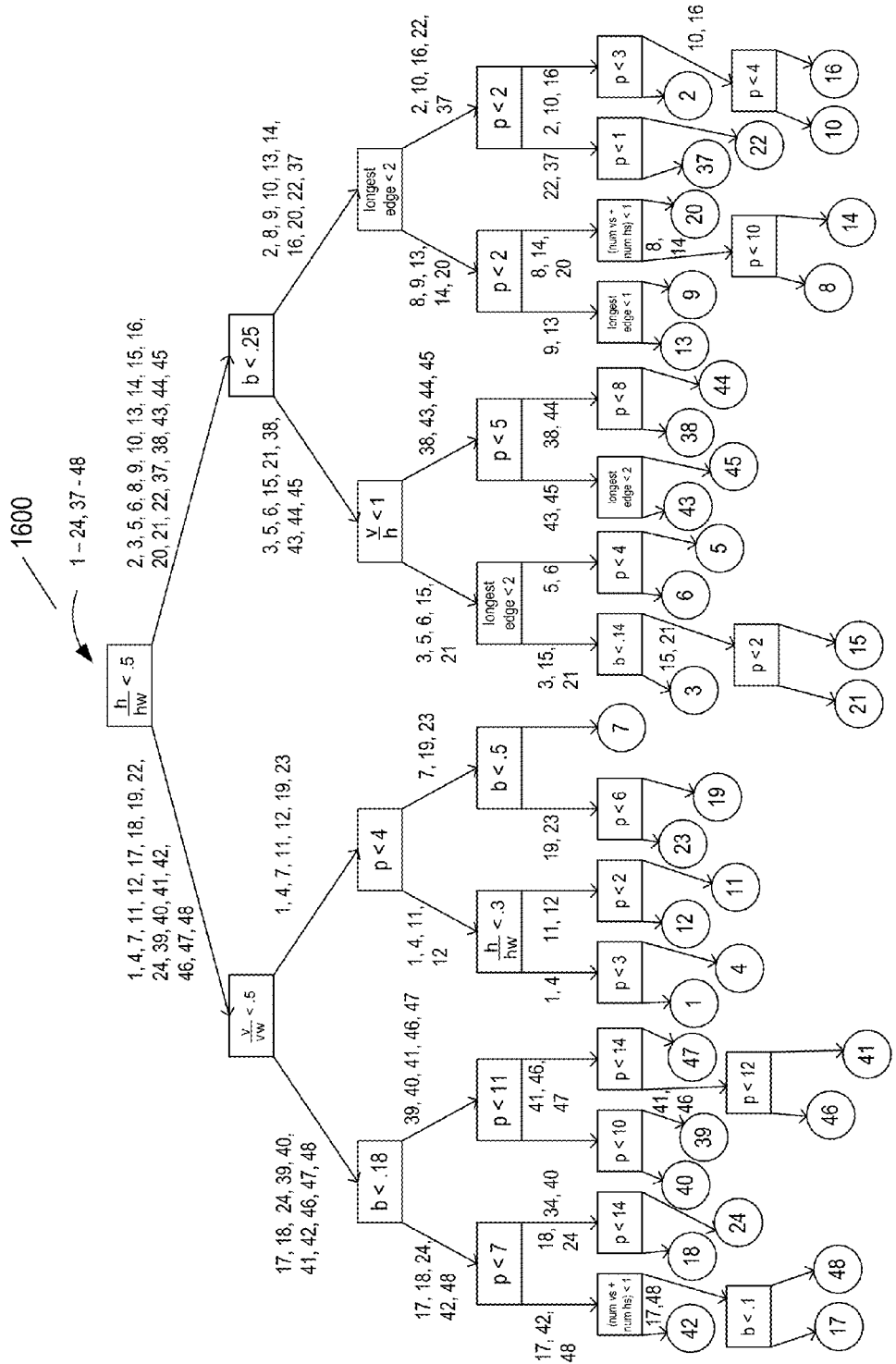
FIG. 16C illustrates construction of four decision trees from four subsets of the hypothetical symbol set shown in FIG. 6.
Figure 17A:
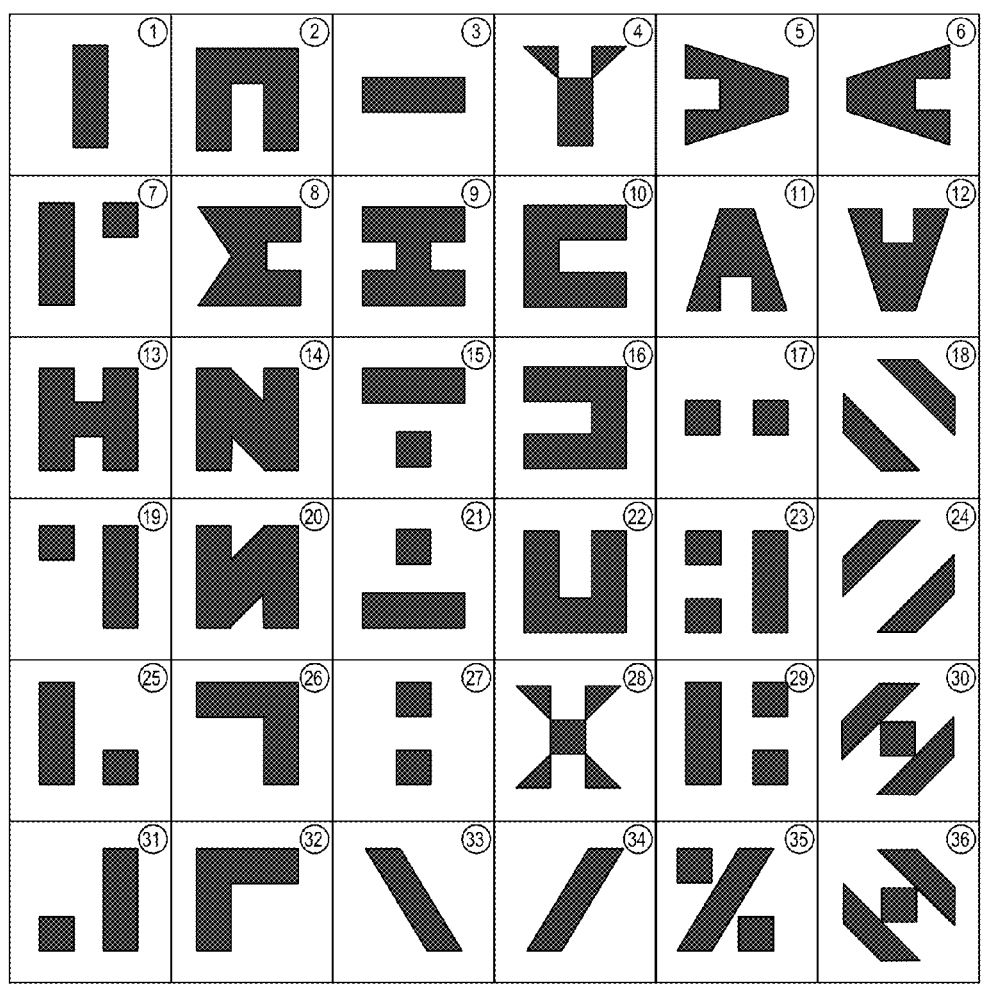
FIG. 17A illustrates construction of four decision trees from four subsets of the hypothetical symbol set shown in FIG. 6.
Figure 17C:
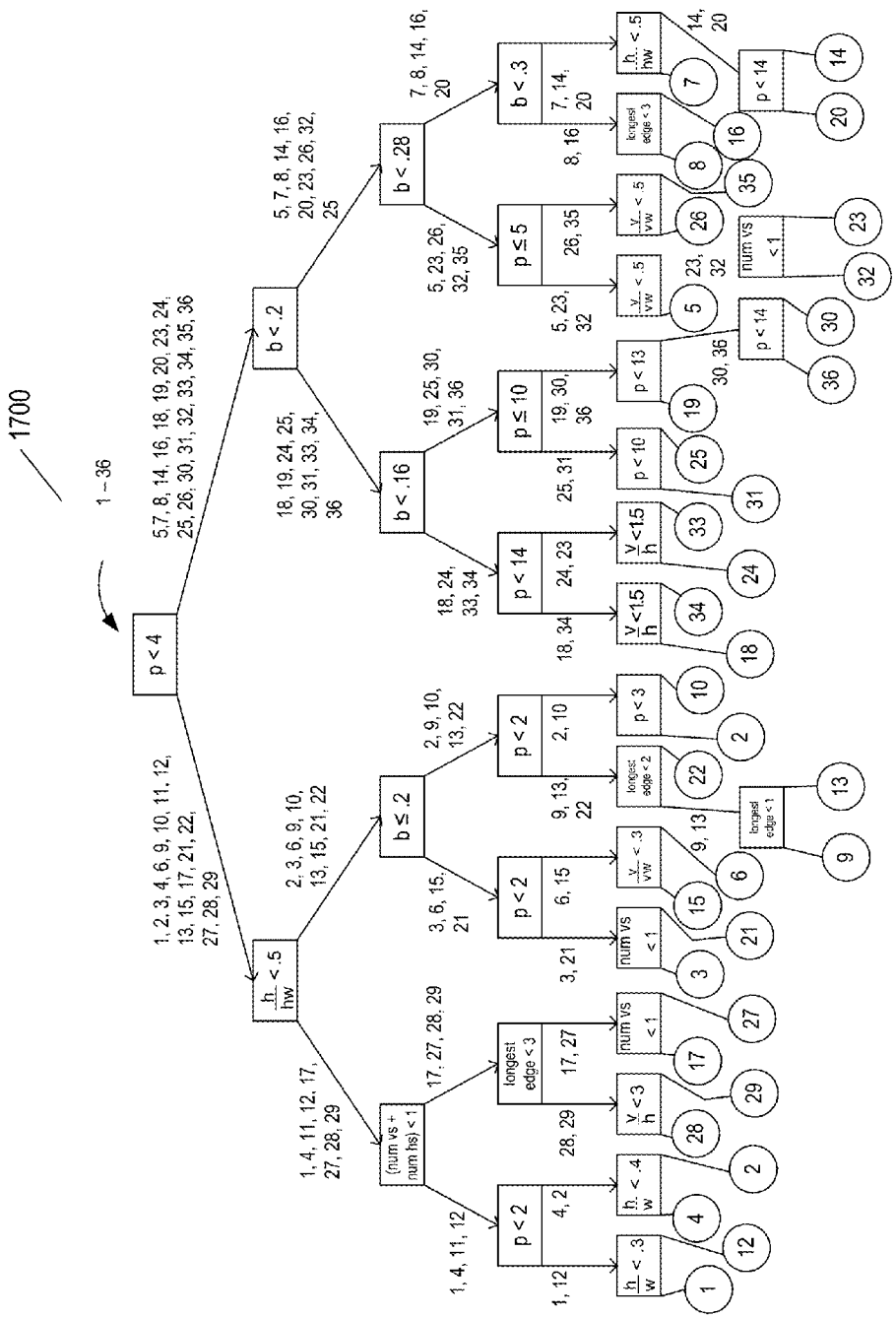
FIG. 17C illustrates construction of four decision trees from four subsets of the hypothetical symbol set shown in FIG. 6.

In FIG. 14C, the decision tree 1400 has five full levels of nodes 1414-1418. Most of the nodes at the sixth level 1420 are leaf nodes but, in certain cases, there are additional internal, decision nodes 1422-1425 at the sixth level, and these produce pairs of leaf nodes at the seventh level. As further discussed below, one can classify an arbitrary symbol image as corresponding to one of the 36 symbols in the symbol set shown in FIG. 14A by computing the numeric parameter values for the symbol image and then traversing the tree, from the root node to a leaf node, using those parameter values and the tests included in each node. FIGS. 15A-C illustrate the construction of a second decision tree 1500 from a second set of 36 symbols, shown in FIG. 15A, selected from the 48 symbols of the hypothetical symbol set shown in FIG. 6. Similarly, FIGS. 16A-C show construction of a third decision tree 1600 from a third subset of symbols selected from the 48 symbols of the hypothetical symbol set shown in FIG. 6. Finally, FIGS. 17A-C illustrate construction of a fourth decision tree 1700 from a fourth subset of symbols selected from the set of 48 hypothetical symbols shown in FIG. 6. In this example, each of the four decision trees 1400, 1500, 1600, and 1700 is constructed from a different subset of 36 symbols selected from the 48 symbols of the hypothetical symbol set shown in FIG. 6. This is, however, a somewhat artificial example. In general, when a forest of decision trees is constructed from a training set, some relatively large fraction of the objects in the training set is randomly selected, each time, with replacement, in order to construct each decision tree. In the case that 90% of the objects are randomly selected for construction of each tree, it would be expected that the average overlap of training objects used to construct any particular pair of trees would be greater than 90%, since the random selection of objects is made from the entire set of objects, each time. Nonetheless, the current example provides a simple illustration of the construction and operation of a decision forest.

Figure 18A:
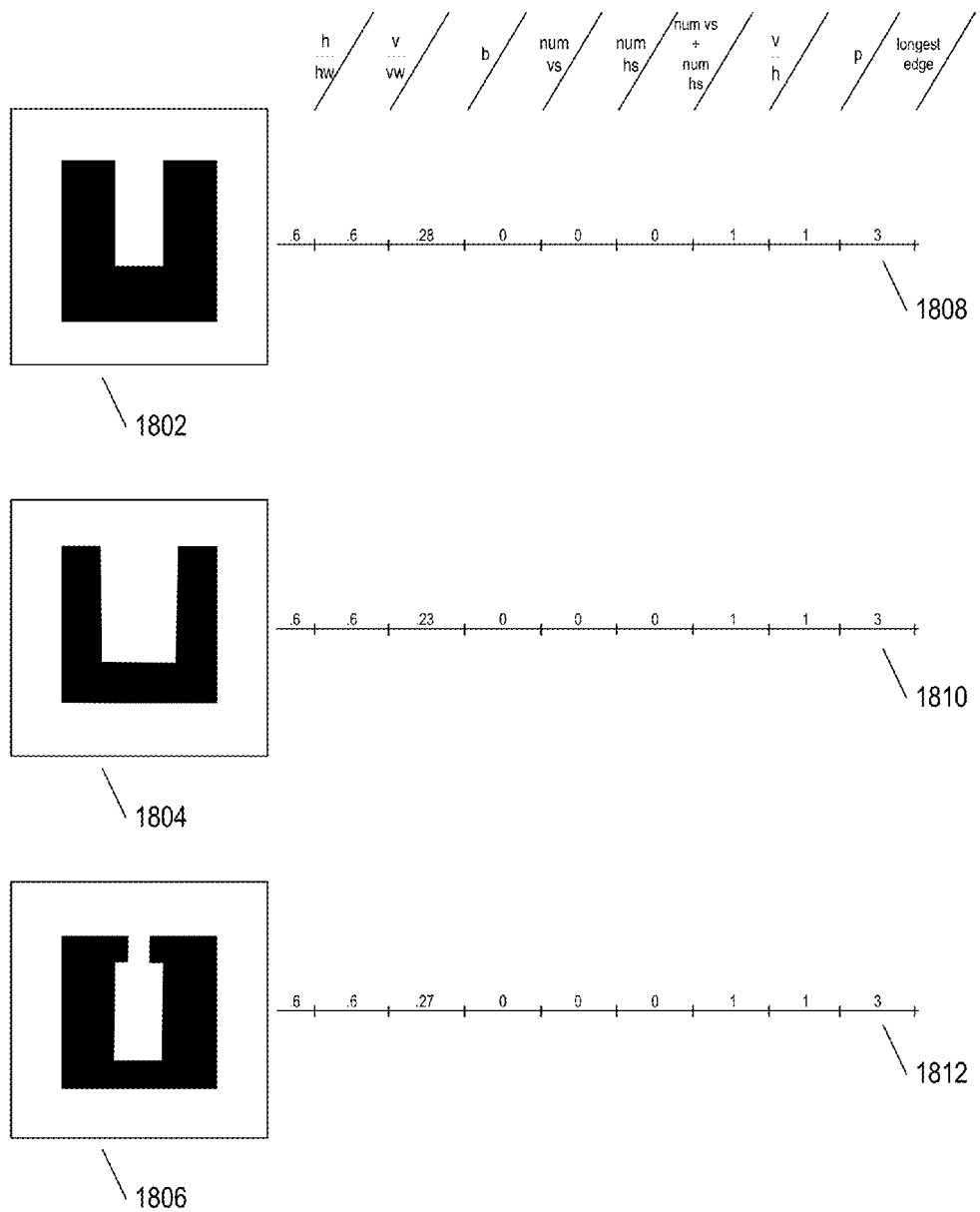
FIG. 18A illustrates classification of symbol images by a decision forest.
Figure 18B:
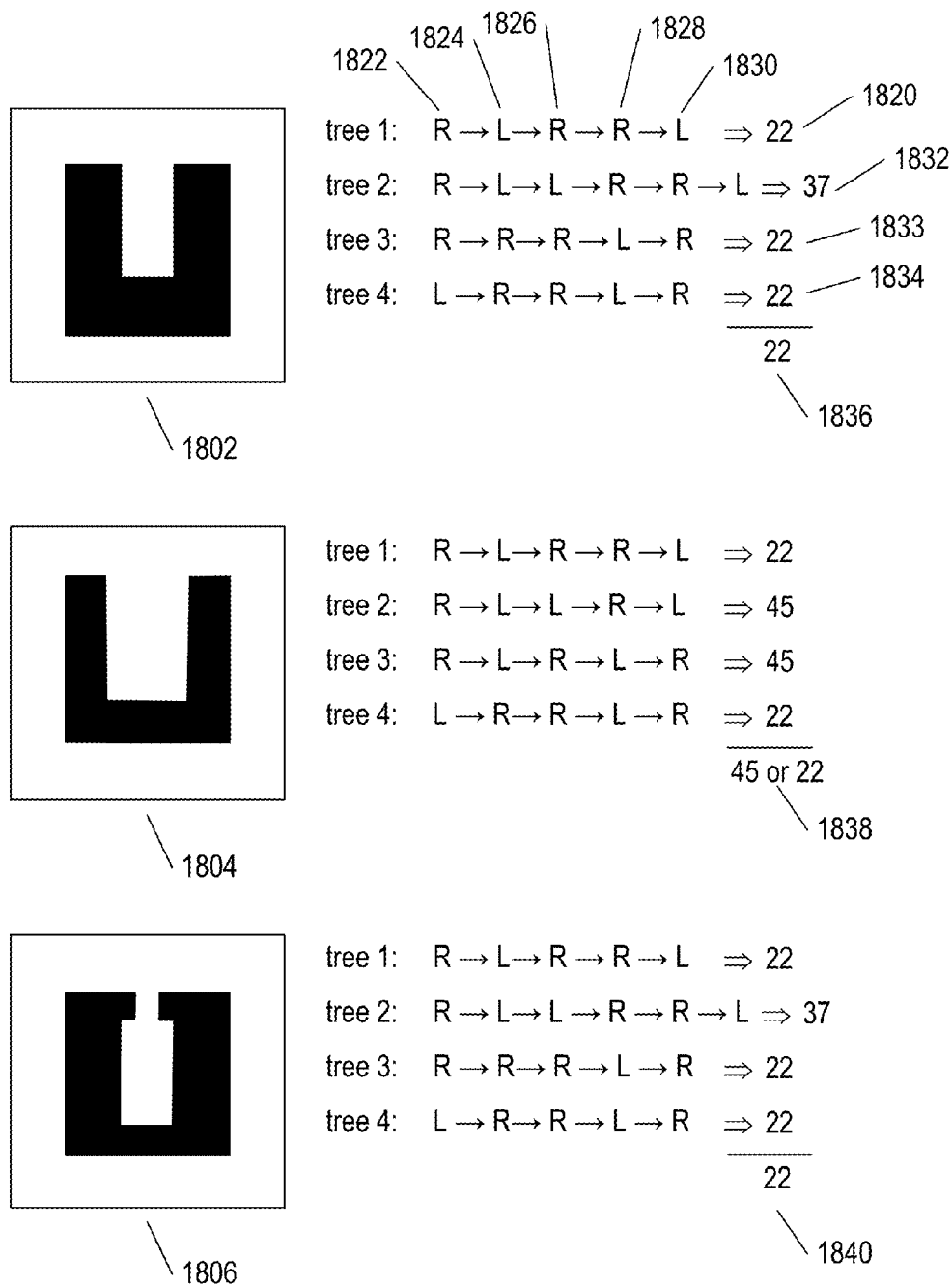
FIG. 18B illustrates classification of symbol images by a decision forest.

FIGS. 18A-B illustrate classification of symbol images by a decision forest. FIG. 18A shows three symbol images 1802, 1804, and 1806 along with the numerical values computed from these symbol images for the nine above-discussed parameters 1808, 1810, and 1812, respectively. Symbol image 1802 is an exact match of the symbol image for symbol 22 of the set of hypothetical symbols shown in FIG. 6. Thus, the parameters 1808 computed for this symbol image are identical to the parameters shown in row 1319 of FIG. 13B. Symbol image 1804 is similar to symbol image 1802, but the relative widths of the segments has been decreased, producing a somewhat thinner symbol. Symbol image 1806 is a thinner horizontal segment as well as having two inward-facing extensions at the tops of the vertical stems of the symbol. The parameter values 1810 computed for symbol image 1804 and the parameter values 1812 computed for symbol image 1806 do not correspond to any of the parameter values shown in FIG. 13B, since symbol images 1804 and 1806 do not correspond to any of the images for the symbols of the hypothetical symbol set shown in FIG. 6.

FIG. 18B illustrates use of the small decision forest comprising decision trees 1400, 1500, 1600, and 1700 shown in FIGS. 14C, 15C, 16C, and 17C, respectively. Each line of text to the right of the symbol images in FIG. 18B represents traversal of one of the four decision trees. For example, text line 1820 in FIG. 18B represents traversal of decision tree 1400 in FIG. 14C, referred to as "tree 1," using the parameters 1808 computed for symbol image 1802. The first or root node (1402 in FIG. 14C) of decision tree 1400 includes the test:

$$\frac{v}{vw} \leq .33.$$

The computed value of $$\frac{v}{vw}$$

for symbol image 1802 is shown, in FIG. 18A, as 0.6. The value 0.6 is not less than or equal to 0.33, and thus the test represented by node 1402 results in traversal to node 1406, to the right, as represented by the letter "R" 1822 and text line 1820. Node 1406 includes the test: p≤4. The computed value for parameter p for symbol image 1802 is shown in FIG. 18A as 1. Thus, in the case of node 1406, the test succeeds and the left-hand downward-pointing arrow 1430 is therefore taken, as represented by the letter "L" 1824 in FIG. 18B. Node 1432 includes the test b≤0.2. The value for the parameter b for symbol image 1802 is shown in FIG. 18A to be 0.28. Thus, the test represented by node 1432 fails and the right-hand downward-pointing arrow 1434 is selected as the next traversal sub-path, as represented by the letter "R" 1826 in FIG. 18B. Node 1436 includes the test: p<1. The value of the parameter p for symbol image 1802 is shown, in FIG. 18A, as being 1. The test represented by node 1436 fails and the right-hand downward-pointing arrow 1438 is selected as the next traversal sub-path, as represented by the letter "R" 1828 in FIG. 18B. Node 1440 includes a test: p<4. Because the value of the parameter p for symbol image 1802 is 1, this test succeeds and therefore the right-hand downward-pointing arrow 1442 is selected as the next traversal sub-path, as represented by the letter "L" 1830 in FIG. 18B. This leads to the leaf node 1444, which represents the symbol with symbol code 22. Text lines 1832-1834 represent the traversals of the second through fourth decision trees, 1500, 1600, and 1700, which produce symbol codes 37, 22, and 22. The most frequently produced symbol code from the four tree traversals is symbol code 22 (1836 in FIG. 18B), which is the result of applying parameters 1808 to the decision forest comprising decision trees 1400, 1500, 1600, and 1700. Note that the subset of symbols used to construct the second decision tree, which produced symbol code 37, does not include symbol 22. It is therefore not surprising that the symbol code produced by traversal of this tree is not symbol code 22. Application of the parameters 1810 for symbol image 1804 to the decision forest produces an ambiguous result of either symbol code 45 or symbol code 22 1838. Application of the computed parameters 1812 for symbol image 1806 produces symbol code 22 1840.

In the current, simple example, all three variations of the U-like symbol 22, 1802, 1804, and 1806, were characterized as having symbol code 22, or either symbol code 22 or 45, by the decision forest comprising decision trees 1400, 1500, 1600, and 1700. However, U-like symbol images that depart further from the canonical symbol image shown in FIG. 6 for the symbol-code 22 would likely produce more divergent results. The four-decision-tree decision forest of this example is not terribly robust, for numerous reasons. One reason is that most of the decisions in the four decision trees include tests that involve only a small subset of the total number of parameters. Thus, the decision trees rely primarily on only a few of the nine parameters. Furthermore, the numeric values of the parameters are not necessarily ordered with respect to similarity in the symbol images producing the numeric values. For example, the numeric values for the parameter p, discussed with reference to FIG. 12A, have no numeric order representative of the degree of similarity between symbols with different numeric values for this parameter. Another problem is that each decision tree was constructed using only 75% of the total number of symbols, and the 75% of the symbols were not randomly selected. There is, therefore, significantly less overlap in the symbol sets used to construct the trees than would normally be employed to produce a robust decision forest. Finally, a practical decision forest would likely include a larger number of decision trees constructed based on subsets of a much larger set of better-distributed parameters.

Figure 19:
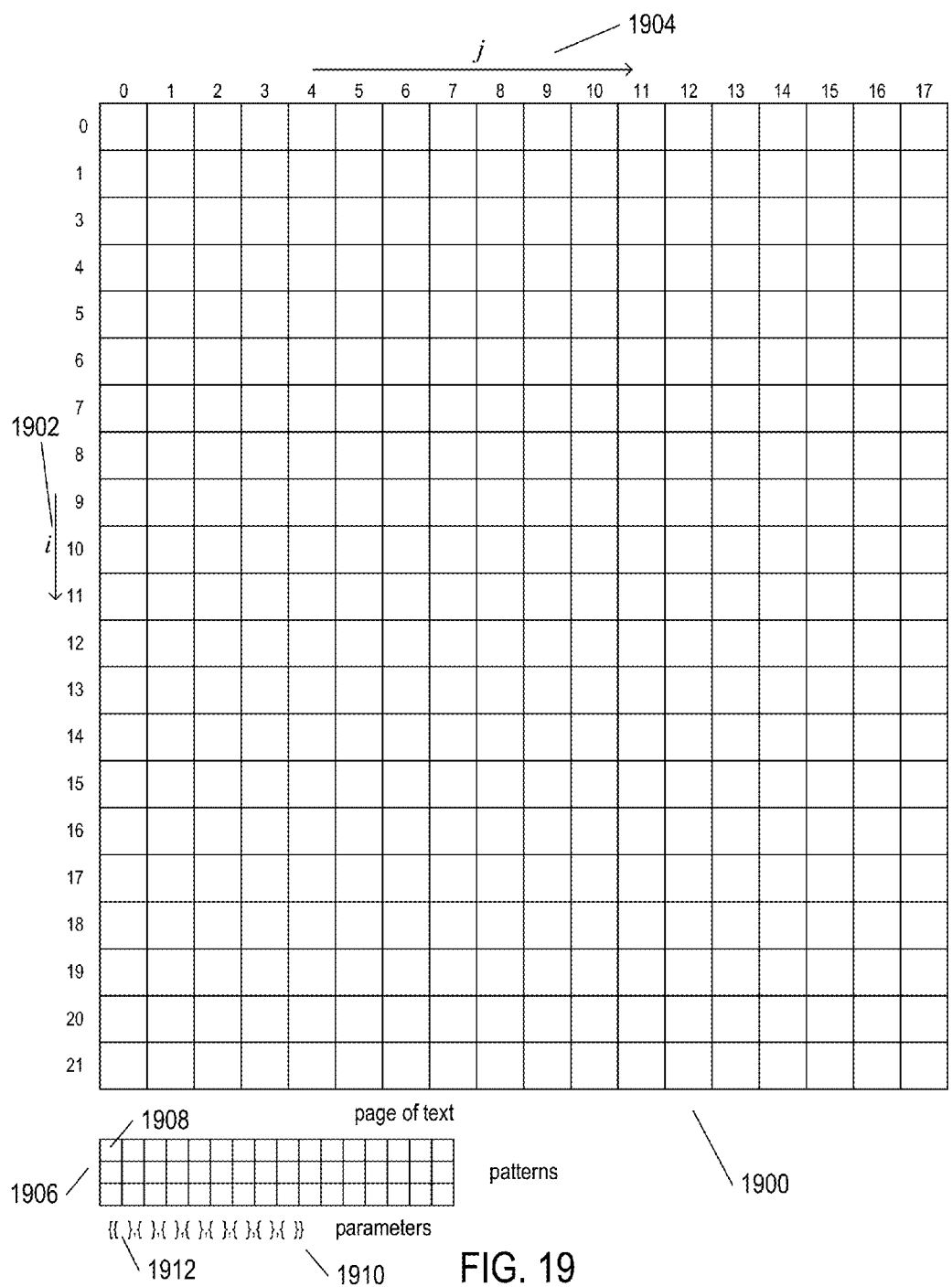
FIG. 19 illustrates a small text-containing image that has been initially processed, by an OCR system, to produce a grid of symbol windows 1900, each containing a symbol image.

FIG. 19 illustrates a small text-containing image that has been initially processed, by an OCR system, to produce a grid of symbol windows 1900, each containing a symbol image. Only the grid of symbol windows 1900 is shown in FIG. 19, without the symbol images contained within them, for clarity of illustration. The symbol windows are indexed by a vertical index i 1902 and a horizontal index j 1904. In this example, discussed below, for the sake of simplicity, symbols and symbol images are discussed, rather than graphemes. In the example, it is assumed that there is a one-to-one correspondence between symbols, graphemes, and patterns used to identify symbol images in symbol windows. In addition to the grid of symbol windows 1900, FIG. 19 also shows an array or matrix 1906 of patterns, each cell of which, such as cell 1908, including a pattern. Patterns are represented a sets of parameter/parameter-value pairs, with parameters chosen to uniquely distinguish symbol images, as discussed above with reference to FIGS. 8A-12B. FIG. 19 also shows an array of parameters 1910, illustrated as a set containing pairs of braces, such as the pair of braces 1912. Each pair of braces represents the functionality that computes a parameter value for a parameter with respect to a symbol image.

Figure 20:
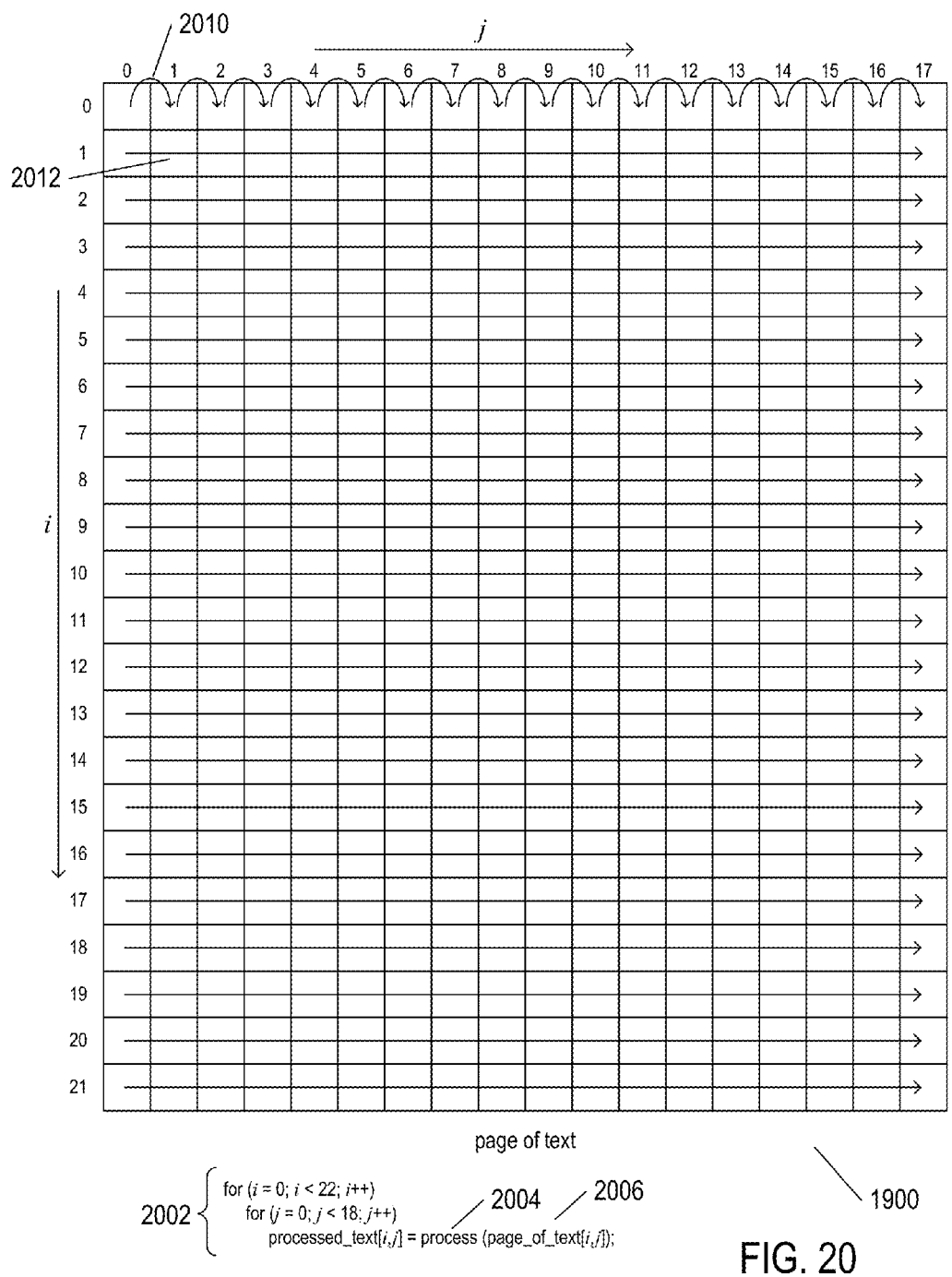
FIG. 20 illustrates a general approach to processing of the grid of symbol windows, shown in FIG. 19.

FIG. 20 illustrates a general approach to processing of the grid of symbol windows, shown in FIG. 19. At the highest level, processing can be considered to be a nested for-loop 2002 in which a routine "process" 2004 is called to analyze each symbol window 2006 in order to produce a corresponding symbol code 2008. In other words, the grid of symbol windows is represented, in the pseudocode example, as the two-dimensional array "page_of_text," and OCR processing generates a two-dimensional array of symbol codes "processed_text" from the two-dimensional array of symbol windows "page_of_text." In FIG. 20, curved arrows, such as curved arrow 2010, are used to show the traversal of the first row of the two-dimensional array, or grid, of symbol windows 1900 and horizontal arrows, such as arrow 2012, illustrate processing of the subsequent rows by for-loop 2002. In other words, the grid of symbol windows 1900 is traversed according to a traversal path and each symbol window in the grid is separately processed to produce a corresponding symbol code.

Figure 21:
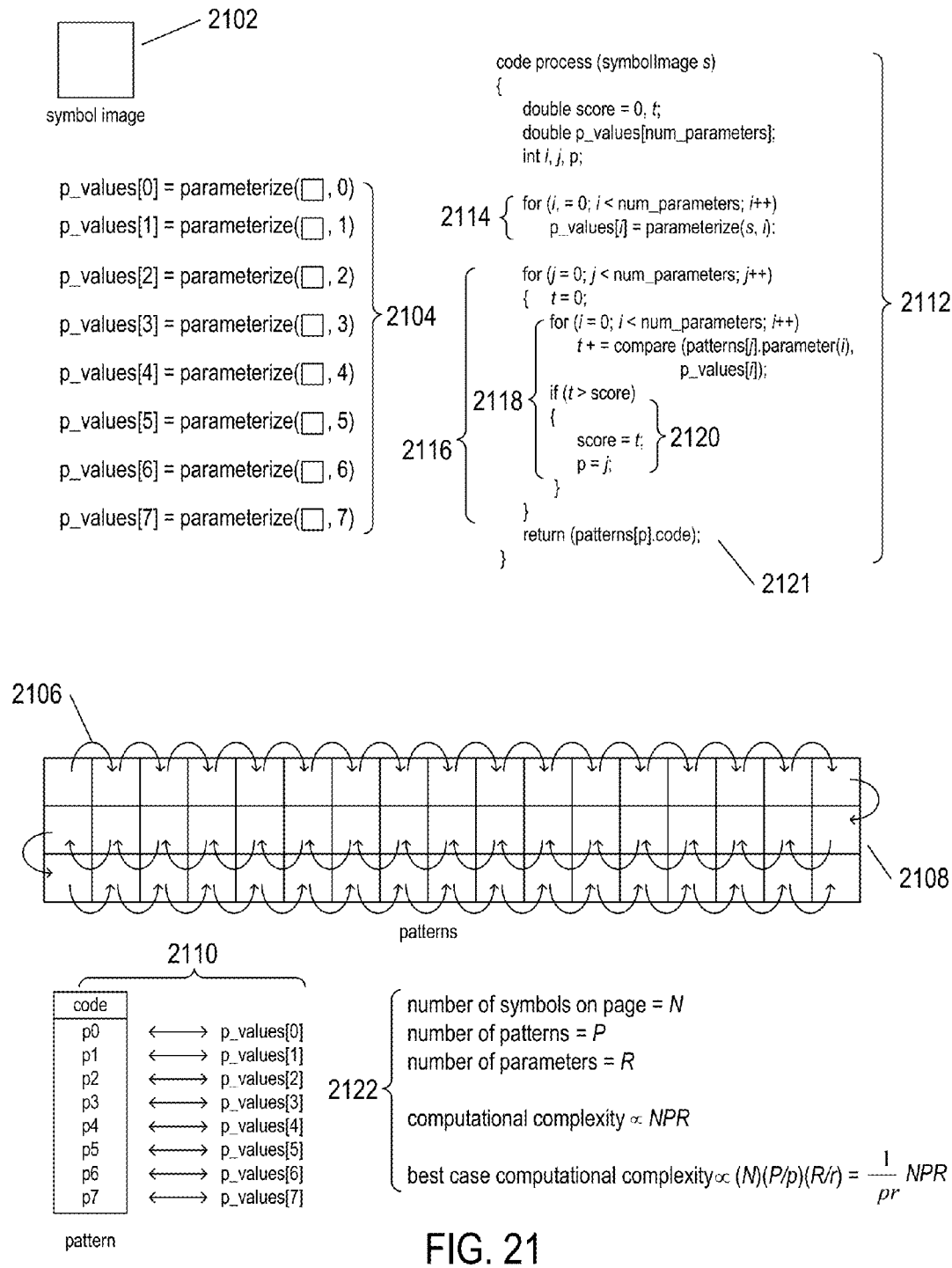
FIG. 21 illustrates a first approach to implementing the routine "process" (2004 in FIG. 20).

FIG. 21 illustrates a first approach to implementing the routine "process" (2004 in FIG. 20). A symbol image within a symbol window 2102 is input to the routine "process." The routine "process" computes parameter values p1-p8 for eight different parameters used in the example to characterize symbol images by calling a routine "parameterize," as shown by the eight calls to this routine 2104 in FIG. 21. The routine "parameterize" receives, as arguments, the symbol image and an integer indicating for which parameter to compute a parameter value and returns the computed parameter value. The parameter values are stored in an array of parameter values "p_values." Then, as shown by curved arrows, such as curved arrow 2106, the routine "process" traverses all of the patterns 2108 corresponding to symbols of the language, comparing the computed parameter values for the symbol image stored in the array "p_values" to precomputed parameter values for each pattern, as shown in the illustration of the comparison operation 2110 in FIG. 21. The pattern that best matches the computed parameters for the symbol image is chosen as the matching pattern, and the symbol code corresponding to that pattern is returned as the return value of the routine "process." Pseudocode for this first implementation of the routine "process" is also shown in FIG. 21 as pseudocode example 2112. In a first for-loop 2114, the values for the parameters with respect to the input symbol s are computed. Then, in the outer for-loop 2116 of a set of nested for-loops, each pattern in an array or vector of patterns 2108 is considered, the traversal of the array indicated by curved arrows, such as curved arrow 2106. In an inner for-loop 2118, a routine "compare" is called to compare each computed parameter value for the symbol image to a corresponding precomputed parameter value for the pattern, with the sum of the results of the comparisons accumulated in a local variable t. The highest accumulated comparison value is stored in a local variable score and the index of the pattern that most closely matches the symbol image within the input symbol window is stored in a variable p 2120. The symbol code associated with the pattern p is returned as the result of the routine "process" 2120.

Finally, in FIG. 21, a rough characterization of the computational complexity for the first implementation of the routine "process" 2122 is shown. The number of symbol windows in the text-containing image is N=i×j. In the current example, N=357. Of course, the number of symbol images to be processed depends on the type of document and number of document images as well as on the language and other parameters. However, in general, N varies from tens to hundreds of symbol images per document image. The number of patterns against which symbol images are matched is represented by P. For many alphabetic languages, including most European languages, the number of patterns may be relatively small, generally some relatively small multiple of the number of characters in the alphabet. However, for languages such as Chinese, Japanese, and Korean, the number of patterns may vary from tens of thousands to hundreds of thousands. Thus, for processing such languages, P is much larger than N. The number of parameters used to characterize each symbol image and pattern is represented as R. The overall computational complexity is therefore estimated as NPR. The factor N comes from the outer nested for-loops shown in FIG. 20. The factors PR come from the nested for-loops 2116 and 2118 in the implementation of the routine "process" 2112 shown in FIG. 21. In other words, the routine "process" is called once for each of N symbol images, and each invocation or call to the routine "process" involves R comparisons for each of P patterns. The initial parameter-value computation is considered a constant overhead, in this analysis. There are many possible ways for improving the implementation illustrated in FIG. 21. As one example, the comparison operation may consider only a subset of parameters of the total number of parameters needed to uniquely characterize a symbol image with respect to a particular pattern. Thus, an average number of parameter comparisons $$\frac{R}{r}$$

may be needed, rather than R comparisons. Additionally, rather than comparing each symbol image with each pattern, the symbol images may be traversed until a pattern that produces a comparison score above some relatively high threshold is found. In this case, the number of patterns that are compared in each symbol image may be $$\frac{P}{p}$$

rather than P. But, using these improvements, the computational complexity is nonetheless proportional to some generally large fraction of NPR.

Figure 22A:
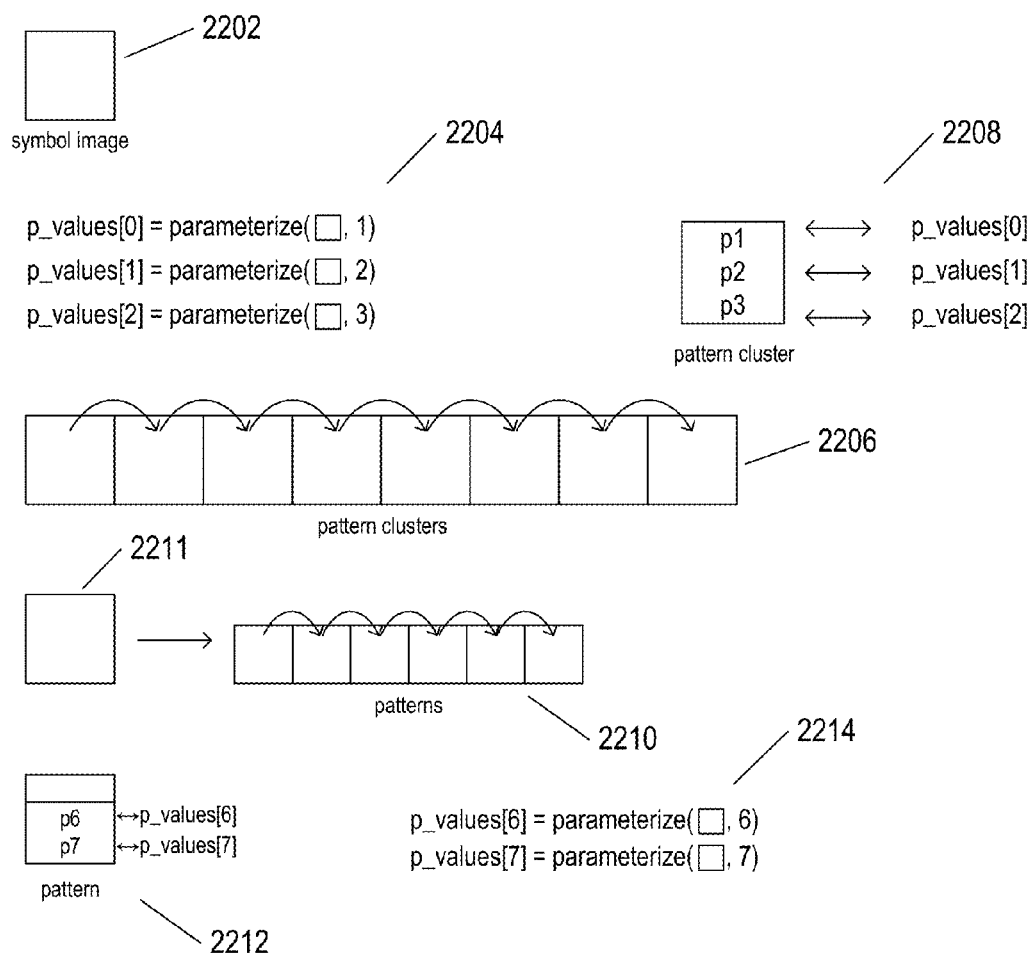
FIG. 22A illustrates a second implementation of the routine "process" (2004 in FIG. 20).

FIGS. 22A-B illustrate a second implementation of the routine "process" (2004 in FIG. 20). In the second implementation, the routine "process" also receives a symbol image 2202 as input. However, in this implementation, the patterns are grouped together into clusters, such as the clusters discussed above with reference to FIGS. 11A-B. The routine "process" computes a sufficient number of parameter values 2204 in order to traverse the clusters of patterns 2206 to identify the most likely matching cluster. Thus, a relatively modest comparison operation 2208 is initially used to select the best pattern cluster. Then, the patterns 2210 within the selected pattern cluster 2211 are traversed using a second, modest comparison operation 2212 that involves some additional number of parameter values 2214 needed to distinguish the best pattern from the relatively small number of patterns 2210 contained in the pattern cluster. Pseudocode for the second implementation of the routine "process" is provided in FIG. 22B. In a first nested for-loop 2220, the most likely or best pattern cluster is selected from among the pattern clusters and in a second nested for-loop 2222, the best pattern from among the patterns within the selected cluster is identified. The initial set of parameters used for determining the best cluster is computed in for-loop 2224 and the additional parameters needed to select a pattern from among the patterns of the selected cluster are computed in the for-loop 2226. FIG. 22B also indicates a rough estimate of the computational complexity for the second implementation of the routine "process" 2230. As indicated, the estimate for the computational complexity for this second implementation of the routine "process" is:

$$N(CR_1+P'R_2),$$

where the number of symbols on page=N;
number of clusters=C;
number of patterns/cluster=P';
number of initial parameters=$R_1$;
number of additional parameters=$R_2$.

Because P' is generally far smaller than P, and because C is even smaller still, the computational complexity for the second implementation of the routine "process" is quite favorable compared to the computational complexity for the first implementation of the routine "process."

Another approach to speeding up the first implementation of the routine "process," discussed above with reference to FIG. 21, is to sort the patterns in the vector or array of patterns so that the most likely patterns corresponding to the most frequently occurring symbols will be first encountered while traversing the vector or array of patterns. When the search for a matching pattern is truncated by finding a pattern with a comparison score greater than some threshold value, and when the patterns are sorted by a frequency of occurrence reflective of the frequency of occurrence of symbols in the text-containing image that is being processed, a significant decrease in computational complexity is obtained. However, the frequency of occurrence of symbols in particular text-containing images may vary enormously depending on the type of document or page that was scanned to produce the image, and is unknown prior to OCR processing. A sorting of the patterns that produces a significant decrease in computational complexity for one type of document may, for another type of document, significantly increase the computational complexity. For example, an overall statistical analysis of all different types of text documents in a particular language, including novels, advertisements, textbooks, and other such documents, may produce a general frequency-of-occurrence-of-symbols sorting of patterns. However, certain documents and specialized fields may have an entirely different set of frequencies of occurrence of symbols. In this case, for the documents of the particular field, the most frequently occurring characters may end up towards the end of the traversal path through the vector or matrix of patterns sorted according to the general frequency-of-occurrence-of-symbols sorting of patterns. The second implementation of the routine "process," discussed above with reference to FIGS. 22A-B, generally produces a significant decrease in computational complexity and corresponding increase in processing speeds. In general, a much smaller number of comparisons are needed in order to find a matching pattern for each symbol image. However, the second implementation is associated with a potentially serious problem in that, should the first nested for-loop that selects the cluster fail, then the routine "process" cannot possibly find the correct matching symbol. The correct matching symbol, in that case, is in a different cluster that is never analyzed in the second nested for-loop. While the examples of symbol sets and clusters provided above are relatively simple, as are the parameters used to characterize them, for the languages such as Chinese and Japanese, the task is far more complex and far more prone to error due to printing imperfections, document damage, and various types of errors that arise in scanning and initial OCR processing steps. Therefore, the chance of improperly choosing a cluster in such real-world problem domains is significant.

FIG. 23 illustrates a third implementation of the routine "process," discussed in the previous subsection, using the same illustration and pseudocode conventions used in the previous subsection. As shown in FIG. 23, the third implementation of the routine "process" uses an additional data structure 2302 referred to as "votes." The votes data structure includes an integer value for each pattern. This data structure is initialized to contain all zero values for all patterns. Then, in a first preprocessing step represented by the doubly nested for-loop 2304 in FIG. 23, a new set of clusters is allocated for each symbol image in the text-containing document 1900 and the patterns within the clusters are ordered based on votes collected within the votes data structure. In other words, the patterns are ordered within the newly allocated set or list of clusters so that those patterns most likely to match the currently considered symbol image are first encountered in a traversal of the patterns. The parameter values for a set of comparison parameters computed for the currently considered symbol image are compared to the parameter values for each pattern, and votes are cast for those patterns that, based on the comparison, have a similarity to the symbol image above a threshold similarity. In certain implementations, the clusters within the set of clusters may also be sorted by cumulative similarity of the patterns within them to the symbol image.

After the preprocessing step carried out in the nested for-loops 2304, each symbol image is processed by a third implementation of the routine "process." Pseudocode for the third implementation of the routine "process" 2310 is provided in FIG. 23. In this implementation, the routine "process" receives a symbol image and the set of clusters prepared for the symbol image in the preprocessing step and stored in the array NxtLvlClusters and returns a pointer to a list of potentially matching patterns. In a first for-loop 2312, parameter values for parameters used to identify patterns matching the received symbol image are computed. In a second outer for-loop 2314, each cluster is considered until the list of potentially matching patterns is full. In other words, when a maximum number of potentially matching patterns has been found, this outer for-loop is short-circuited. In an inner for-loop 2316, a function "similar" is called for each pattern in a cluster to determine whether the pattern is sufficiently similar to the symbol image to add the pattern to the list of potentially matching patterns. Again, when the list of potentially matching patterns is filled, this inner for-loop is also short-circuited. FIG. 23 provides an estimate for the computational complexity of this third implementation of the routine "process" 2320. Because both the outer and inner for-loops 2314 and 2316 are short-circuited when a sufficient number of potentially matching patterns is found, and because the vectors or lists of patterns within each cluster are sorted by frequency of occurrence in the actual document being processed, only a relatively small fraction of the comparisons needed in the second implementation of the routine "process" are needed by the third implementation, as represented by the fraction $$\frac{1}{d} 2322.$$

There is, of course, an initial preprocessing penalty represented by the term "e" 2344. However, as discussed above, the number of symbol images that are processed, N, is generally quite small in comparison to P or P', for languages such as Chinese, Japanese, and Korean, and therefore the third implementation of the routine "process" provides significantly decreased computational complexity in comparison to either the first or second implementations of the routine "process," discussed above. More importantly, the third implementation of the routine "process" is guaranteed to look through all of the clusters until some maximum number of potentially matching symbols is found. When the threshold for similarity for clusters is set to a relatively low value and the threshold for similarity for patterns is set relatively high, there is a very high probability that the list of potentially matching symbols returned by the routine "process" will include the actual symbol that best matches the input symbol image.

The above discussion, including the third implementation outlined in FIG. 23, provides a context for describing a particular aspect of this generalized third implementation to which the current document is directed. It should be clearly understood that the above-described implementations are generalized implementations and that any particular implementation of an OCR system may use any of a large number of different possible alternative implementations.

The current document is directed to the control logic and data structures within an OCR system that allows for both clustering of patterns as well as for the above-described preprocessing step in which graphemes within patterns can be sorted by the frequency of occurrence of the graphemes within a text-containing scanned image or set of scanned images. These control logic and data structures are used in a preprocessing/clustering OCR implementation in which a fixed set of parameters is associated with each cluster and used in symbol-image/pattern comparisons with respect to patterns contained in the cluster. The clusters may be used in different local operations or phases of a complex OCR processing task, and the particular parameters used, and the number of parameters used, for symbol-image/pattern comparisons with respect to patterns contained in the cluster may differ in different local operations and phases, and may often differ among different clusters. In an alternative implementation, clusters are not used.

Figure 24:
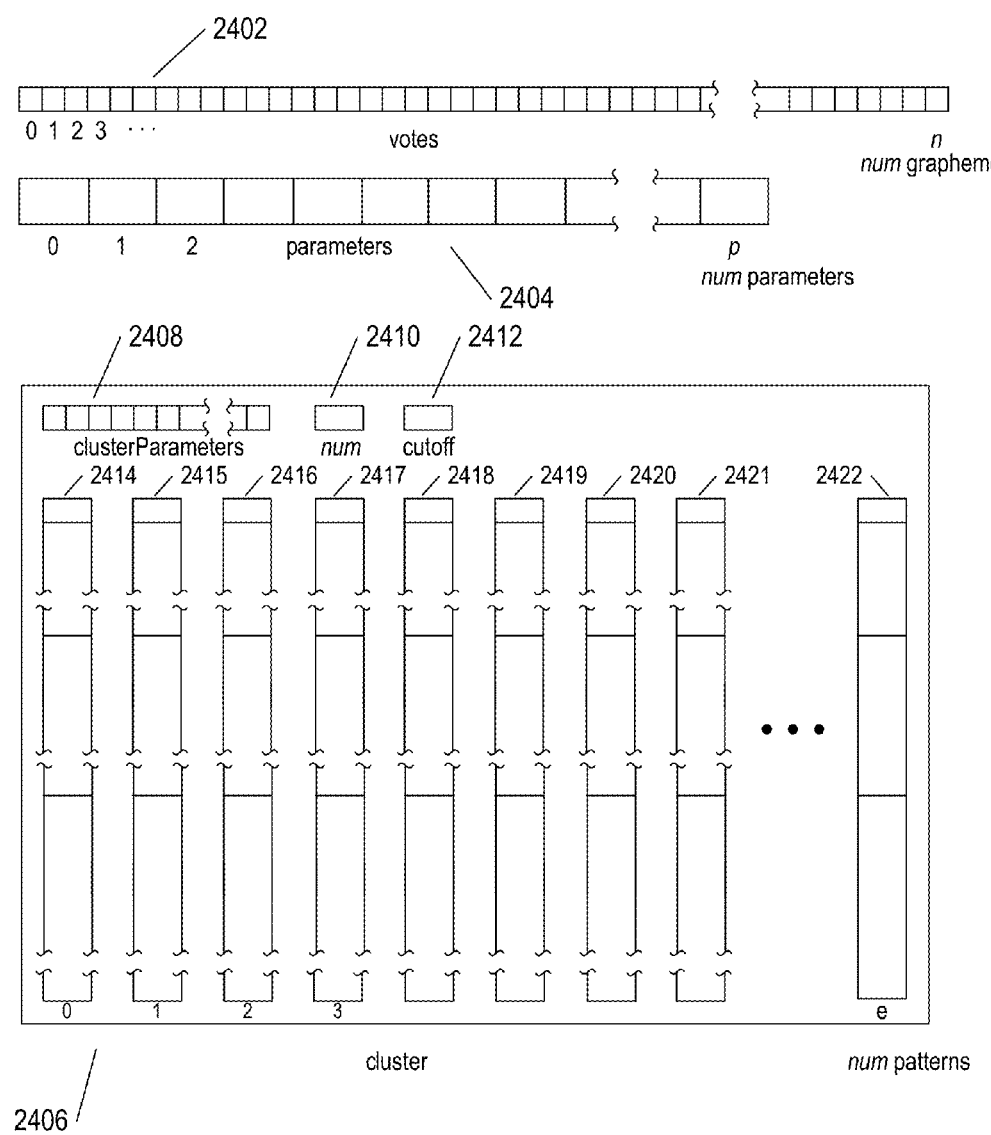
FIG. 24 illustrates data structures that provide for clustering and preprocessing in one implementation of an OCR system that incorporates the general third implementation of the routine "process."

FIG. 24 illustrates data structures that provide for clustering and preprocessing in one implementation of an OCR system that incorporates the general third implementation of the routine "process," described above. A first data structure is an array or vector 2402 referred to as "votes." In a described implementation, the array "votes" includes one element for each of the graphemes of a language. The array "votes" is indexed by integer grapheme codes. In other words, each grapheme is assigned a unique integer identifier, and that unique identifier, or code, for a grapheme serves as an index into the array "votes." As shown in FIG. 24, the array "votes" may be implemented with n entries, where n is the number of graphemes in the language and the grapheme codes monotonically increase from 0 to n. Of course, the data structure "votes" may be alternatively implemented as a sparse array, when grapheme codes are not monotonically increasing, as a list, or using other types of data structures.

FIG. 24 shows a second data structure 2404 which is an array of instances of the class "parameter." As with the data structure "votes," the array "parameters" may be alternatively implemented by various alternative data structures, including lists, sparse arrays, and other data structures. In the currently described implementation, the array "parameters" includes p entries or elements that are indexed by monotonically increasing parameter numbers 0, 1, 2, . . . , p. Each instance of the class "parameter" represents one of the various parameters used to characterize symbol images and patterns, as discussed above.

FIG. 24 additionally shows a cluster data structure 2406 that represents a cluster or set of patterns. The cluster data structure includes an array "clusterParameters" 2408 that represents the parameters used to characterize the patterns within the cluster at a particular point in time as well as to characterize symbol images for comparison with the patterns contained in the cluster. Each element in the array "clusterParameters" contains an index into the array "parameters" 2404. By using indices into the array "parameters" 2404, the particular parameters and the number of parameters used for comparisons can be easily changed or reconfigured, so that the cluster can be efficiently reconfigured for different local operations or phases. The cluster data structure also includes an integer num 2410 that indicates the number of parameter indices contained in the array "clusterParameters." The cluster data structure additionally contains a double, or floating-point, value, referred to as "cutoff" 2412 that contains a threshold weight for evaluation of patterns, contained in the cluster, with respect to a symbol image. Finally, the cluster data structure 2406 includes a number of pattern data structures 2414-2422. The pattern data structures are discussed below.

Figure 25A:
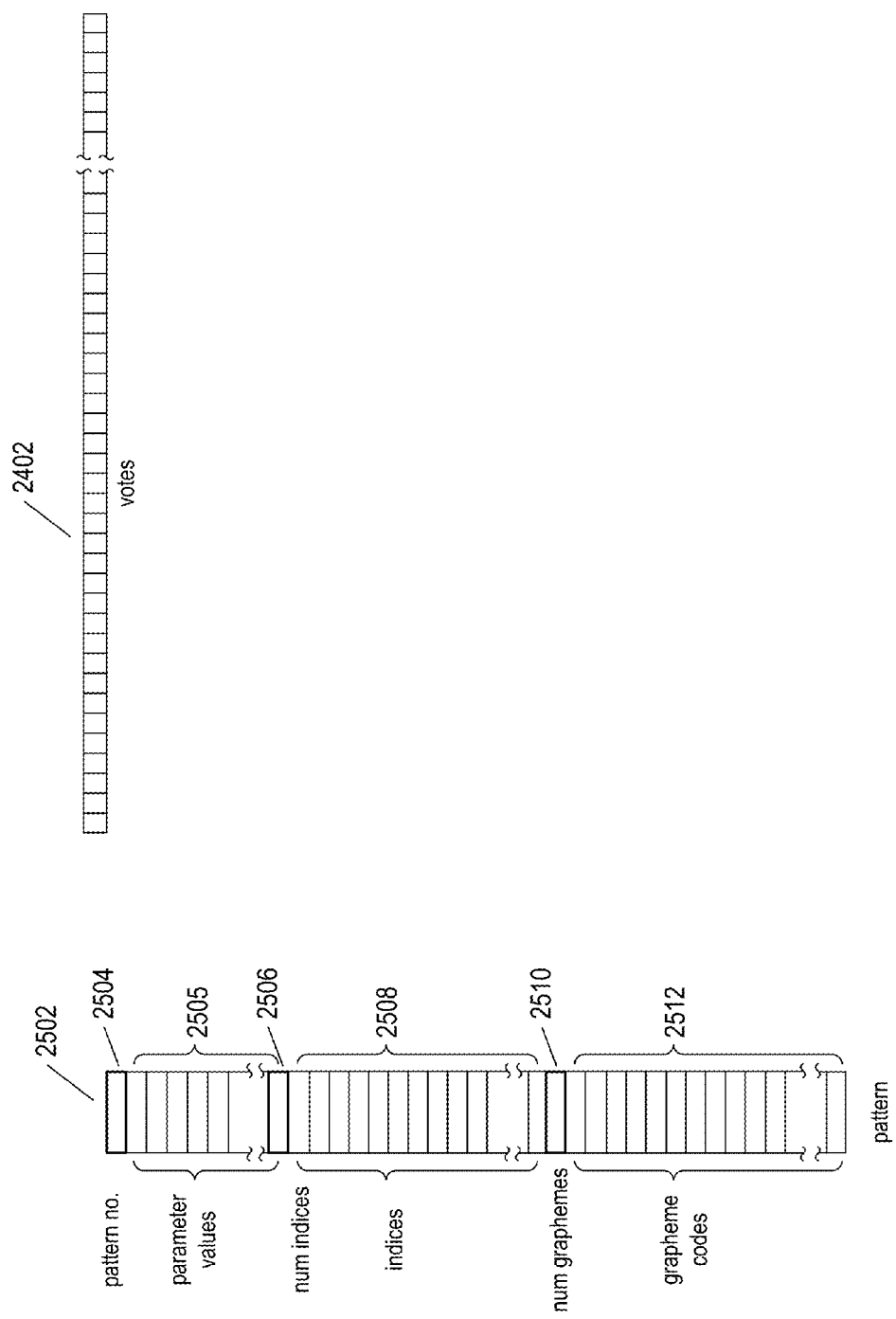
FIG. 25A illustrates preprocessing of a symbol image using the data structures discussed above with reference to FIG. 24.

FIGS. 25A-H illustrate preprocessing of a symbol image using the data structures discussed above with reference to FIG. 24. FIG. 25A shows the data structure "votes" 2402, discussed above with reference to FIG. 24, and a single pattern data structure 2502 selected from the patterns contained in the cluster data structure 2406, also discussed above with reference to FIG. 24. Each pattern data structure includes a pattern number 2504 and a set of parameter values 2505 computed for the pattern using the parameters referenced by indexes contained in the "clusterParameters" array 2408 within the cluster data structure 2406. As noted above, it is important to remember that symbol images are scaled, rotated, and translated to create normalized symbol images to facilitate parameter-based comparisons between symbol images and patterns. The pattern data structure additionally includes an integer 2506 that indicates the number of indices within the pattern data structure, and then the indicated number of indices 2508. These indices are associated with the different possible weights that can be computed during comparison of a symbol image with a pattern. In one implementation, there may be as many indices within the pattern data structure as there are possible computed weights, with each index comprising an integer index as well as the computed weight associated with the index. Other implementations are possible. When a symbol image is parameterized, and the parameter values for the symbol image compared to the pattern represented by the pattern data structure, a weight is produced. The greater the weight value, the less well the symbol image matches the pattern. This weight is used to select a corresponding index, from the indices, that is used to select a number of graphemes corresponding to the pattern for which to vote, during the preprocessing step. Each pattern data structure includes an integer indicating the number of graphemes corresponding to the pattern 2510 and then one code for each grapheme of the set of graphemes corresponding to the pattern 2512. In many implementations, these grapheme codes are sorted with respect to similarity or closeness to the encompassing pattern, in decreasing similarity order.

FIGS. 25B-H illustrate preprocessing of a single symbol image selected from a text-containing scanned image. In the example of FIGS. 25B-H, the symbol image 2514 represents a character from an Asian language. FIG. 25B also shows the array "parameters" 2404, discussed above with reference to FIG. 24, and a small portion of the clusters data structure 2406 that includes the array "clusterParameters" 2408 and the integer num 2410.

Figure 25D:
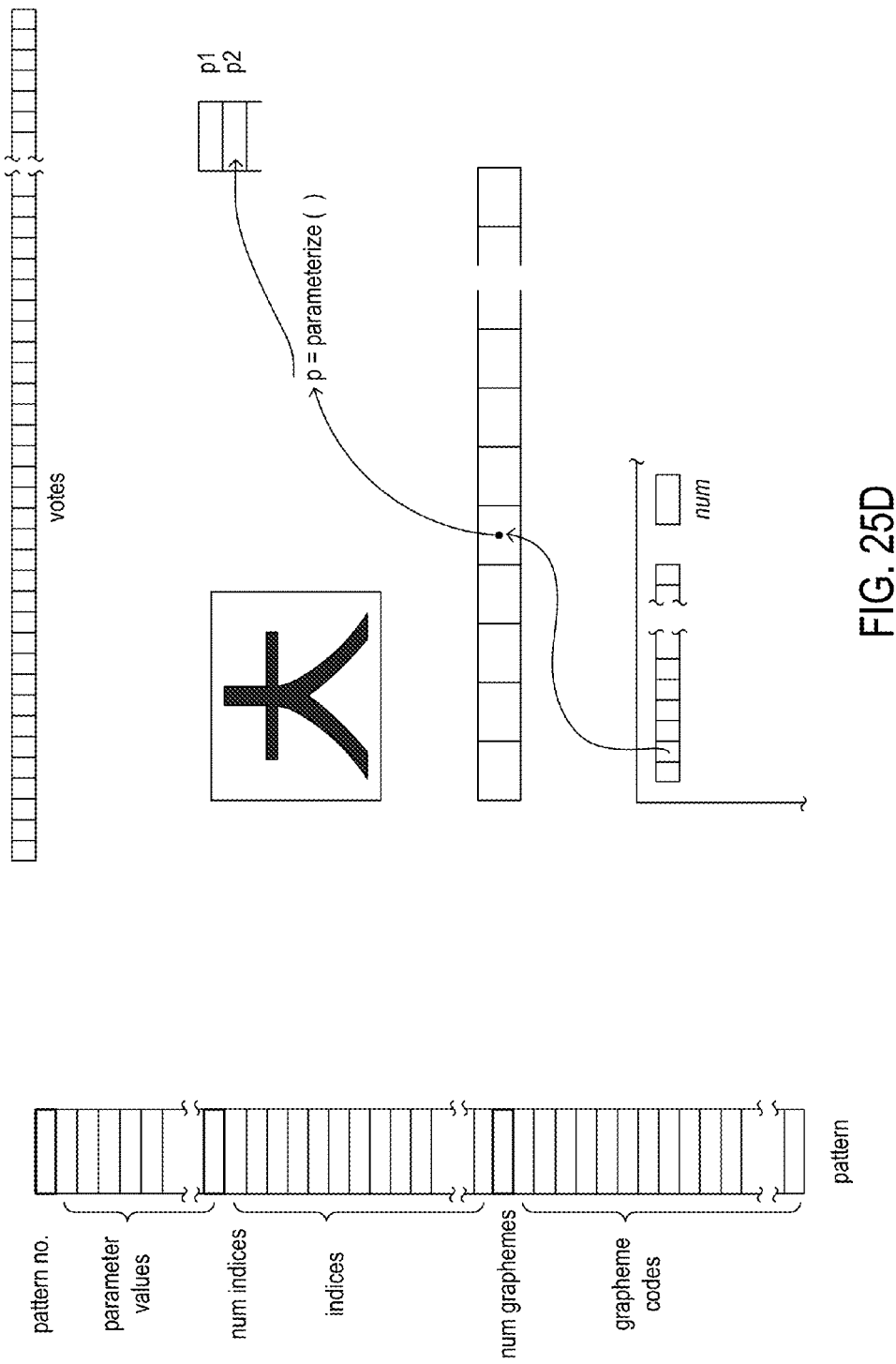
FIG. 25D illustrates preprocessing of a symbol image using the data structures discussed above with reference to FIG. 24.
Figure 25E:
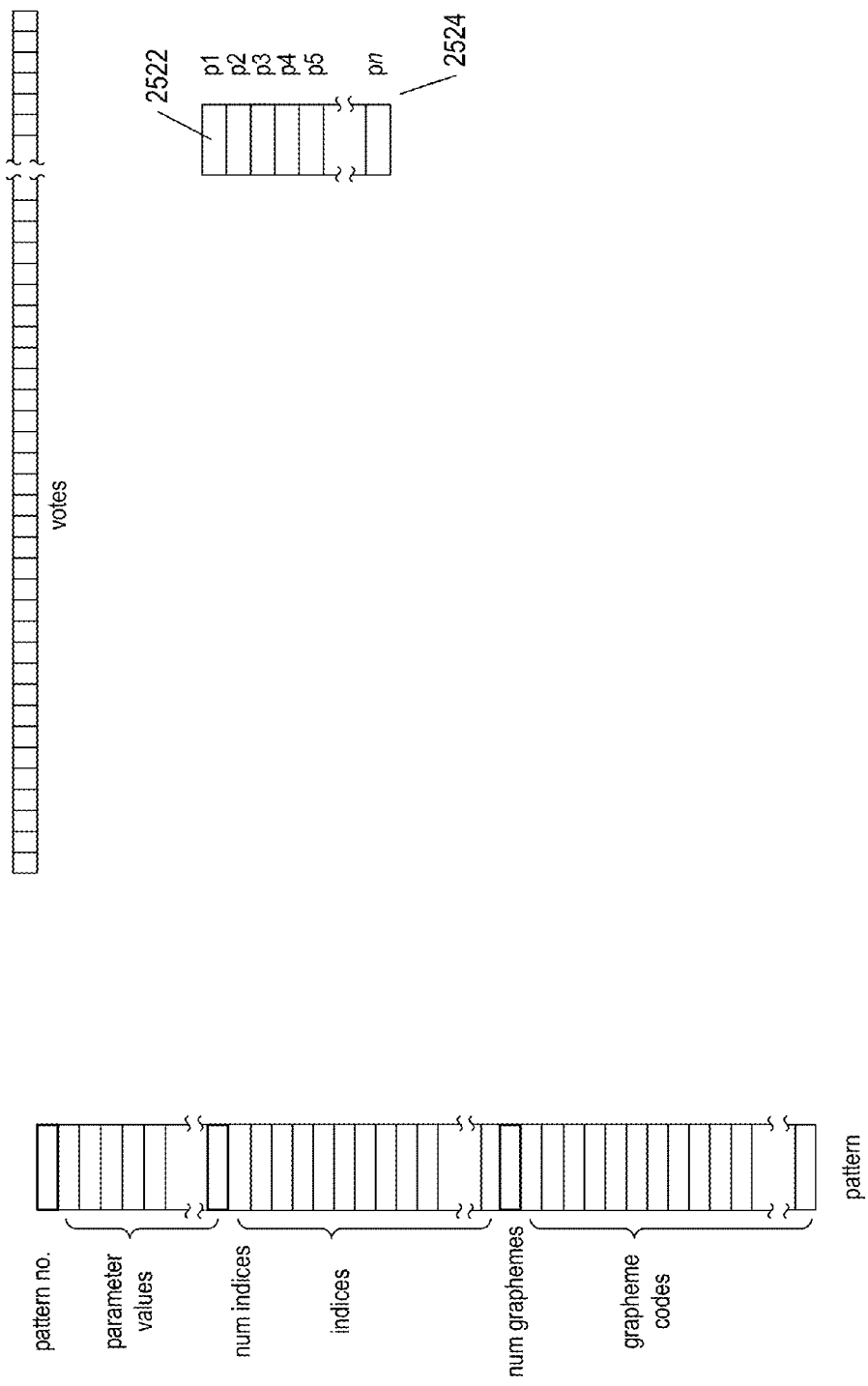
FIG. 25E illustrates preprocessing of a symbol image using the data structures discussed above with reference to FIG. 24.

As shown in FIG. 25C, for each of the num parameters, indexes for which are included in the array "clusterParameters" 2408, the index for a parameter 2516 is extracted from the array "clusterParameters" 2408 and used to access an instance of the class "parameter" 2518 within the array "parameters" 2404. A member function "parameterize" of the instance of the class "parameter" 2518 is called to generate a parameter value 2520 that is then stored in a local variable 2522. FIG. 25C illustrates computation of a first parameter value for the symbol image. FIG. 25D shows computation of a second parameter value for the symbol image. When all num instances of the class "parameter" have been invoked to generate num parameter values for the symbol image, a list or array of symbol-image parameter values 2524 is obtained, as shown in FIG. 25E.

Figure 25F:
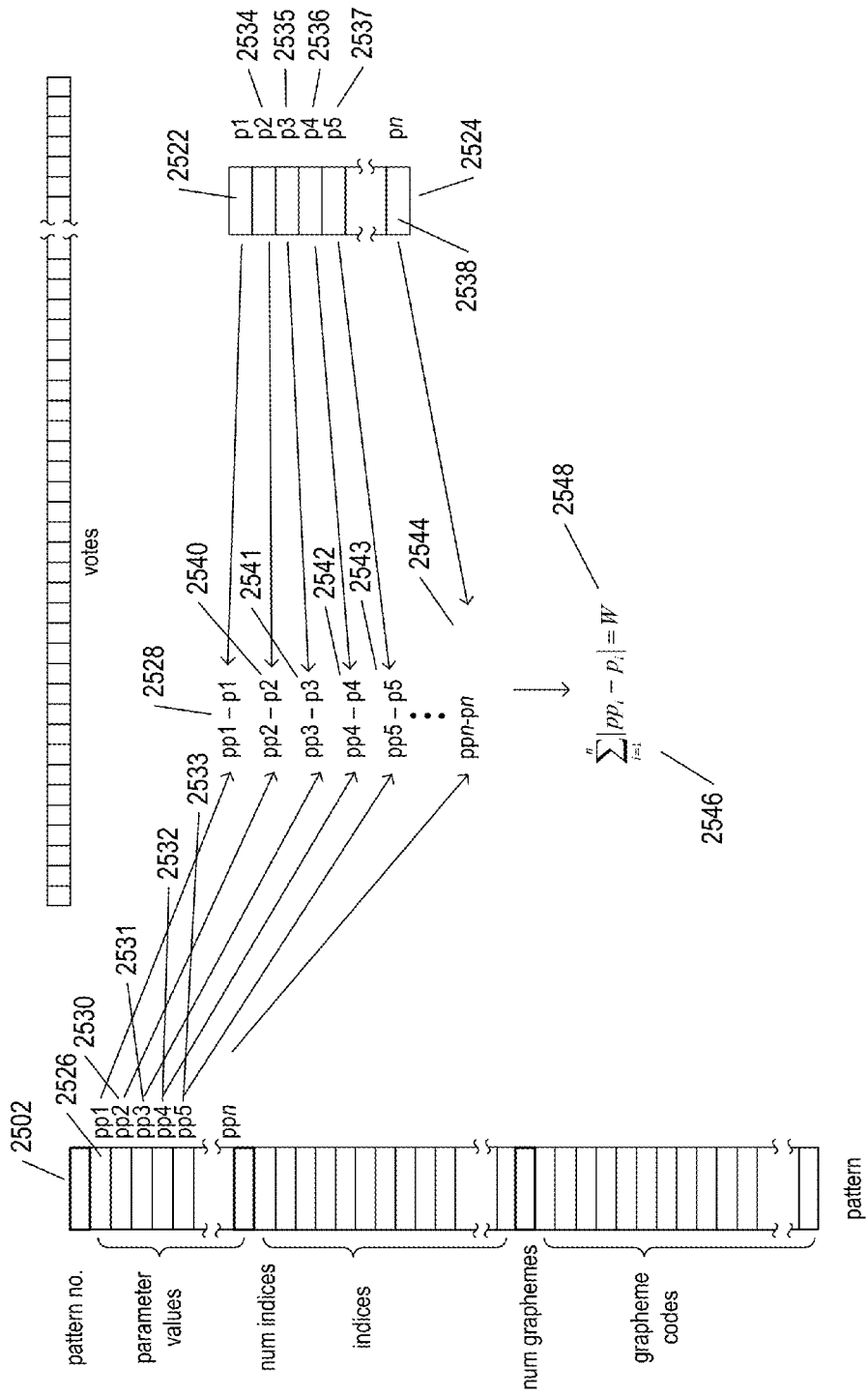
FIG. 25F illustrates preprocessing of a symbol image using the data structures discussed above with reference to FIG. 24.

Next, as shown in FIG. 25F, the corresponding parameter value precomputed for the pattern represented by the pattern data structure and parameter for the symbol image are subtracted to produce a series of computed values, one for each parameter. For example, as shown in FIG. 25F, the first parameter value 2526 stored in the pattern data structure 2502 and the first parameter value 2522 computed for the symbol image are subtracted to produce an intermediate value 2528. The remaining predetermined parameter values for the pattern 2530-2533 and the remaining parameter values for the symbol image 2534-2538 are similarly subtracted to produce additional intermediate computed values 2540-2544. The absolute values of these intermediate values 2528 and 2540-2544 are summed 2546 to produce the weight 2548 that numerically represents a parameter-based comparison between the symbol image and the pattern represented by the pattern data structure 2502. Again, the greater the value of the computer weight, the less similar the symbol image to the pattern, as the weight is an accumulation of differences between parameter values for the symbol image and pattern.

Figure 25G:
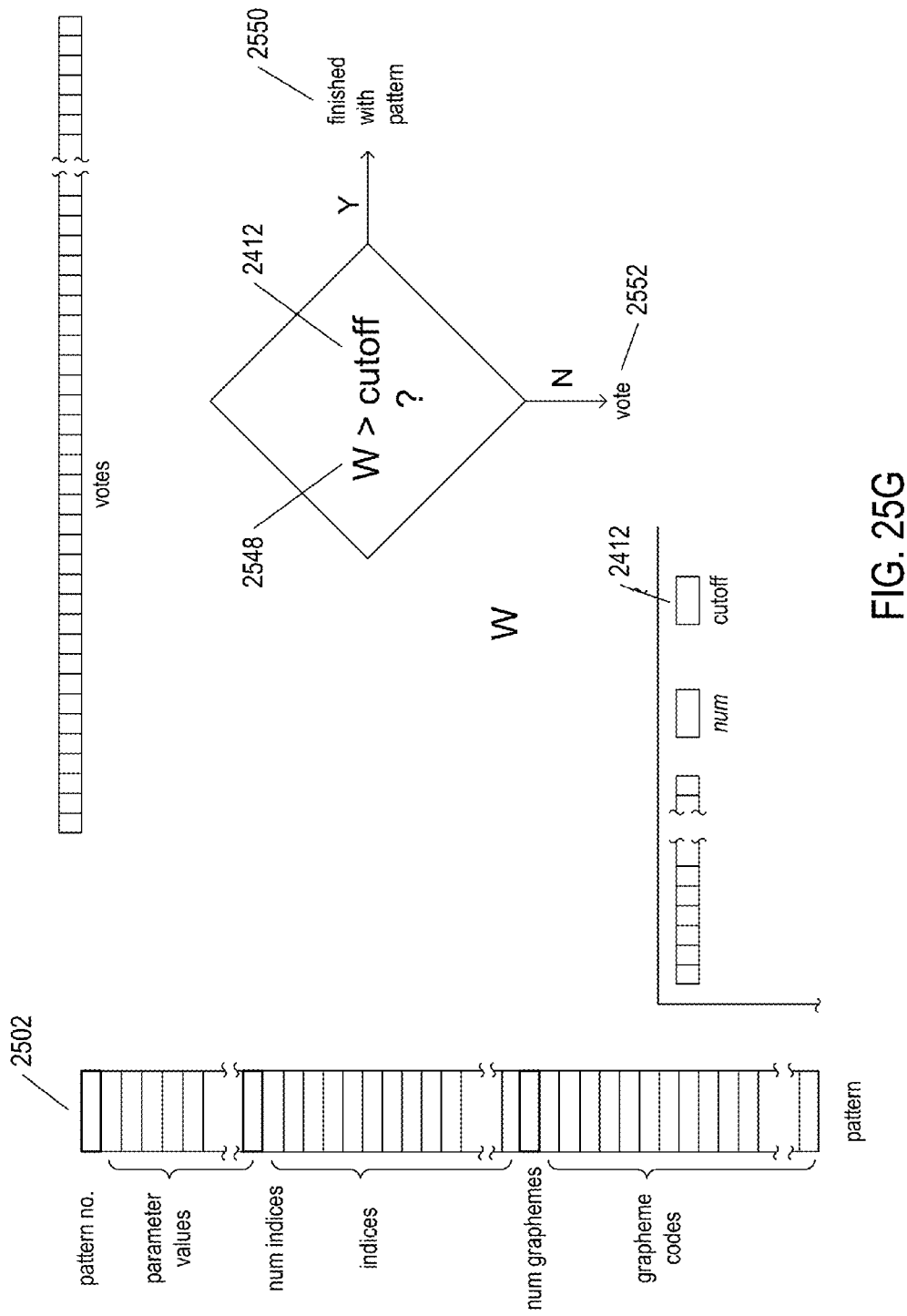
FIG. 25G illustrates preprocessing of a symbol image using the data structures discussed above with reference to FIG. 24.

As shown in FIG. 25G, when the computed weight 2548 is greater than the cutoff value 2412 for the cluster, the preprocessing for the symbol image with respect to the pattern represented by the pattern data structure 2502 is finished 2550. Otherwise, the preprocessing of the symbol image votes for one or more of the graphemes corresponding to the pattern represented by the pattern data structure 2552.

Figure 25H:
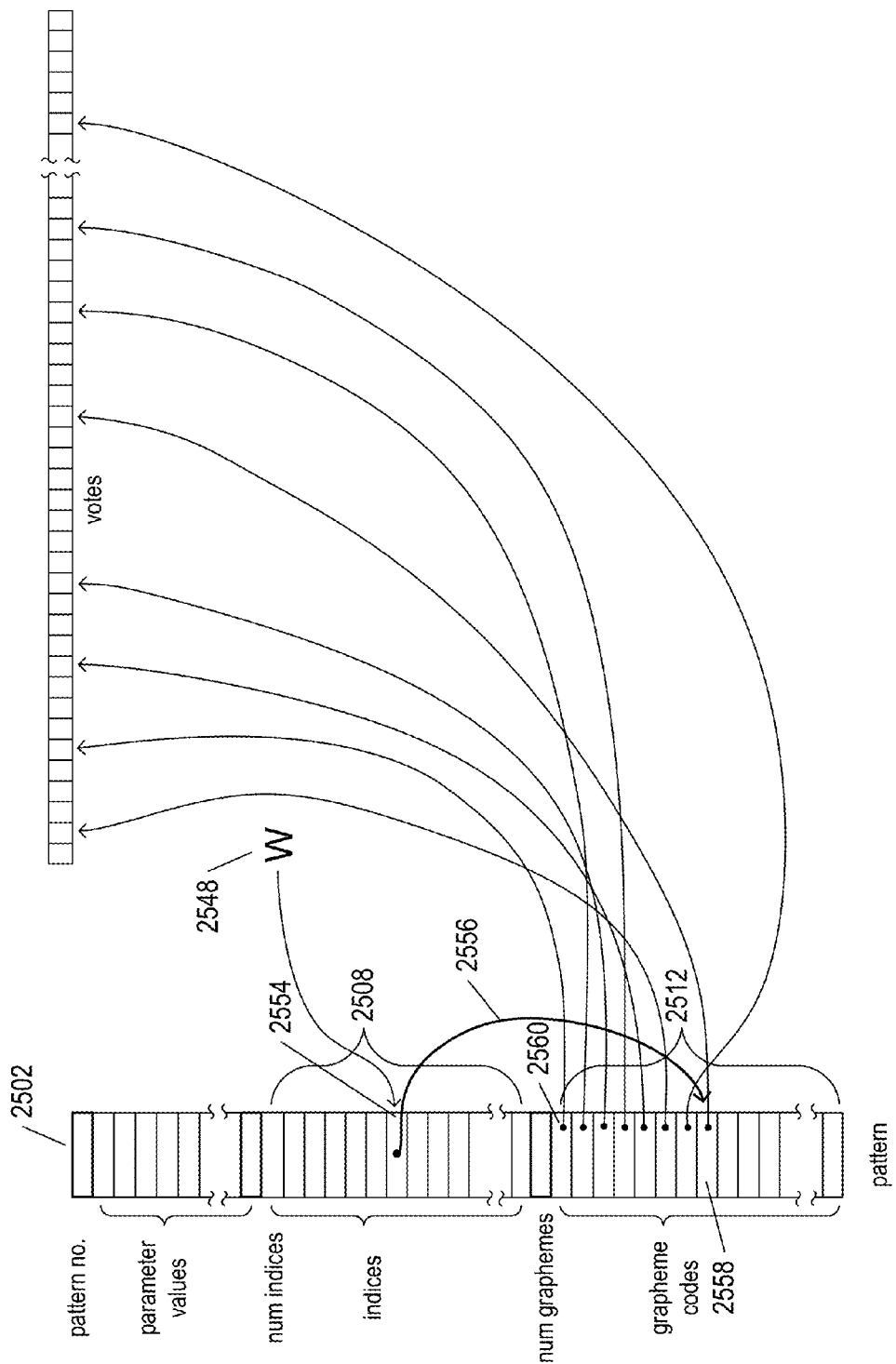
FIG. 25H illustrates preprocessing of a symbol image using the data structures discussed above with reference to FIG. 24.

FIG. 25H illustrates the case when the computed weight that represents the comparison of the symbol image with the pattern represented by the pattern data structure is less than or equal to the cutoff value for the cluster. In this case, the computed weight 2548 is used to select an index 2554 from the set of indices 2508. As discussed above, each of the indices 2508 may contain an index and an associated weight, allowing a particular one of the indices 2554 to be selected by the computed weight 2548, from index which an index into the grapheme codes is extracted. This extracted index points 2556 to a particular grapheme code 2558 within the set of grapheme codes 2512 stored within the pattern data structure to represent those graphemes that correspond to the pattern. Then, for all of the grapheme codes beginning with a first grapheme code 2560 and extending to the grapheme code 2558 pointed to by the extracted index 2556, the corresponding element of the data structure "votes" 2402 is incremented, as represented by the arrows emanating from the elements containing grapheme codes between and including elements 2560 and 2558, such as arrow 2562.

Thus, when the computed weight for the comparison of the symbol image to the pattern is less than the cutoff value, then the symbol image is sufficiently similar to the pattern that at least some of the graphemes corresponding to the pattern deserve a vote in the preprocessing step. Those graphemes sufficiently similar to the symbol image are selected based on the computed weight using an index selected from one of the indices 2508 corresponding to the computed weight. Then, elements of the data structure "votes" corresponding to these graphemes are incremented to reflect votes for these graphemes based on preprocessing of the symbol image.

There are many different alternative approaches to the preprocessing step and above-described data structures. For example, rather than a cutoff weight for an entire cluster, cutoff weights for particular patterns may be used, with the cutoff weights included in the pattern data structure. As another example, the indices stored within the pattern may be instances of classes that contain lists of grapheme codes, rather than indexes pointed into an ordered list of grapheme codes, as in the currently described implementation. Many other such alternative implementations are possible. For example, the routine "vote" may receive, as a second argument, a pointer to an array "params" and, in the for-loop of lines 43-44, may computer parameter values only when they have not already been computed while processing the symbol image with respect to other clusters. Different types of weight computations and symbol-image-to-pattern comparisons may be used in alternative implementations. In certain cases, larger-valued weights may indicate greater similarity between a symbol image and a pattern, unlike the above-described weights that increase in value as the similarity between a symbol image and a pattern decreases. In certain OCR systems, real coefficients may be associated with graphemes to allow for fractional votes and votes greater than 1. In certain OCR systems, graphemes, patterns, and/or clusters may be sorted, based on votes accumulated during preprocessing, to facilitate efficient subsequent symbol recognition. In certain implementations, a cluster data structure may include only a number of pattern data structures or references to pattern data structures, with the cutoff and patterns associated with the cluster specified in control logic, rather than stored in the cluster data structure.

Figure 26:
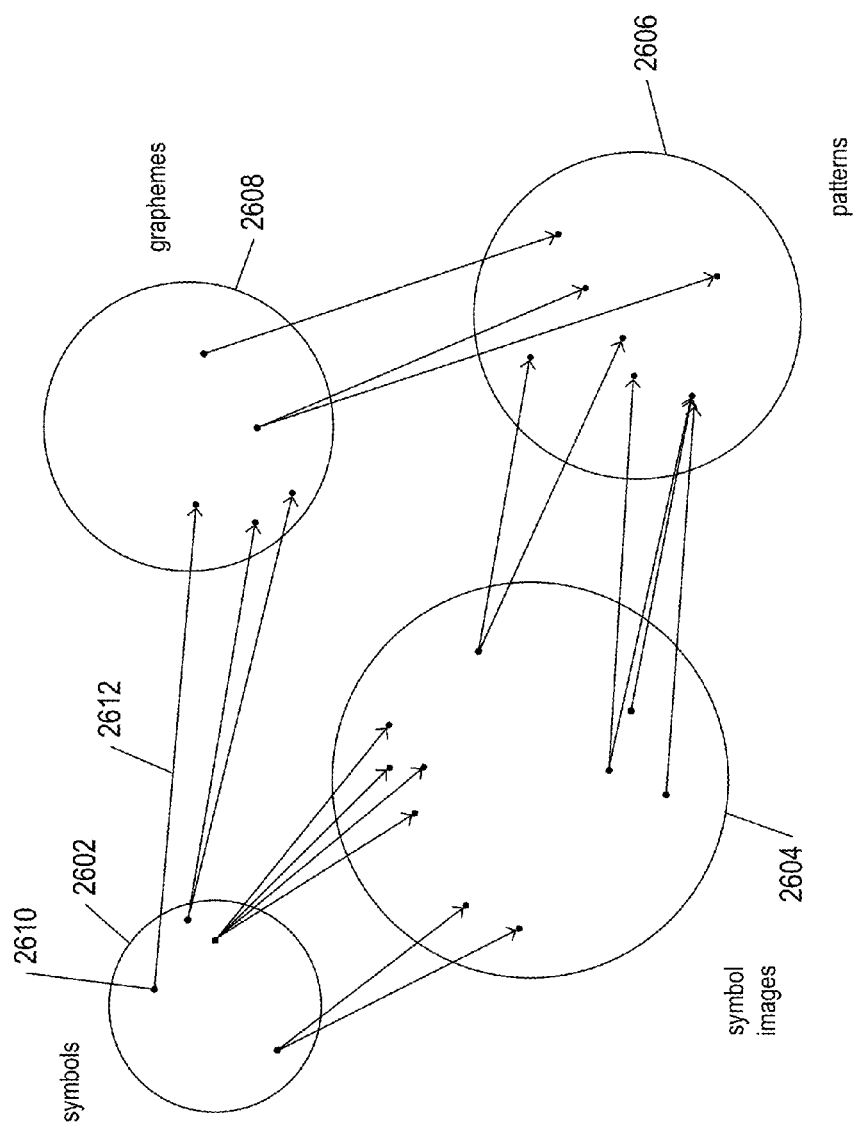
FIG. 26 illustrates the relationships between symbols, symbol images, patterns, and graphemes.

FIG. 26 illustrates the relationships between symbols, symbol images, patterns, and graphemes. In FIG. 26, a first disk 2602 represents the set of symbols, or symbol codes, a second disk 2604 represents the much larger set of possible symbol images, a third disk 2606 represents the set of pattern data structures to which symbol images are matched, during symbol-image processing, and a fourth disk 2608 represents the set of graphemes for the language that includes symbols or symbol codes of set 2602. As indicated by dots, such as dot 2610 representing members of the sets and arrows, such as arrow 1612, that represent mappings between members of one set and members of another set, there is a generally one-to-many mapping of symbols to graphemes, a generally one-to-many mapping of symbols to symbol images, a generally one-to-many mapping of symbol images to pattern data structures, and a generally one-to-many mapping of graphemes to patterns. In the currently described methods and systems, decision forests are used to efficiently match symbol images to patterns and weight-based voting is used to match patterns to graphemes.

Figure 27:
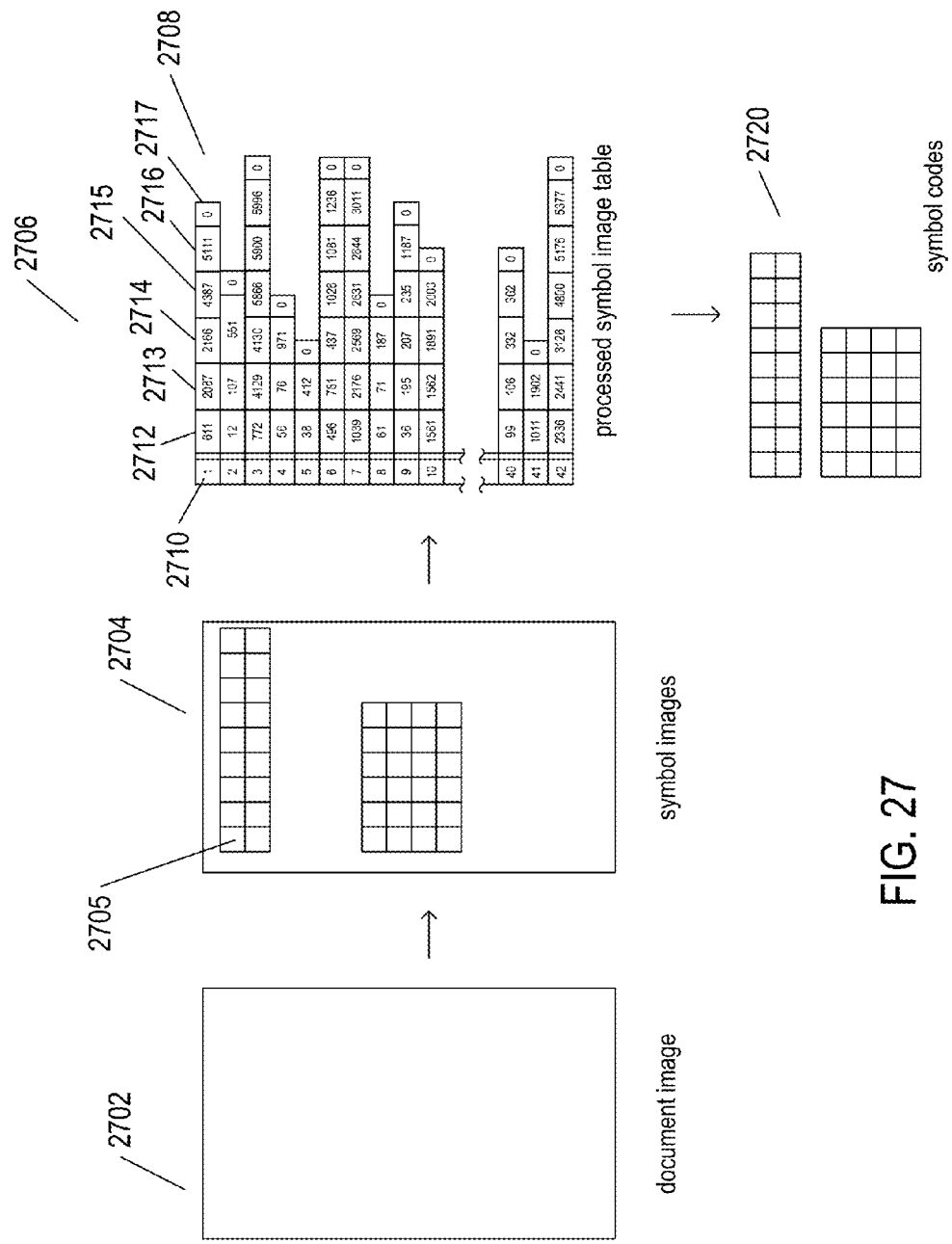
FIG. 27 illustrates a process for transforming symbol images into symbol codes.

FIG. 27 illustrates a process for transforming symbol images into symbol codes. This process is used, by OCR systems, according to the current document, to replace symbol images with symbol codes or other types of symbol identifiers in documents. The process generally starts with one or more document images 2702. The document image is processed in order to identify small sub-images, each containing a single symbol of a language. The initially processed document 2704 produced from the document image is shown to include small sub-images, such as sub-image 2705, that each includes the image of a single symbol. Of course, the initially processed document may be an array of references to sub-images in the document image or any of many different types of processed documents. The initially processed document 2704 is then further processed to produce a processed symbol image table 2706. In this table, each entry, or line, such as entry 2708, includes an indication of the sub-image in the initially processed document to which the entry corresponds 2710 and then an array or set of grapheme codes 2712-2716 that most likely match the symbol image in the particular sub-image. The entries all end with a "0" terminal code 2717 that marks the end of the entry. Of course, there are many different possible ways to encode a processed symbol image table in addition to the approach used to produce the example processed symbol image table 2706 shown in FIG. 27. Finally, the list of grapheme codes that match particular symbol images is used, by later stages of symbol-image processing, along with pattern data structures that voted for the grapheme codes, to produce a single symbol code corresponding to each symbol image for each symbol image in the initially processed document 2704. These symbol codes 2720 can then be stored in association with the non-symbol portions of the document image, separately processed, for example by natural-language processing, or used in many other ways, depending on the OCR system and application.

As discussed above with reference to FIGS. 24 and 25A-H, the pattern and cluster data structures provide the basis for a voting mechanism by which processing of a symbol image leads to casting of votes for graphemes that are likely related to, or that correspond to, the symbol image. In general, the currently described OCR systems employ a relatively large number of cluster data structures, each associated with hundreds of pattern data structures. The process of multi-cluster-data-structure symbol processing is next described with reference to FIGS. 28A-G.

Figure 28B:
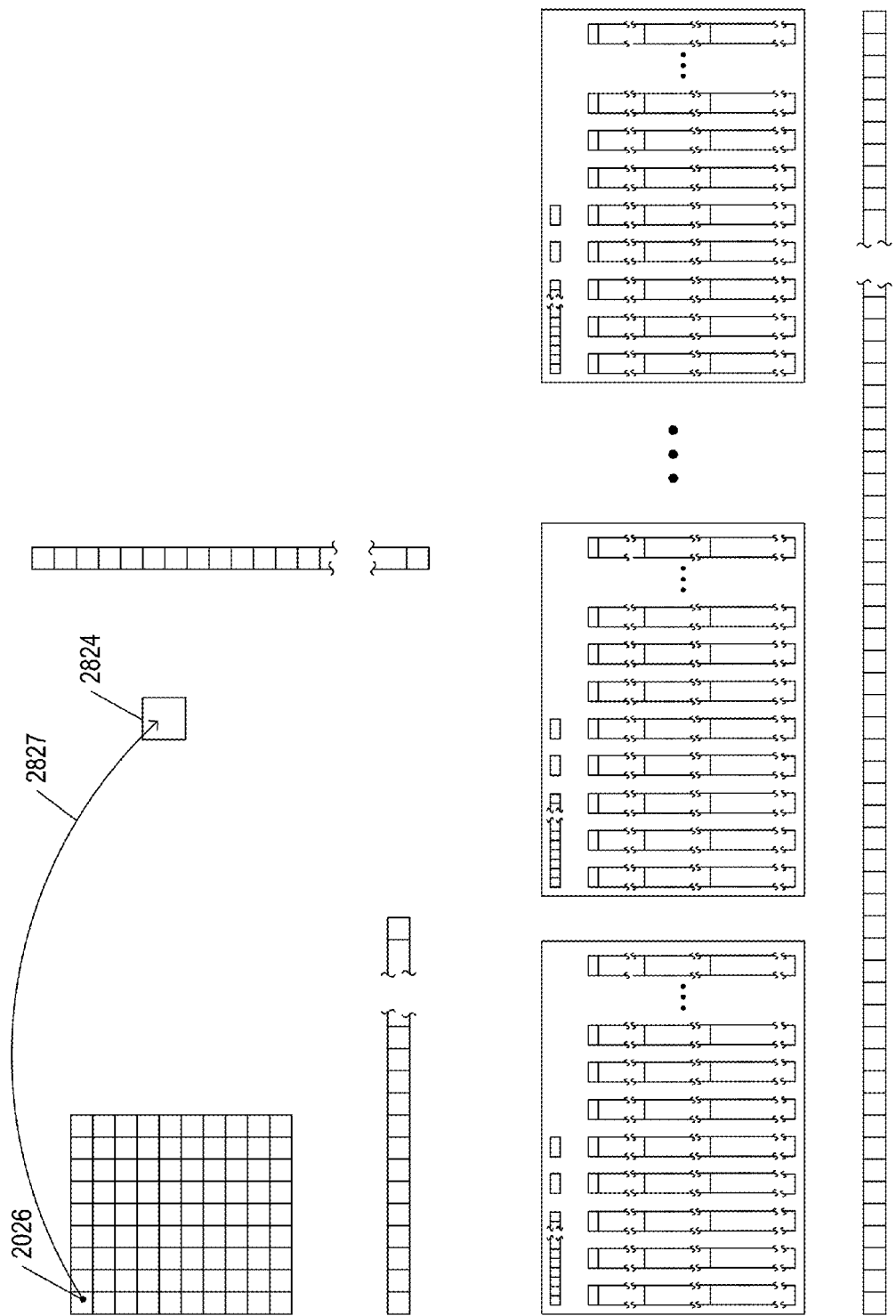
FIG. 28B illustrates the process of multi-cluster-data-structure symbol processing.

FIG. 28A illustrates the data and data structures involved in one example of multi-cluster-data-structure symbol processing. The same illustration conventions that are used in FIG. 28A are also used in FIGS. 28B-G, which follow. In FIG. 28A, many of the data structures illustrated in FIGS. 24 and 25A-G are again shown. These include the parameters array 2802, shown as array 2404 in FIG. 24, a votes array 2804, shown as votes array 2402 in FIG. 24, three cluster data structures 2806-2808, each similar to the cluster data structure 2406 shown in FIG. 24, and an array of computed parameter values 2810, similar to the array of computed parameter values 2524 shown in FIG. 25F. Note that the data structures are initialized to include appropriate values, with the votes array initialized to have all zero values. Each cluster data structure, including cluster data structure 2806, includes a parameters array 2812, similar to the clusterParameters array 2408 shown in FIG. 24, a num value 2814 and a cutoff value 2816 that are similar to the num and cutoff values 2410 and 2412 shown within cluster 2406 in FIG. 24, and multiple pattern data structures, including pattern data structure 2818, similar to pattern data structure 2502 in FIG. 25A. In addition, FIG. 28A shows a two-dimensional-array-like data structure 2820 that represents a scanned image of a document page that includes a grid-like array of symbol images, with each cell of the grid, including cell 2822, representing a symbol image. Also, a currently considered symbol-image variable 2824 is shown in FIG. 28A.

The data structures shown in FIG. 28A may be implemented in many different ways, using many different programming languages and data-storage techniques. The data structures may include additional data and data substructures. For example, in one implementation, each pattern data structure in each cluster is referenced from a sorted array of cluster-data-structure references. In alternative implementations, each pattern data structure in each cluster is associated with a numerical order, allowing the pattern data structures to be traversed in a sorted order. In certain implementations, the pattern data structures may be included in a cluster data structure, while, in other implementations, the pattern data structures may be referenced from the cluster data structure. In many implementations, the data structures may be dynamically expanded or contracted, to adjust to changes in the types of OCR processing to which they are applied. Thus, for example, although the term "array" is used to describe the votes data structure, the votes data structure may be implemented using data structures other than simple arrays that allow for array-like indexing of elements.

The text data structure 2820 represents a page of a document that is to be processed by the multi-cluster-data-structure symbol processing method in order to generate an equivalent, electronic document containing symbol codes from the input scanned document containing symbol images. The terms "document," "page," and "symbol image" may have different meanings in different contexts. In the current example, a document consists of multiple pages and each page includes multiple symbol images. Of course, the same or a similar multi-cluster-data-structure symbol processing method can be applied to a variety of different types of documents, whether or not containing pages, that include one or more symbol images.

Figure 28C:
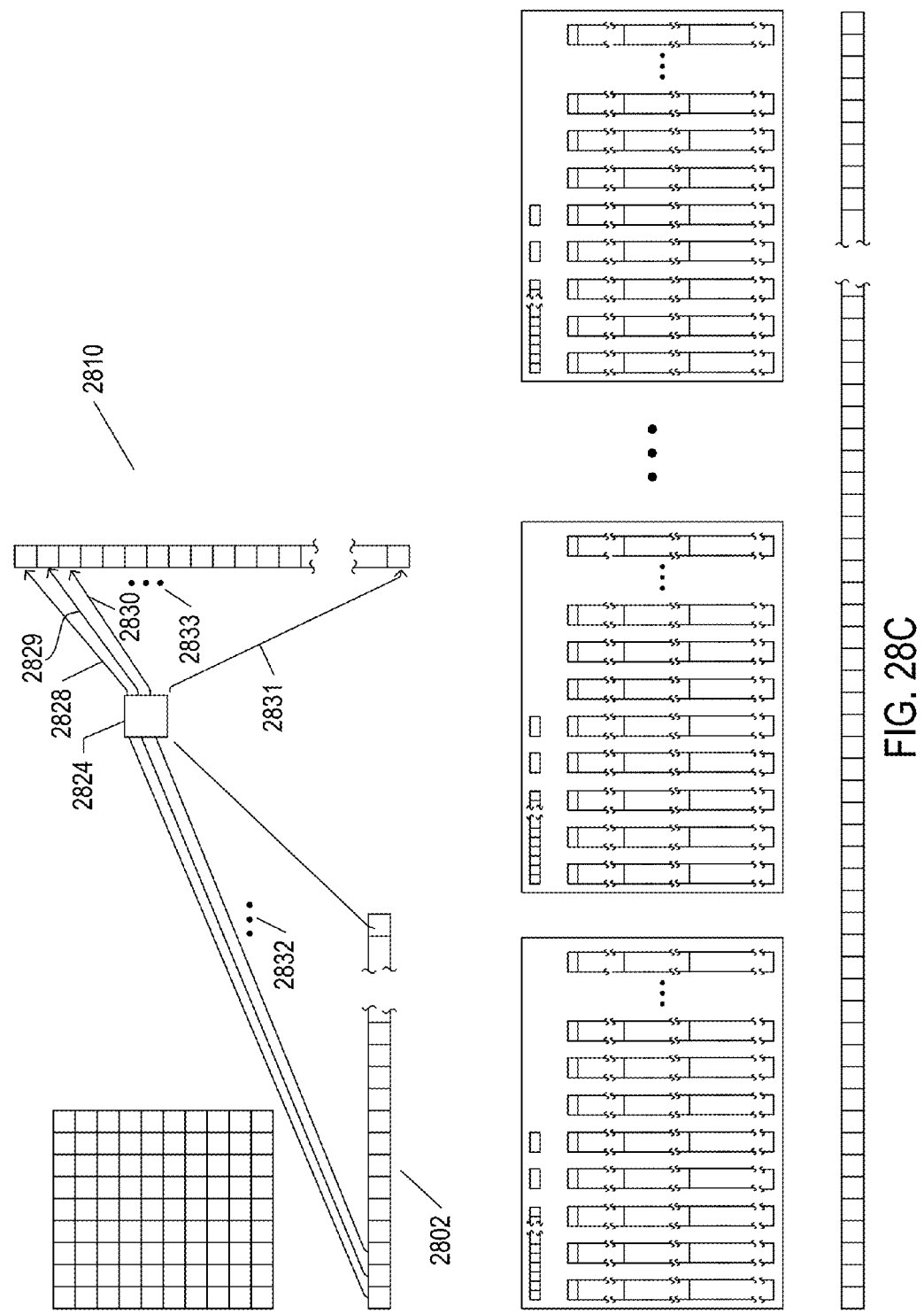
FIG. 28C illustrates the process of multi-cluster-data-structure symbol processing.

In a first step, shown in FIG. 28B, an initial symbol image 2826 is read into, or referenced from, the currently considered symbol-image variable 2824, as represented by curved arrow 2827. Next, as illustrated in FIG. 28C, each parameter-computing function or routine included in, or referenced from, the parameters array 2802 is applied to the currently considered symbol image stored in, or referenced from, variable 2824 to generate corresponding parameter values stored in the array of computed parameter values 2810, as represented by arrows 2828-2831 and ellipses 2832-2833. Thus, the array of computed parameter values 2810 includes, in one implementation, numeric parameter values, corresponding to each of the parameters represented by functions or references to functions in parameter array 2802, computed with respect to a currently considered symbol image. Computation of parameter values is previously discussed with reference to FIGS. 19C-D.

Figure 28D:
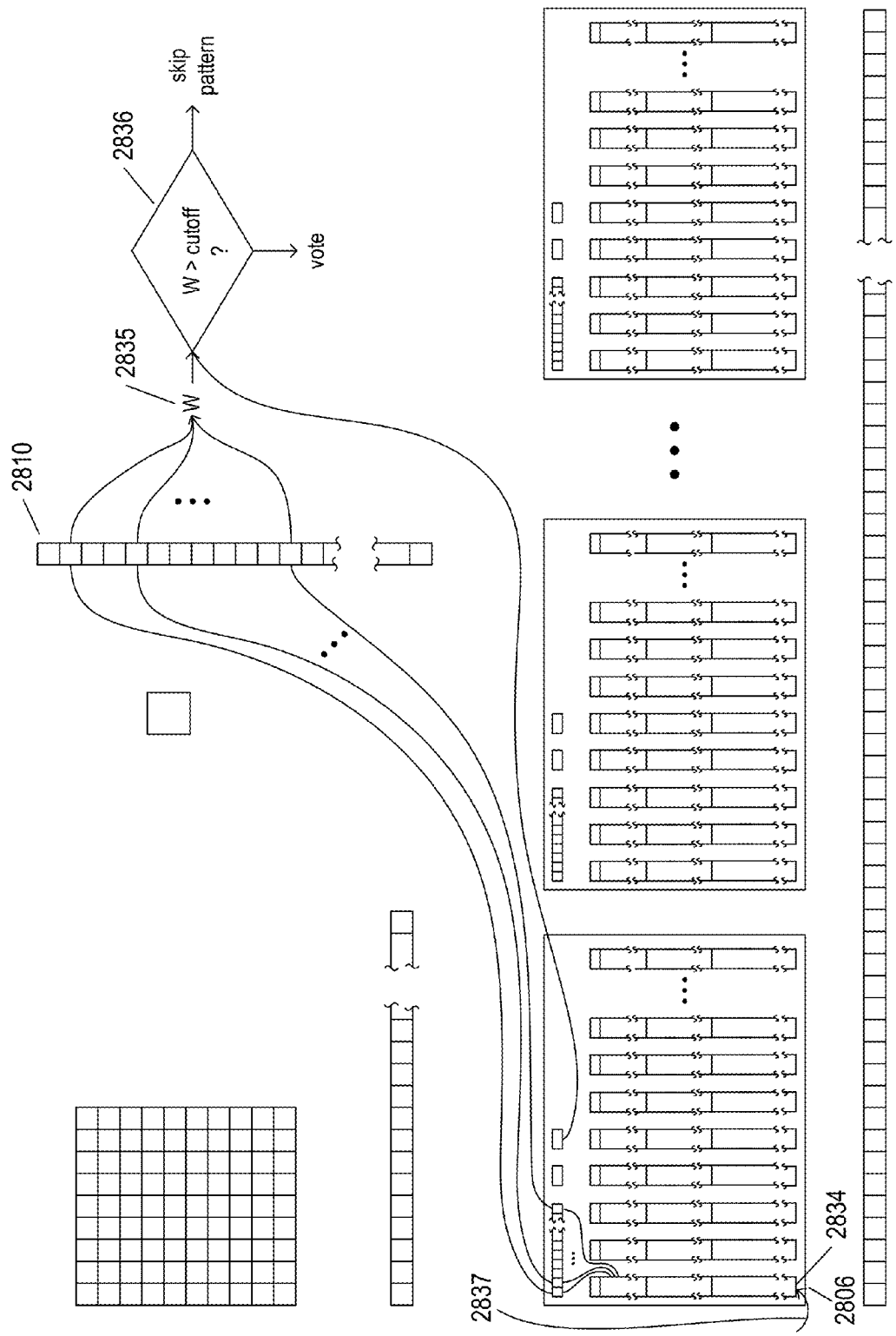
FIG. 28D illustrates the process of multi-cluster-data-structure symbol processing.
Figure 28E:
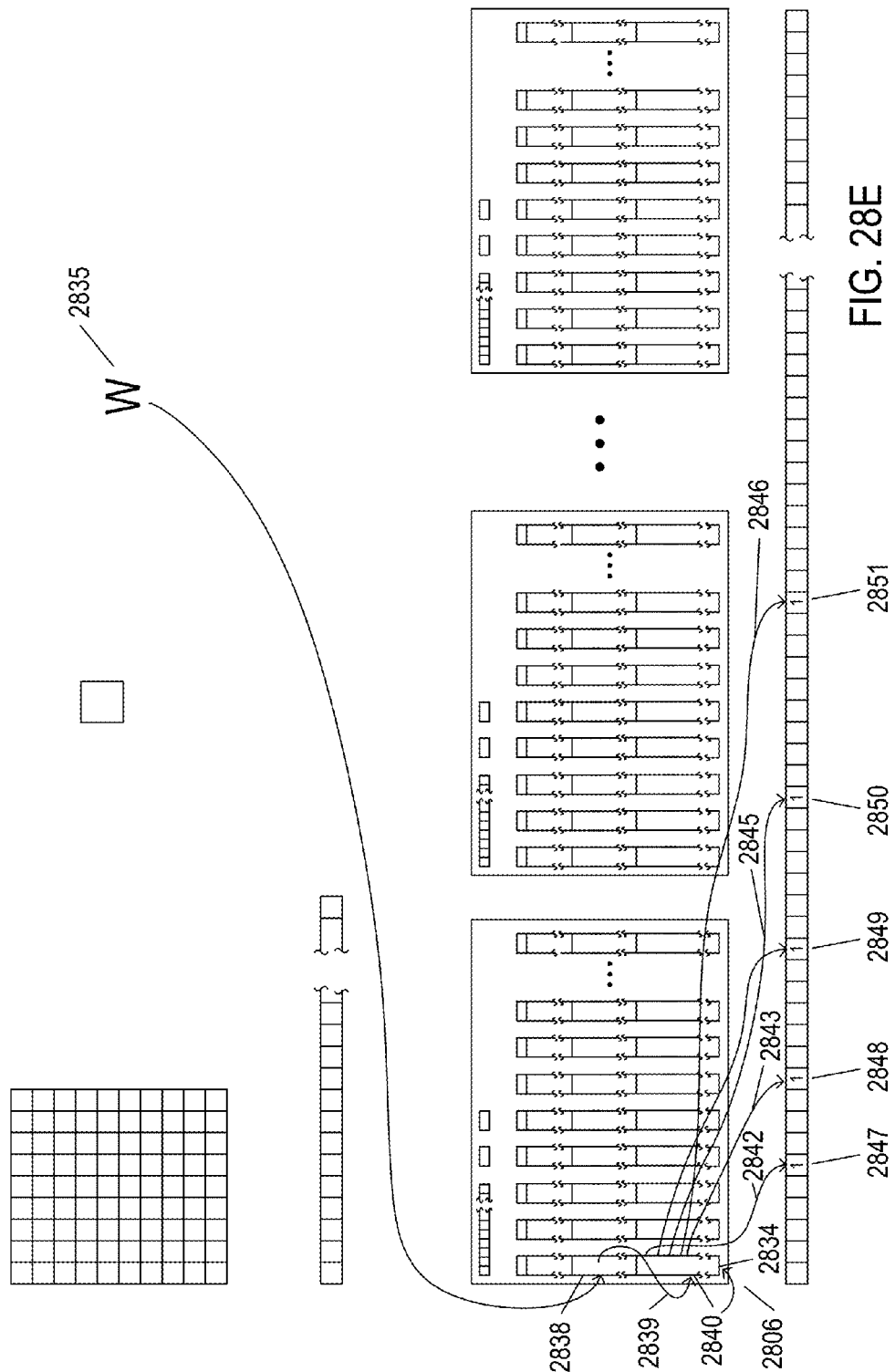
FIG. 28E illustrates the process of multi-cluster-data-structure symbol processing.

Next, as shown in FIG. 28D, the first pattern data structure 2834 of the first cluster data structure 2806 is selected and the parameter values associated with the first pattern data structure are used, together with corresponding parameter values in the array of computed parameter values 2810, to compute a weight W 2835, as previously discussed above with reference to FIG. 25F. Selection of the first pattern data structure is illustrated by curved arrow 2837. Note that the cluster-data-structure parameter array (2812 in FIG. 28A) is used to index the array of computed parameter values. As discussed above with reference to FIG. 25G, the computed weight is then compared with the cutoff value (2816 in FIG. 28A) 2836 to determine whether or not the first pattern data structure 2834 in the first cluster data structure 2806 can vote for graphemes, as discussed above with reference to FIG. 25H. In the current example, as shown in FIG. 28E, the computed weight 2835 is below the cutoff value, resulting in accumulation of votes in the votes array 2824 produced from the first pattern data structure 2834 in the first cluster data structure 2806. As discussed previously with reference to FIG. 19H, the computed weight 2835 is used as an index into a set of indices 2838 within the first pattern data structure 2834 and the contents of a selected member of the indices is used 2839 as an index into a grapheme-code-portion of the first pattern data structure 2840. Votes are generated for all graphemes corresponding to grapheme codes in the grapheme-code portion of the first pattern data structure from the first grapheme code down to the grapheme code indexed by the index selected from the indices portion of the pattern data structure. In FIG. 28E, the votes produced from the first pattern data structure 2834 within the first cluster data structure 2806 are represented by curved arrows 2842-2846. The blank values in the votes array (2804 in FIG. 28A) represent 0 values. The initial voting corresponding to the first pattern data structure 2834 in the first cluster data structure 2806 therefore increments the cumulative vote values 2847-2851 from 0 to 1 within the votes array for those graphemes for which corresponding grapheme codes are selected from the first pattern data structure. In alternative implementations, a vote may involve adding a number other than 1 to the value contained in the votes array.

Figure 28F:
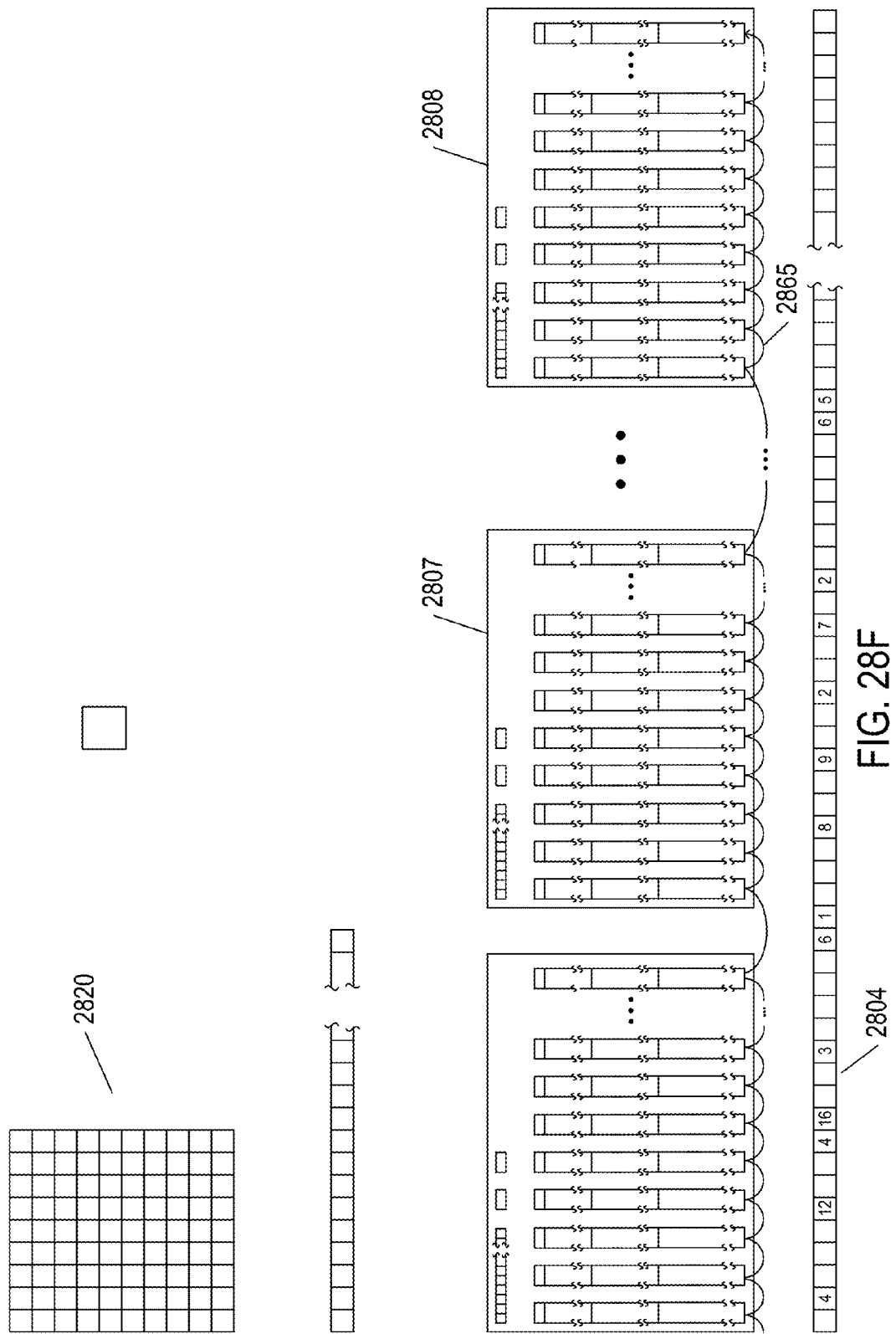
FIG. 28F illustrates the process of multi-cluster-data-structure symbol processing.
Figure 28G:
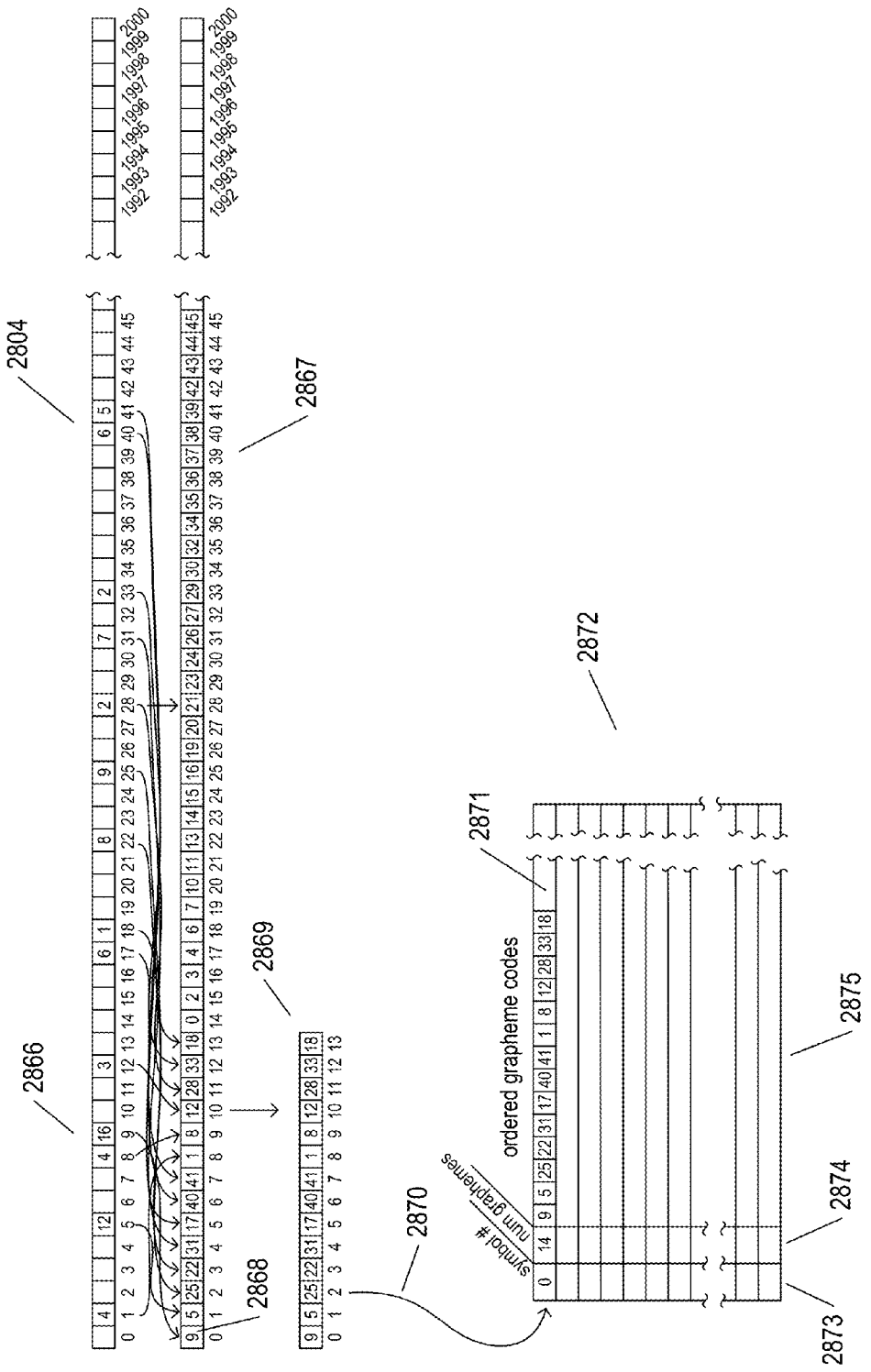
FIG. 28G illustrates the process of multi-cluster-data-structure symbol processing.

The process described with reference to FIGS. 28C-E is repeated, for each pattern data structure of each cluster data structure, to generate a complete grapheme vote stored within votes array 2804. FIG. 28F illustrates the final votes after a complete traversal of the pattern data structure in the cluster data structures, represented by serpentine arrow 2865 continuing form the curved arrow 2837 representing selection of the first pattern data structure in the first cluster. This constitutes initial processing of the first symbol image selected from the text page 2820. Next, as shown in FIG. 28G, the votes accumulated in the votes array for the first symbol image selected from the text page are used to prepare a sorted list of grapheme codes corresponding to the graphemes receiving the most votes with respect to the symbol image in the process discussed above with reference to FIGS. 28B-F. In FIG. 28G, the votes array 2804 is shown at the top of the figure. Each cell in the votes array contains a number of votes and the cells are indexed by grapheme code. The votes and grapheme code indexes are then sorted, in descending vote-number order, to produce a sorted array 2867 in which each cell contains a grapheme code and the indices are monotonically increasing, from left to right, to indicate the order of the grapheme codes with respect to the votes which the grapheme codes received during the processing described in FIGS. 28B-F. For example, the greatest number of votes, 16, was received by grapheme code "9" 2866, and therefore the grapheme code "9" appears in the first entry 2868 of the sorted array of grapheme codes 2867. Next, the sorted array 2867 is truncated to produce a truncated grapheme sorted array 2869. The truncated grapheme sorted array includes a sorted list of grapheme codes that received votes in the process discussed above with reference to FIGS. 28B-F. In the process discussed with reference to FIGS. 28B-F, only 14 grapheme codes received votes and, therefore, the truncated grapheme array 2869 includes only 14 entries. These are the first 14 entries in sorted grapheme array 2867. The remaining entries in the sorted grapheme array 2867, following the fourteenth entry with index 13, include the grapheme codes for which no votes were received. Then, as indicated by curved arrow 2870, the truncated grapheme array is included in a first entry 2871 of a processed symbol image table 2872. Each entry of the processed symbol image table includes a field indicating the number or order of the symbol within the text data structure (2820 in FIG. 28A), represented by a first column 2873, a field that contains a numeric indication of the number of grapheme codes that received votes when the symbol was processed, represented by a second column 2874 in the processed symbol image table, and the truncated grapheme sorted array, represented by a third column 2875 in the processed symbol image table 2872.

In certain implementations, rather than using a processed symbol image table, the truncated grapheme sorted array is immediately used by additional symbol-recognition logic to generate a matching symbol for the symbol image. This recognized symbol can then be immediately placed into a processed page corresponding to the page containing symbol images that is being processed by the method discussed above with reference to FIGS. 28A-J. However, in the implementation currently discussed, the truncated grapheme sorted arrays for the symbol images are accumulated in the processed symbol image table for each document page. The truncated grapheme sorted arrays are then employed, along with pattern data structures and other information, in a second phase to transform the symbol images within a document page into symbols included within a processed document page. In either case, the truncated grapheme sorted array represents the result of initial, multi-cluster processing, which identifies a set of grapheme codes most likely related to a symbol image within the image of a page of a document. In the currently described implementation, all grapheme codes that received votes are included in each truncated grapheme sorted arrays. In alternative implementations, only those grapheme codes with a number of votes above a threshold are included in each truncated grapheme sorted array.

Once the first symbol image extracted from the document page has been processed, and an entry for the symbol image entered into the processed symbol image table, a second symbol image is selected from the text data structure (2820 in FIG. 28A) and placed into symbol image variable 2824. Parameter values are computed for the next symbol and stored in the array of computed parameter values 2810. The second symbol image is then processed, using the method discussed above with reference to FIGS. 28C-F, to produce a new set of accumulated votes in the votes array 2804 for the second symbol image. The accumulated votes for the second symbol image 2804 are sorted by the number of votes to produce a sorted grapheme array which is then truncated to produce a truncated grapheme sorted array. This truncated grapheme sorted array is included as a second entry in the processed symbol image table 2872. Similar processing is carried out for each successive symbol image in the text data structure (2820 in FIG. 28A). As a result of the cluster-based processing of symbol images in the text document, a processed symbol image table 2872 is produced which contains an entry for each symbol image in the text document. Each entry of the processed symbol image table represents an initial set of potentially matching graphemes for the symbol image. The set of potentially matching graphemes appears, in the truncated grapheme sorted array, in decreasing accumulated-vote order, so that the grapheme codes that received the most votes appear first in the truncated grapheme sorted array. A set of potentially matching grapheme codes, represented by a truncated grapheme sorted array, can then be used by additional character-recognition logic, along with the pattern data structures that cast the votes for the graphemes included in the truncated sorted array, to determine a best symbol code for the symbol image from which the truncated grapheme sorted array was generated by the process described above with reference to FIGS. 28B-F.

In the multi-cluster-data-structure symbol-processing approach discussed above with reference to FIGS. 28A-G, the candidate graphemes selected for each processed symbol image reflect conclusions that can be drawn from the enormous database of accumulated pattern-matching information for the symbol set of a natural language contained in the pattern data structures and cluster data structures. However, when the natural language is described by many tens or hundreds of cluster data structures, each including many hundreds of pattern data structures, the processing overhead per symbol image is clearly large. Although modern computer systems feature fast processors, and often feature at least multiple processor cores per machine, the computational overhead of the symbol-image-processing methodology discussed above with reference to FIGS. 24-28G may be sufficiently large to render many optical-character-recognition tasks impractical or infeasible. The current document introduces decision-forest-based selection of pattern data structures for symbol images in order to greatly increase the computational efficiency of the overall multi-cluster-data-structure-based approach to optical character recognition.

Figure 29A:
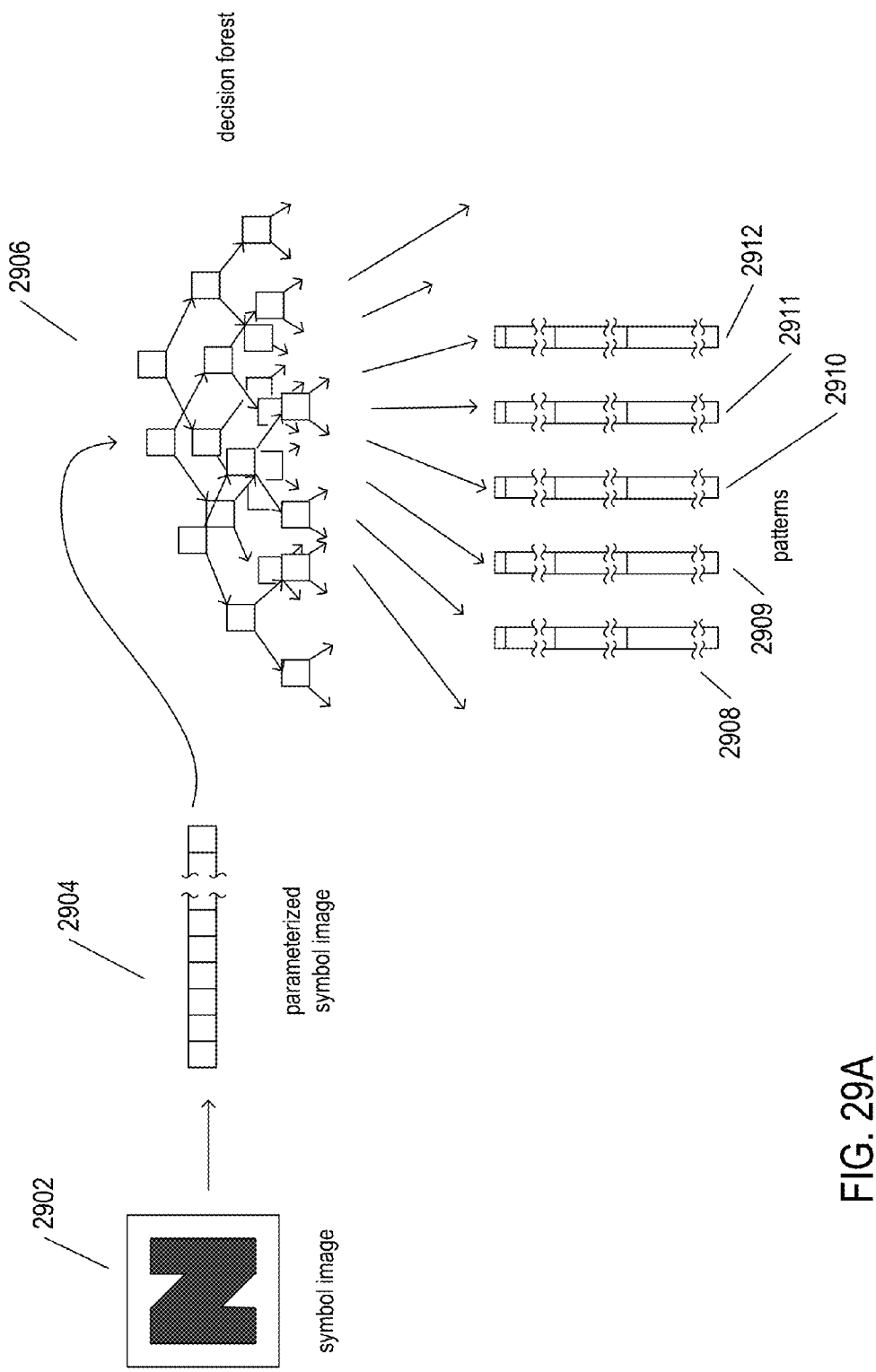
FIG. 29A illustrates use of a decision forest to identify candidate parameter data structures for an input symbol image.

FIGS. 29A-D illustrate use of a decision forest to identify candidate parameter data structures for an input symbol image. In FIG. 29A, the input symbol image 2902 is parameterized by computing numeric parameter values for each of a set of different parameters that are then stored in an array of numeric parameter values 2904. These stored parameters, or subsets of the stored parameters, are then used to traverse the numerous decision trees in a decision forest 2906, each of which produces one or more candidate pattern data structures 2908-2912 corresponding to the input symbol image 2902. In many cases, each decision tree produces a single candidate pattern data structure. In alternative implementations, a decision tree may produce multiple candidate pattern data structures for an input symbol image. The decision trees are similar to the decision trees described above with reference to FIGS. 14C, 15C, 16C, and 17C. However, unlike those previously described decision trees, the decision trees in decision forest 2906 do not produce numeric codes for symbols, but instead produce identifiers that identify pattern data structures, as discussed in greater detail, below.

The decision forest 2906 is thus used to select a set of candidate pattern data structures that are each used independently, within the context of one or more cluster data structures, to vote for grapheme codes likely to correspond to the input symbol image. By using decision forest 2906, the lengthy and computationally inefficient process, discussed above with reference to FIGS. 28A-G, in which each pattern data structure in each cluster data structure is evaluated for being able to vote for grapheme codes, is short-circuited so that only the candidate pattern data structure identified by the decision forest cast votes for an input symbol image. The decision forest analyzes the parameter values generated from the input symbol image to identify a set of candidate parameter data structures most likely to produce weights less than the cutoff value within the cluster data structures that include the candidate pattern data structures, thus eliminating the need to compute weights above the cutoff value that do not lead to casting of votes for grapheme codes. Furthermore, the candidate pattern data structures identified by the decision forest have the greatest likelihood of casting meaningful votes for grapheme codes with respect to the input symbol image.

Figure 29B:
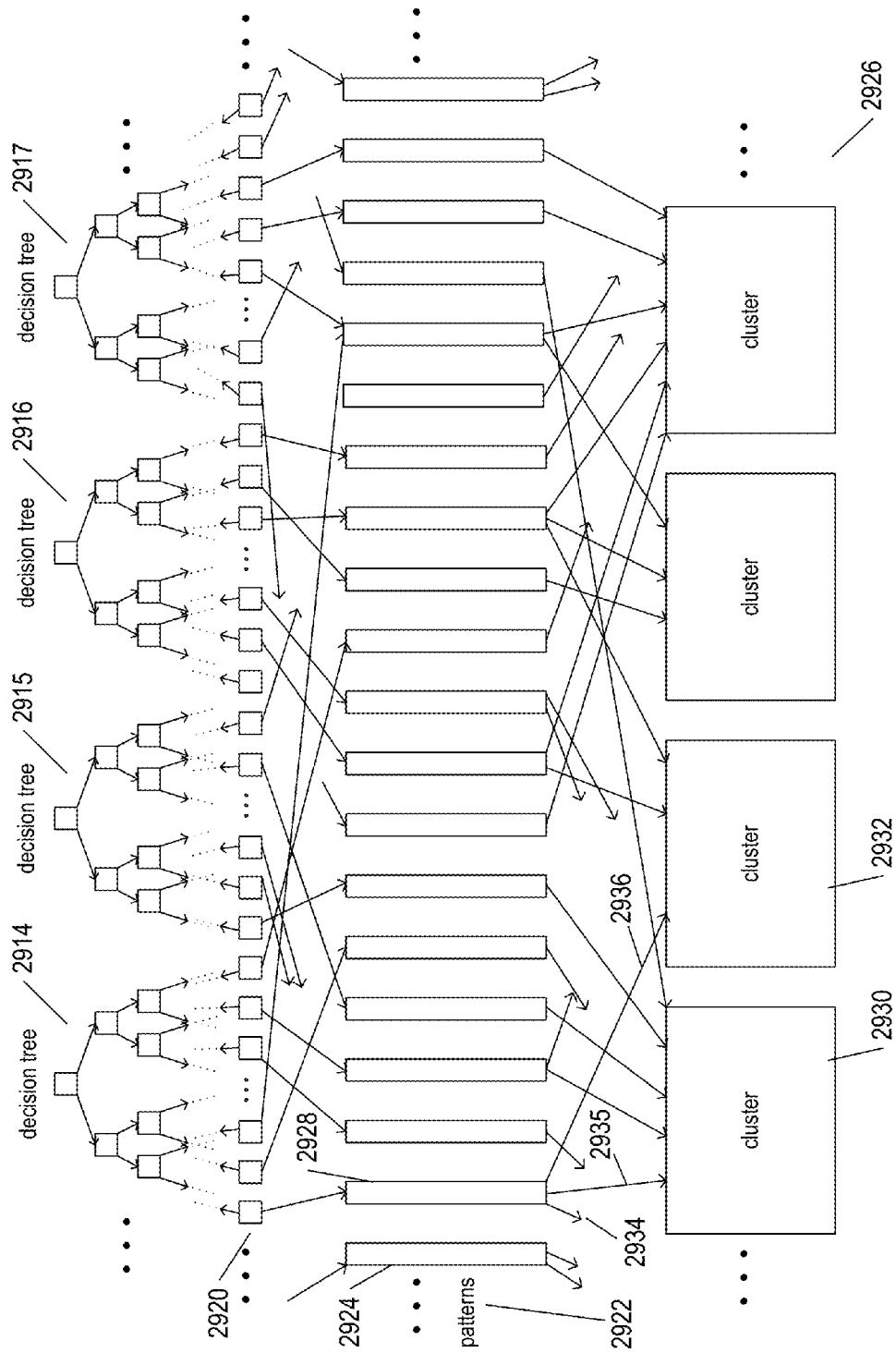
FIG. 29B illustrates use of a decision forest to identify candidate parameter data structures for an input symbol image.

FIG. 29B illustrates relationships between decision trees of the decision forest (2906 in FIG. 29A), pattern data structures, and cluster data structures. As shown in FIG. 29B, the decision forest (2906 in FIG. 29A) consists of multiple individual decision trees 2914-2917. The leaf nodes of the decision trees, shown in FIG. 29B in horizontal level 2920, each reference at least one pattern data structure. In FIG. 29B, the pattern data structures are shown as a broad middle layer 2922 with column-like objects, such as column-like object 2924, representing individual pattern data structures. Each pattern data structure may be included in, or referenced by, one or more cluster data structures. In FIG. 29B, the cluster data structures are shown in a lowest level 2926. Pattern data structure 2928, for example, is included within, or associated with, three different cluster data structures, including cluster data structures 2930 and 2932, as indicated by reference arrows 2934-2936. It should be noted, with reference to FIG. 29B, that a decision tree may include leaf nodes that reference pattern data structures associated with multiple cluster data structures because a given pattern data structure may be associated with multiple cluster data structures. In certain implementations, a leaf node of a decision tree may reference multiple pattern data structures, rather than a single pattern data structure, as in FIG. 29B.

Figure 29C:
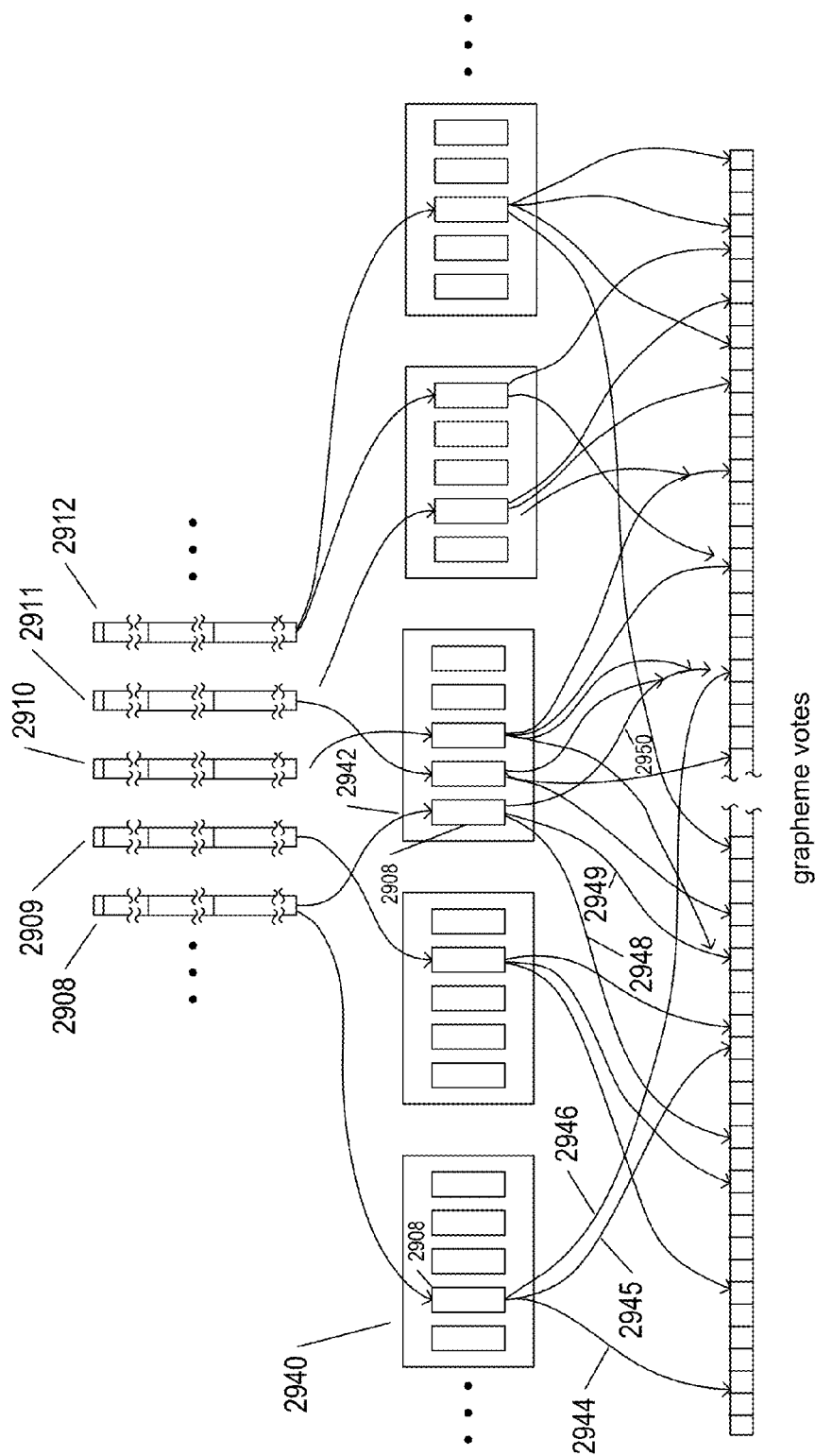
FIG. 29C illustrates use of a decision forest to identify candidate parameter data structures for an input symbol image.

FIG. 29C illustrates the process of voting for grapheme codes by candidate pattern data structures identified by the decision forest (2906 in FIG. 29A). The candidate pattern data structures 2908-2912 identified by the decision forest may be associated, as shown in FIG. 29C, with multiple cluster data structures. For example, candidate pattern data structure 2908 is associated with cluster data structure 2940 and with cluster data structure 2942. Pattern data structure 2908 within the context of cluster data structure 2940 casts three grapheme-code votes, as represented by arrows 2944-2946. Candidate pattern data structure 2908 within the context of cluster data structure 2942 casts three grapheme-code votes represented by arrows 2948-2950. Of course, a particular pattern data structure may cast a different number of votes within the context of one cluster data structure than the number of votes cast by the pattern data structure in the context of another cluster data structure. Similarly, a pattern data structure in the context of one cluster data structure may vote for different graphemes than the graphemes voted for by the pattern data structure in the context of another cluster data structure. Thus, rather than providing an opportunity for each pattern data structure within each cluster data structure to independently vote for graphemes, the decision-forest-based method uses a decision forest to select a set of candidate pattern data structures 2908-2912 which each then votes within the context of those cluster data structures within which the pattern data structure is associated or in which the pattern data structure occurs.

Figure 29D:
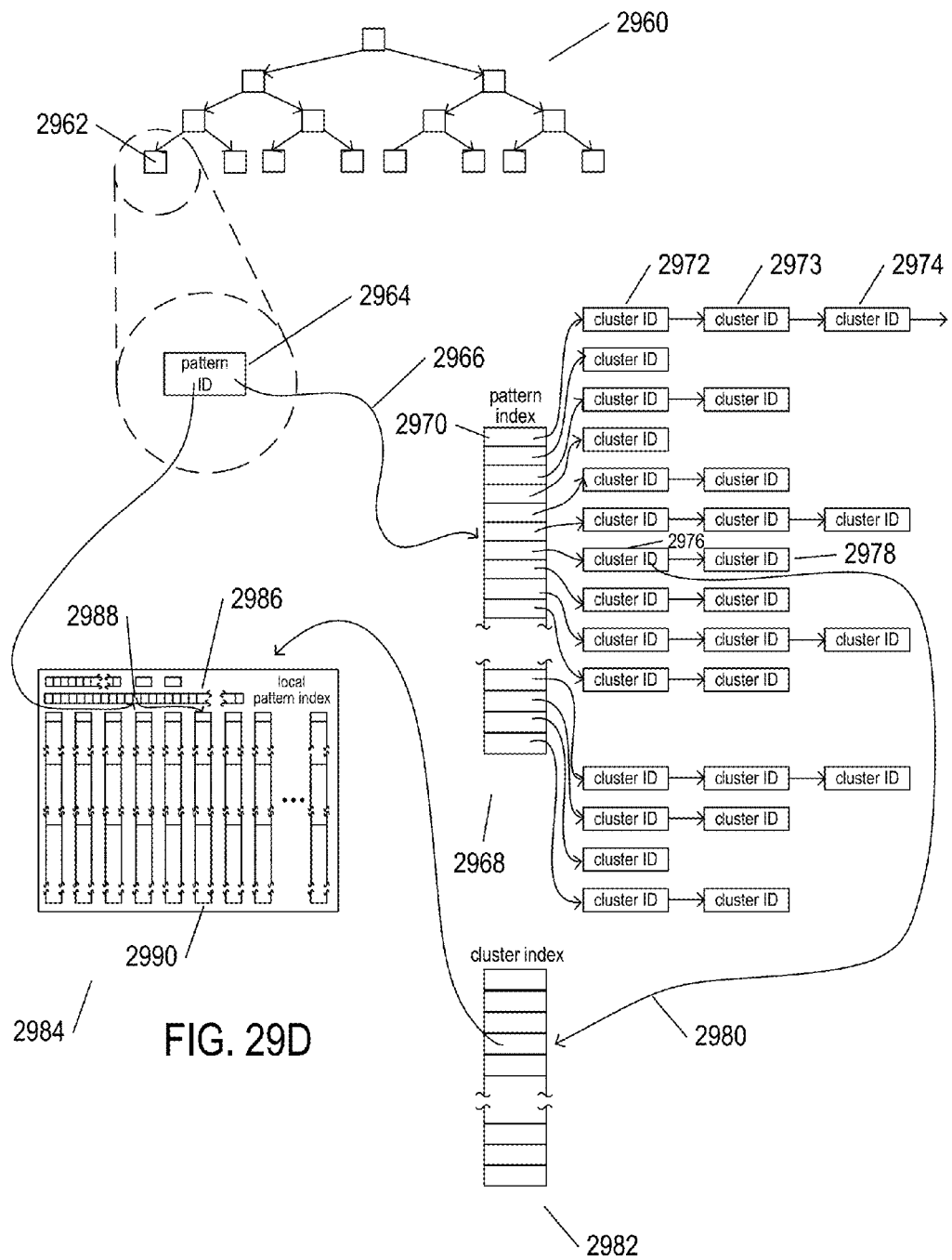
FIG. 29D illustrates use of a decision forest to identify candidate parameter data structures for an input symbol image.

FIG. 29D shows one implementation of the decision-forest-based symbol-image processing method discussed above with reference to FIGS. 29A-C. In FIG. 29D, a single decision tree 2960 is shown at the top of the figure. Each leaf node, such as leaf node 2962, includes at least one pattern identifier 2964. In certain implementations, each leaf node includes only a single pattern identifier while in alternative implementations, the leaf node of a decision tree may include a list of pattern identifiers. The pattern identifier is used as an index, as represented by arrow 2966, into a pattern index 2968. The pattern index is an array of pointers to lists of cluster identifiers. For example, the pattern identifier that indexes the first element in the pattern index 2970 references, through the pattern index, a list of three cluster identifiers 2972-2974. These cluster identifiers identify the clusters associated with, or that contain, the pattern data structure identified by pattern identifier 2964. In the case of leaf node 2962 of decision tree 2960, the single pattern identifier 2964 contained within the leaf node references a list of two cluster identifiers 2976 and 2978. The first cluster identifier is used as an index, as represented by arrow 2980, into a cluster index 2982. The indexed entry of the cluster index contains a pointer or a reference to a cluster data structure 2984. The cluster data structure includes a local pattern-data-structure index 2986. The pattern identifier 2964 is used to index an entry 2988 within the local pattern-data-structure index 2986 that contains a reference to the instance of the pattern data structure 2990 corresponding to the pattern identifier 2964 contained within, or associated with, cluster data structure 2984. Many additional types of data structures and access methods may be used to identify and navigate to candidate pattern data structures contained within cluster data structures associated with each leaf node of each decision tree. In some cases, a given pattern data structure may be represented by multiple entries in the pattern index 2968 and therefore associated with different lists of containing cluster data structures, so that one decision tree can specify voting by the pattern data structure within the context of different cluster data structures than specified by another decision tree.

Figure 30A:
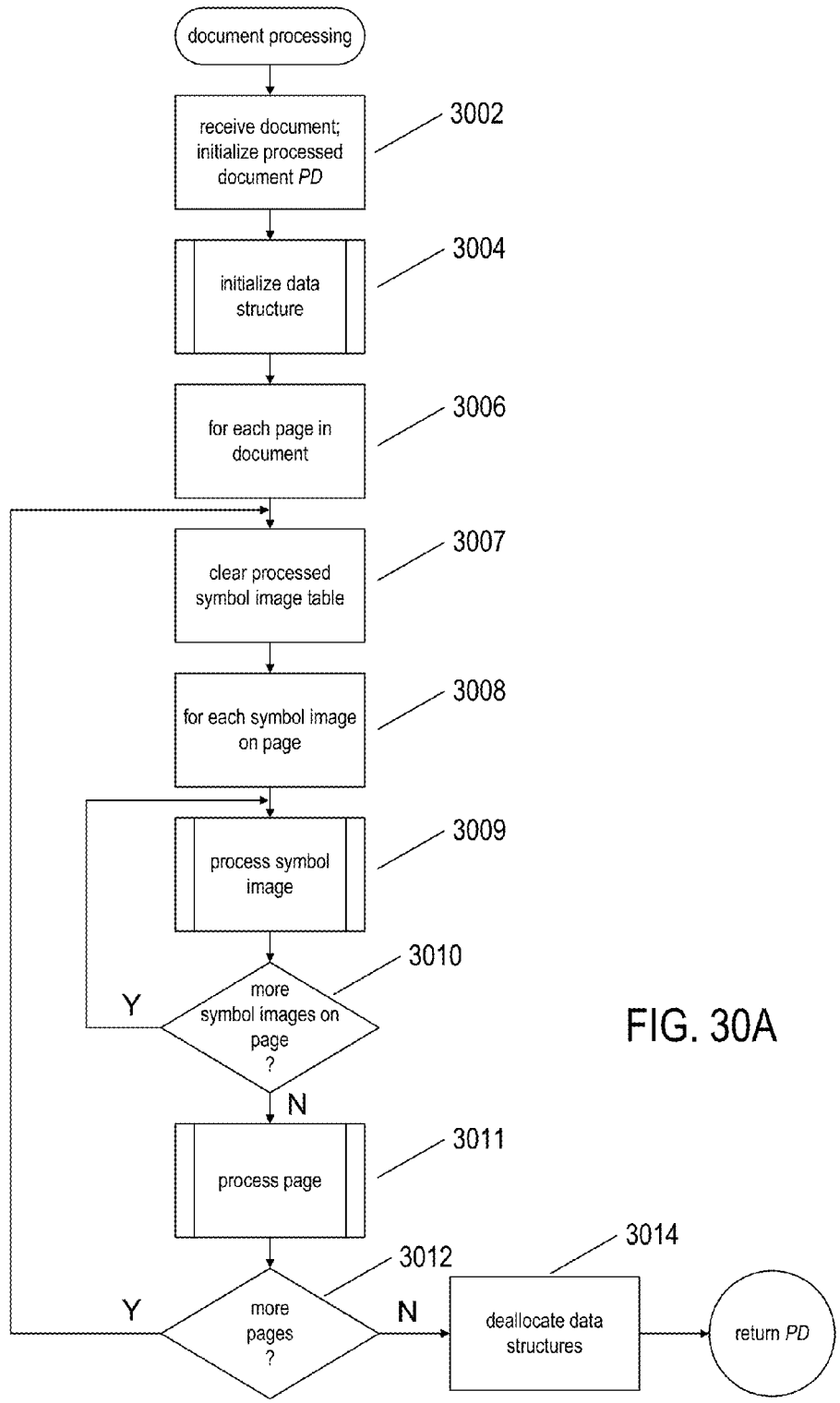
FIG. 30A illustrates, using control-flow diagrams, one implementation of a multi-cluster-data-structure document processing method that employs a decision forest to select candidate pattern data structures for each symbol image.

FIGS. 30A-D illustrate, using control-flow diagrams, one implementation of a multi-cluster-data-structure document processing method that employs a decision forest to select candidate pattern data structures for each symbol image. FIG. 30A shows the highest level of the OCR-based document processing method. In step 3002, a document is received and a data structure corresponding to the processed document, PD, that will contain symbol codes corresponding to symbol images in the received document produced by the document-processing method, is initialized. Next, in step 3004, the data structures, discussed above with reference to FIGS. 24-25A, are initialized to prepare for document processing. Then, in the for-loop of steps 3006-3012, each page in the document is processed in order to replace symbol images in the received document with symbols, such as symbol codes or other computational representations of symbols, in the processed document PD. In a first step within the outer for-loop 3006-3012, the processed symbol image table, discussed above with reference to FIGS. 27 and 28G, is cleared and re-initialized. Then, in an inner for-loop of steps 3008-3011, each symbol in the currently considered page is processed via a call to the routine "process symbol image" 3009. Upon completion of the nested for-loops of steps 3006-3012, the data structures used for OCR-based processing of the received document are deallocated, in step 3014, and the processed document PD is returned.

Figure 30B:
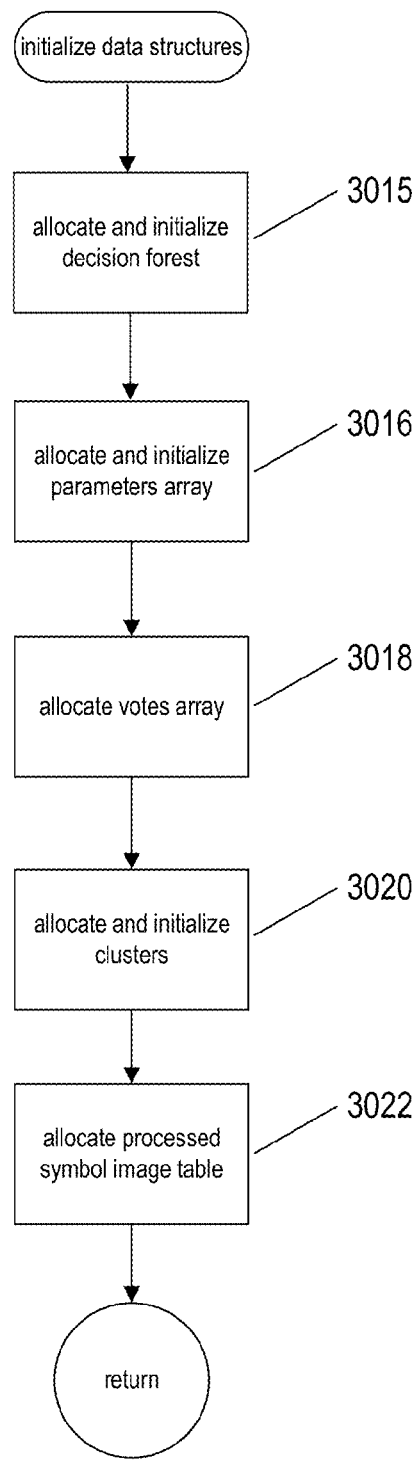
FIG. 30B illustrates, using control-flow diagrams, one implementation of a multi-cluster-data-structure document processing method that employs a decision forest to select candidate pattern data structures for each symbol image.

FIG. 30B shows the routine "initialized data structures," called in step 3004 of FIG. 30A. In step 3015, a decision forest is allocated and initialized. The decision forest is, in general, based on an independent analysis of large volumes of textural information in the natural language for which the decision tree is created. In step 3016, the parameters array (2002 in FIG. 20A) is allocated and initialized. In step 3018, the votes array (2004 in FIG. 20A) is allocated. In step 3020, the cluster data structures (2006-2008 in FIG. 20A) and data structures referenced from the cluster data structure or contained within the cluster data structures, including the local parameter arrays (2012 in FIG. 20A) and pattern data structures (2018 in FIG. 20A), are allocated and initialized. As discussed above, each cluster data structure may include a different set of references to parameters described by the global parameter array (2002 in FIG. 20A) as well as different pattern data structures and a different cutoff value than other cluster data structures. Each cluster data structure is specialized for recognizing a subset or family of symbol images for a particular language or set of related languages. Finally, in step 3022, the processed symbol image table (2072 in FIG. 20K) is allocated. In addition, various other variables and arrays are either statically allocated or dynamically allocated and initialized.

Figure 30C:
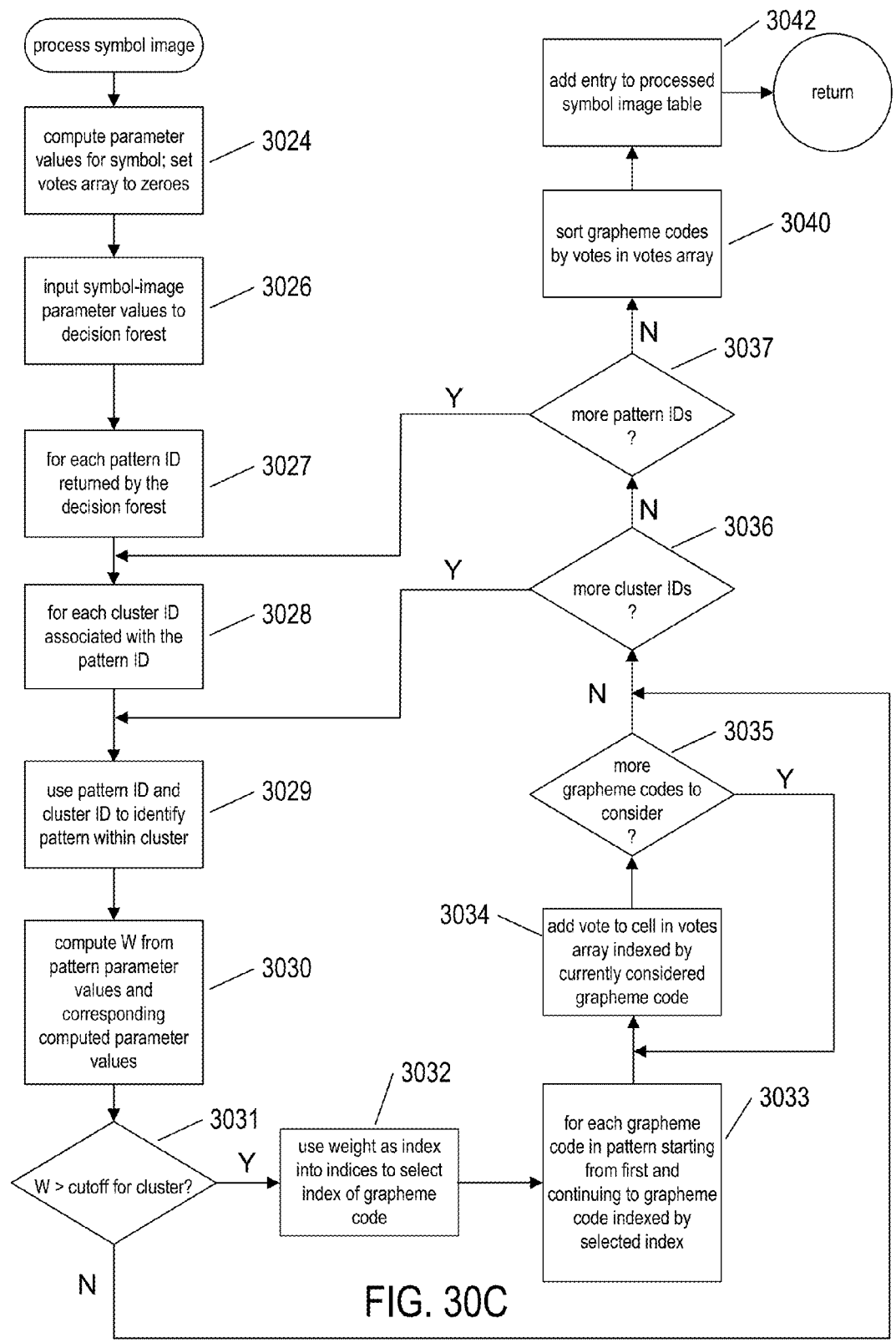
FIG. 30C illustrates, using control-flow diagrams, one implementation of a multi-cluster-data-structure document processing method that employs a decision forest to select candidate pattern data structures for each symbol image.

FIG. 30C provides a control-flow diagram for the routine "processed symbol image," called in step 3009 of FIG. 30A. In step 3024, the routine "process symbol image" computes parameters values for all of the parameters represented by parameter-value-calculating functions or references to parameter-value-calculating functions in the parameters array 2008. In step 3026, the computed parameters, or subsets of the computed parameters, are input to the decision trees that together comprise a decision forest (2906 in FIG. 29A). Then, in the nested for-loops of steps 3027-3037, the routine "process symbol image" processes a symbol image as discussed above with reference to FIGS. 29A-D. In the outer for-loop of steps 3027-3037, each pattern-data-structure identifier returned by the decision forest is considered. In the first inner for-loop of steps 3028-3036, each cluster data structure associated with, or containing, the pattern data structure is considered. In step 3029, a next pattern data structure within, or associated with, a cluster data structure is identified using the current values of the loop variables. In step 3030, the weight W is computed for the currently considered pattern data structure using the pattern parameter values contained in the pattern data structure and corresponding parameter values computed from the currently considered symbol image, as discussed above with reference to FIG. 28D. When the computed weight value is greater than the cutoff value for the cluster data structure, as determined in step 3031, then the currently considered pattern data structure is not further processed, and control flows to step 3036, discussed below. Otherwise, in step 3032, the computed weight is used as an index into the indices section of the pattern data structure to select an index into the grapheme-code portion of the pattern data structure. Then, in the innermost for-loop of steps 3033-3035, votes are added to vote-array cells indexed by each grapheme code in the pattern data structure, starting with the first grapheme code and proceeding through successive grapheme codes to the grapheme code indexed by the index selected in step 3033. In the currently described implementation, each vote adds 1 to the cumulative vote total for a grapheme. In alternative implementations, real-valued votes within a range, such as [0.0,1.0] may be employed. In additional implementations, integral vote values in a range of integer values may be used, with the magnitude of a vote related to how closely the pattern corresponding to a pattern data structure matches the grapheme. In step 3040, as discussed above with reference to FIG. 28G, the grapheme codes that have received votes during the processing of the currently considered symbol image are sorted into a truncated grapheme sorted array (2869 in FIG. 28G) and the truncated grapheme sorted array is then added, in step 3042, to an entry for the currently considered symbol image in the processed symbol image table (2072 in FIG. 28G).

Figure 30D:
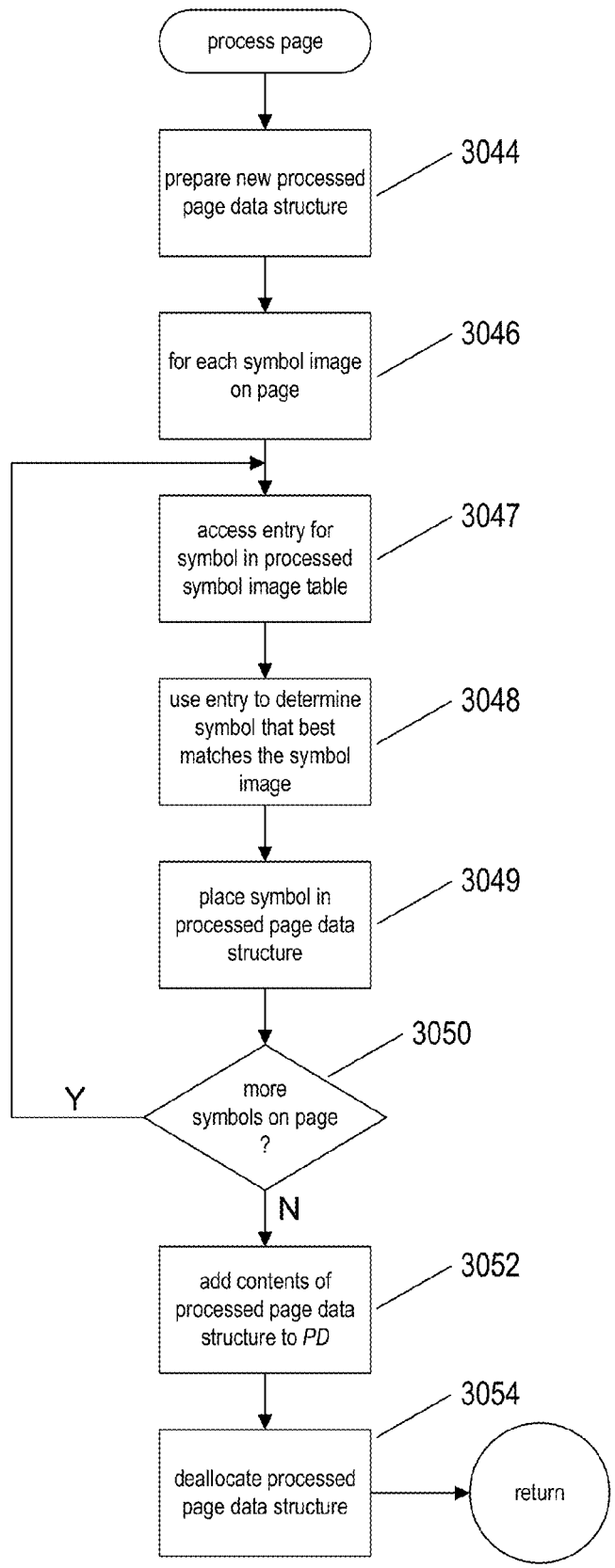
FIG. 30D illustrates, using control-flow diagrams, one implementation of a multi-cluster-data-structure document processing method that employs a decision forest to select candidate pattern data structures for each symbol image.

FIG. 30D illustrates, using a control-flow diagram, the routine "process page" called in step 3011 of FIG. 30A. In step 3044, a new processed page data structure that stores symbol codes or other representations of symbols for transfer to the processed document PD is initialized. Then, in the for-loop of steps 3046-3050, each symbol image within an image of a page of the text-containing document received in step 3002 of FIG. 30A is processed. In step 3047, the entry for the currently considered symbol image stored in the processed symbol image table is accessed and, in step 3048, used, along with the pattern data structures which cast votes for the graphemes in the entry for the currently considered symbol image stored in the processed symbol image table, to determine a symbol that best matches the symbol image from among the grapheme codes associated with the symbol image during the processing of the symbol image by the routine "processed symbol image," illustrated in FIG. 30C. There are a variety of different methods that can be used to determine the symbol that best matches a symbol image. In step 3049, the symbol or symbol code representing the symbol is placed into a position within the processed page data structure corresponding to the position of the symbol image within the currently processed page of the received text-containing document. After all the symbol images have been processed, the contents of the processed page data structure are added to the processed document PD, in step 3052, and the processed page data structure is then deallocated, in step 3054.

Although the present invention has been described in terms of particular embodiments, it is not intended that the invention be limited to these embodiments. Modifications within the spirit of the invention will be apparent to those skilled in the art. For example, any of many different possible implementations of the data structures and methods used for preprocessing according to the generalized third implementation, described above, within an OCR system may be obtained by varying any of many different design and implementation parameters, including data structures, control structures, modular organization, programming language, underlying operating system and hardware, and many other such design and implementation parameters.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An optical symbol recognition system comprising:
   a memory; and
   one or more processors coupled to the memory, the processors are configured to:
   identify a symbol image in an image of a document;
   identify using a decision forest, a set of candidate pattern data structures for the symbol image;
   use the candidate pattern data structures to identify a set of candidate graphemes;
   use the identified set of candidate graphemes to select a symbol code that represents the symbol image; and
   producing an electronic document comprising the symbol code that represents the symbol image.

2. The optical symbol recognition system of claim 1, wherein using the candidate pattern data structures to identify a set of candidate graphemes further comprises:
   evaluating each candidate pattern data structure, within the context of one or more cluster data structures, for an ability to vote for graphemes;
   voting, by the candidate pattern data structures evaluated to be able to vote for graphemes, for one or more graphemes;
   identifying candidate graphemes for the symbol image as those graphemes receiving votes; and
   sorting the identified graphemes into a truncated sorted grapheme array that represents the set of candidate graphemes.

3. The optical symbol recognition system of claim 2, wherein the truncated sorted grapheme array includes those identified graphemes with greater than a threshold vote total.

4. The optical symbol recognition system of claim 2, further comprising a set of data structures, stored in one or more of the one or more memories, the set of data structures including:
   a decision forest;
   a votes data structure that stores cumulative vote totals, each cumulative vote total associated with a grapheme code, the vote total in the votes data structure indexed by grapheme codes;
   pattern data structures, each of which represents a symbol pattern and each of which includes an ordered set of parameter values, an ordered set of indices, and an ordered set of grapheme codes; and
   two or more cluster data structures, each cluster data structure including an ordered set of references to parameters and one of multiple pattern data structures or multiple references to pattern data structures.

5. The optical symbol recognition system of claim 4, further comprising an ordered set of functions that generate parameter values from symbol images.

6. The optical symbol recognition system of claim 5, wherein identifying candidate graphemes for the symbol image as those graphemes receiving votes further includes:
   initializing the votes data structure; and
   adding a vote value to an element of the votes data structure corresponding to grapheme for which a pattern data structure votes.

7. The optical symbol recognition system of claim 4, wherein identifying, using a decision forest, a set of candidate pattern data structures for the symbol image further comprises:
   computing a set of parameter values for the symbol image;
   inputting the set of parameter values, or a subset of the set of parameter values, to each decision tree of the decision forest; and
   identifying the pattern data structures, each identified by a leaf node of each decision tree, as the set of candidate pattern data structures.

8. The optical symbol recognition system of claim 4, wherein evaluating each candidate pattern data structure, within the context of one or more cluster data structures, for an ability to vote for graphemes further comprises:
   evaluating the parameter values of the set of parameter values in each identified pattern data structure with respect to the parameter values in the cluster-associated ordered set of parameter values to generate a weight value by summing the absolute values of the differences between each parameter value of the set of parameter values in the pattern data structure and a corresponding parameter value in the cluster-associated ordered set of parameter values; and
   when the weight value is less than a cutoff value, determining that the pattern data structure is able to vote for graphemes.

9. The optical symbol recognition system of claim 8, wherein voting, by a candidate pattern data structures evaluated to be able to vote for graphemes, for one or more graphemes further comprises:
   using the generated weight value to select an index from the ordered set of indices within the pattern data structure;
   using the selected index to select a grapheme code from the ordered set of grapheme codes within the pattern data structure; and
   for each grapheme code in the ordered set of grapheme codes within the pattern data structure starting from the first grapheme code and ending with the selected grapheme code,
   indexing the votes data structure using the grapheme code to access a cumulative vote total for a grapheme corresponding to the grapheme code and adding a value to the cumulative vote total for the grapheme.

10. A method comprising:
    identify a symbol image in an image of a document;
    identifying, using a decision forest, a set of candidate pattern data structures for the symbol image;
    using the candidate pattern data structures to identify a set of candidate graphemes;
    using the identified set of candidate graphemes to select a symbol code that represents the symbol image; and
    producing an electronic document comprising the symbol code that represents the symbol image.

11. A method of claim 10, wherein using the candidate pattern data structures to identify a set of candidate graphemes further comprises:
- evaluating each candidate pattern data structure, within the context of one or more cluster data structures, for an ability to vote for graphemes;
- voting, by the candidate pattern data structures evaluated to be able to vote for graphemes, for one or more graphemes;
- identifying candidate graphemes for the symbol image as those graphemes receiving votes; and
- sorting the identified graphemes into a truncated sorted grapheme array that represents the set of candidate graphemes.

12. The method of claim 11, wherein the truncated sorted grapheme array includes those identified graphemes with greater than a threshold vote total.

13. The method of claim 11, further comprising a set of data structures, stored in one or more of the one or more memories, the set of data structures including:
- a decision forest;
- a votes data structure that stores cumulative vote totals, each cumulative vote total associated with a grapheme code, the vote total in the votes data structure indexed by grapheme codes;
- pattern data structures, each of which represents a symbol pattern and each of which includes an ordered set of parameter values, an ordered set of indices, and an ordered set of grapheme codes; and
- two or more cluster data structures, each cluster data structure including an ordered set of references to parameters and one of multiple pattern data structures or multiple references to pattern data structures.

14. The method of claim 13, further comprising an ordered set of functions that generate parameter values from symbol images.

15. The method of claim 14, wherein identifying candidate graphemes for the symbol image as those graphemes receiving votes further includes:
- initializing the votes data structure; and
- adding a vote value to an element of the votes data structure corresponding to grapheme for which a pattern data structure votes.

16. The method of claim 14, wherein identifying, using a decision forest, a set of candidate pattern data structures for the symbol image further comprises:
- computing a set of parameter values for the symbol image;
- inputting the set of parameter values, or a subset of the set of parameter values, to each decision tree of the decision forest; and
- identifying the pattern data structures, each identified by a leaf node of each decision tree, as the set of candidate pattern data structures.

17. The method of claim 14, wherein evaluating each candidate pattern data structure, within the context of one or more cluster data structures, for an ability to vote for graphemes further comprises:
- evaluating the parameter values of the set of parameter values in each identified pattern data structure with respect to the parameter values in the cluster-associated ordered set of parameter values to generate a weight value by summing the absolute values of the differences between each parameter value of the set of parameter values in the pattern data structure and a corresponding parameter value in the cluster-associated ordered set of parameter values; and
- when the weight value is less than a cutoff value, determining that the pattern data structure is able to vote for graphemes.

18. The method of claim 17, wherein voting, by a candidate pattern data structures evaluated to be able to vote for graphemes, for one or more graphemes further comprises:
- using the generated weight value to select an index from the ordered set of indices within the pattern data structure;
- using the selected index to select a grapheme code from the ordered set of grapheme codes within the pattern data structure; and
- for each grapheme code in the ordered set of grapheme codes within the pattern data structure starting from the first grapheme code and ending with the selected grapheme code,
- indexing the votes data structure using the grapheme code to access a cumulative vote total for a grapheme corresponding to the grapheme code and adding a value to the cumulative vote total for the grapheme.

19. A non-transitory computer-readable storage medium comprising executable instructions which, when executed by one or more processors in an optical symbol recognition system, cause the optical symbol recognition system to:
- identify a symbol image in an image of a document;
- identify, using a decision forest, a set of candidate pattern data structures for the symbol image;
- use the candidate pattern data structures to identify a set of candidate graphemes;
- use the identified set of candidate graphemes to select a symbol code that represents the symbol image; and
- producing an electronic document comprising the symbol code that represents the symbol image.

20. The non-transitory computer-readable storage medium of claim 19, wherein using the candidate pattern data structures to identify a set of candidate graphemes further comprises:
- evaluating each candidate pattern data structure, within the context of one or more cluster data structures, for an ability to vote for graphemes;
- voting, by the candidate pattern data structure evaluated to be able to vote for graphemes, for one or more graphemes;
- identifying candidate graphemes for the symbol image as those graphemes receiving votes; and
- sorting the identified graphemes into a truncated sorted grapheme array that represents the set of candidate graphemes.

* * * * *